US012590208B2

(12) United States Patent
Tai et al.

(10) Patent No.: US 12,590,208 B2
(45) Date of Patent: Mar. 31, 2026

(54) THERMOPLASTIC RESIN FOAM, THERMOPLASTIC RESIN FOAM SHEET, FIBER-REINFORCED RESIN COMPOSITE, METHOD FOR MANUFACTURING THERMOPLASTIC RESIN FOAM, THERMOPLASTIC RESIN FOAM MOLDED ARTICLE, METHOD FOR MANUFACTURING THERMOPLASTIC RESIN FOAM MOLDED ARTICLE, AND FOAMED RESIN COMPOSITE

(71) Applicant: Sekisui Kasei Co., Ltd., Osaka (JP)

(72) Inventors: Tetsuro Tai, Osaka (JP); Kohei Tazumi, Osaka (JP); Kohei Yamada, Osaka (JP); Yusuke Kuwabara, Osaka (JP)

(73) Assignee: SEKISUI KASEI CO., LTD., Osaka (JP)

( * ) Notice: Subject to any disclaimer, the term of this patent is extended or adjusted under 35 U.S.C. 154(b) by 475 days.

(21) Appl. No.: 18/018,678

(22) PCT Filed: Jul. 30, 2021

(86) PCT No.: PCT/JP2021/028416

§ 371 (c)(1),
(2) Date: Jan. 30, 2023

(87) PCT Pub. No.: WO2022/025274

PCT Pub. Date: Feb. 3, 2022

(65) Prior Publication Data

US 2023/0295420 A1 Sep. 21, 2023

(30) Foreign Application Priority Data

Jul. 31, 2020 (JP) ................................ 2020-130267
Sep. 30, 2020 (JP) ................................ 2020-165746
(Continued)

(51) Int. Cl.
*C08L 67/02* (2006.01)
*B32B 1/00* (2006.01)
(Continued)

(52) U.S. Cl.
CPC ................ *C08L 67/02* (2013.01); *B32B 1/00* (2013.01); *B32B 5/02* (2013.01); *B32B 5/18* (2013.01);
(Continued)

(58) Field of Classification Search
CPC .......... C08L 67/02; C08L 9/141; C08L 79/08; B32B 1/00; B32B 5/02; B32B 5/18;
(Continued)

(56) References Cited

U.S. PATENT DOCUMENTS 3,642,554 A * 2/1972 Hensley .................. D04H 1/60 264/109
4,141,927 A 2/1979 White et al.
(Continued)

FOREIGN PATENT DOCUMENTS

JP 3-239527 A 10/1991
JP 2004-182938 A 7/2004
(Continued)

OTHER PUBLICATIONS

International Search Report issued in International Bureau of WIPO Patent Application No. PCT/JP2021/028416, dated Oct. 12, 2021, along with an English translation thereof.
(Continued)

*Primary Examiner* — James C Yager
(74) *Attorney, Agent, or Firm* — Greenblum & Bernstein, P.L.C.

(57) ABSTRACT

A thermoplastic resin foam including a thermoplastic resin, wherein: the thermoplastic resin includes a polyester resin and a polyimide resin, and the thermoplastic resin foam
(Continued)

shows a single glass transition temperature Tg. The glass transition temperature of the thermoplastic resin is preferably 80 to 130° C. An absolute value of difference between heat absorption and heat generation, each determined by heat flux differential scanning calorimetry at a heating rate of 10° C./min, is preferably 3 to 35 J/g.

29 Claims, 18 Drawing Sheets

(30) Foreign Application Priority Data

Dec. 25, 2020 (JP) ................................ 2020-217878
Dec. 25, 2020 (JP) ................................ 2020-217887

(51) Int. Cl.

| | |
|---|---|
| ***B32B 5/02*** | (2006.01) |
| ***B32B 5/18*** | (2006.01) |
| ***B32B 5/24*** | (2006.01) |
| ***B65D 1/34*** | (2006.01) |
| ***B65D 65/40*** | (2006.01) |
| ***B65D 81/34*** | (2006.01) |
| ***C08J 9/14*** | (2006.01) |
| ***C08L 79/08*** | (2006.01) |
| *B29C 44/20* | (2006.01) |
| *B29K 79/00* | (2006.01) |
| *B29K 105/00* | (2006.01) |
| *B29K 105/04* | (2006.01) |
| *B29K 105/26* | (2006.01) |
| *B29L 31/00* | (2006.01) |

(52) U.S. Cl.

CPC ................ *B32B 5/245* (2013.01); *B65D 1/34* (2013.01); *B65D 65/40* (2013.01); *B65D 81/3446* (2013.01); *C08J 9/141* (2013.01); *C08L 79/08* (2013.01); *B29C 44/206* (2013.01); *B29K 2079/085* (2013.01); *B29K 2105/04* (2013.01); *B29K 2105/251* (2013.01); *B29K 2105/26* (2013.01); *B29L 2031/712* (2013.01); *B32B 2260/023* (2013.01); *B32B 2260/046* (2013.01); *B32B 2266/0264* (2013.01); *B32B 2266/06* (2013.01); *B32B 2307/308* (2013.01); *B32B 2307/54* (2013.01); *B32B 2439/02* (2013.01); *B32B 2439/70* (2013.01); *C08J 2203/182* (2013.01); *C08J 2367/02* (2013.01); *C08J 2379/08* (2013.01); *C08J 2467/02* (2013.01); *C08J 2479/08* (2013.01)

(58) Field of Classification Search

CPC .............. B32B 5/245; B32B 2260/023; B32B 2260/046; B32B 2266/0264; B32B 2266/06; B32B 2307/308; B32B 2307/54; B32B 2439/02; B32B 2439/70; B32B 2250/40; B32B 2260/021; B32B 2262/106; B32B 2307/30; B32B 2307/306; B65D 1/34; B65D 65/40; B65D 81/3446; B29C 44/206; B29C 48/0012; B29C 48/08; B29C 44/3442; B29C 44/3461; B29C 44/445; B29C 44/50; B29C 51/10; B29K 2079/085; B29K 2105/04; B29K 2105/251; B29K 2105/26; C08J 2201/03; C08J 2203/14; C08J 9/18; C08J 2300/30; C08J 2400/30; C08J 9/0061; C08J 2203/182; C08J 2367/02; C08J 2379/08; C08J 2467/02; C08J 2479/08; B29L 2031/712; Y02W 30/80; C08K 3/346

See application file for complete search history.

(56) References Cited

U.S. PATENT DOCUMENTS

| | | | | |
|---|---|---|---|---|
| 6,527,993 | B1 | 3/2003 | Hirai et al. | |
| 2005/0032947 | A1* | 2/2005 | Takahashi | C08L 67/00 252/397 |
| 2007/0066737 | A1* | 3/2007 | Gallucci | C08L 79/08 525/418 |

FOREIGN PATENT DOCUMENTS

| | | | |
|---|---|---|---|
| JP | 2009-56621 | A | 3/2009 |
| JP | 2009-521548 | A | 6/2009 |
| JP | 2014-28920 | A | 2/2014 |
| JP | 2014-70153 | A | 4/2014 |
| JP | 2017-43011 | A | 3/2017 |
| JP | 2017-176466 | A | 10/2017 |
| JP | 2018-76427 | A | 5/2018 |
| JP | 2019-181914 | A | 10/2019 |
| JP | 6864775 | B1 | 4/2021 |
| WO | 00/35650 | A1 | 6/2000 |
| WO | 2007/078737 | A1 | 7/2007 |
| WO | 2019/187947 | A1 | 10/2019 |

OTHER PUBLICATIONS

Extend European Search Report that issued in European Patent Application No. 21851301.8, dated Jul. 23, 2024.

* cited by examiner

THERMOPLASTIC RESIN FOAM, THERMOPLASTIC RESIN FOAM SHEET, FIBER-REINFORCED RESIN COMPOSITE, METHOD FOR MANUFACTURING THERMOPLASTIC RESIN FOAM, THERMOPLASTIC RESIN FOAM MOLDED ARTICLE, METHOD FOR MANUFACTURING THERMOPLASTIC RESIN FOAM MOLDED ARTICLE, AND FOAMED RESIN COMPOSITE

TECHNICAL FIELD

The present invention relates to a thermoplastic resin foam, a thermoplastic resin foam sheet, a fiber-reinforced resin composite, a method for manufacturing a thermoplastic resin foam, a thermoplastic resin foam molded article, a method for manufacturing a thermoplastic resin foam molded article, and a foamed resin composite.

Priorities are claimed on Japanese Patent Application No. 2020-130267, filed Jul. 31, 2020, Japanese Patent Application No. 2020-165746, filed Sep. 30, 2020, Japanese Patent Application No. 2020-217878, filed Dec. 25, 2020, Japanese Patent Application No. 2020-217887, filed Dec. 25, 2020, the contents of which are incorporated herein by reference.

BACKGROUND ART

Conventionally, foamed resin sheets obtained by foaming thermoplastic resins such as polystyrene resins and molded products thereof have been used for food containers and the like because of their features such as light weight and high heat insulation.

The market for home-meal replacement, which is a cooked meal purchased at retail stores such as convenience stores and supermarkets and eaten at home, has been expanding. In the home-meal replacement market, there is a demand for food containers that can be used for cooking by heating in a microwave oven. Food containers suitable for cooking by heating are required to be resistant to deformation when heated in a microwave oven, etc. (excellent heat-dimensional stability), and to be easy to handle without being softened after heating (excellent heat resistance).

In response to such a demand, for example, Patent Literature 1 proposes a method of forming a foamed PET sheet by preheating a foamed polyethylene terephthalate (PET) sheet with a low crystallinity to soften the foamed PET sheet, and molding the softened sheet with a mold having a temperature that promotes crystallization. According to the invention of Patent Literature 1, the PET is crystallized by heating the foamed PET sheet at a temperature that promotes crystallization, thereby improving the heat-dimensional stability. However, the invention of Patent Literature 1 requires a step (heat set step) for promoting crystallization, resulting in a long molding time. Further, the invention of Patent Literature 1 requires an apparatus capable of heating to a temperature for promoting crystallization, and thus has problems such as need for new equipment investment.

To address these problems, Patent Literature 2 proposes a thermoplastic polyester resin foam sheet containing, in a specific proportion, a crystalline polyester resin and an amorphous polyester resin having a specific glass transition temperature Tg. According to the invention of Patent Literature 2, a container having excellent heat-dimensional stability can be obtained without requiring a heat set step.

Further, a thermoplastic resin foam granule-molded product, which is a molded product of foam granules containing a thermoplastic resin (thermoplastic resin foam granules), is lightweight and excellent in heat insulation, shock absorbance and mechanical strength. For this reason, applications of thermoplastic resin foam granule-molded products (hereinafter, also simply referred to as "foam granule-molded products") to automobiles, aircrafts, railway vehicles, and the like have been investigated.

Among thermoplastic resins, polyester resins such as polyethylene terephthalate (PET) are capable of producing foam granule-molded products with excellent rigidity and heat resistance, and therefore, there are ongoing studies on foam granule-molded products using polyester resins.

The in-mold foam molding can be used as a method for producing a foam granule-molded product. An explanation is given below with respect to the in-mold foam molding. Thermoplastic resin foam granules (hereafter also simply referred to as "foam granules") are filled into a mold cavity. The foam granules in the cavity are foamed into secondary foam granules by heating with a heating medium such as hot water or steam, while allowing the secondary foam granules to be heat-fused and integrated with each other by the foaming pressure of the foam granules, to thereby obtain a foam granule-molded product of a desired shape.

For example, Patent Literature 3 discloses a method for producing a foam granule-molded product, in which prefoamed granules of polyethylene terephthalate (PET) with low crystallinity are filled into a mold, the molded is heated to raise the mold surface temperature to a temperature higher than the glass transition temperature Tg of PET to perform in-mold foam molding, and the mold is cooled over a predetermined time while keeping the mold surface temperature from falling below the glass transition temperature Tg. According to the invention of Patent Literature 3, after heating for in-mold foam molding is completed, the molded product is cooled while keeping the mold surface temperature from falling below Tg without removing the molded product from the mold, whereby it is attempted to promote the crystallization of the foam granule-molded product to improve the heat-dimensional stability. However, the invention of Patent Literature 3 requires a cooling step for promoting crystallization, and thus has a problem of prolonging the molding time. In this context, the term "heat-dimensional stability" means a property of being resistant to elongation or shrinkage when the temperature of the foam granule-molded product is raised.

To address these problems, Patent Literature 4 proposes a method for producing foam granules containing, in a specific proportion, a crystalline polyester resin and an amorphous polyester resin having a specific glass transition temperature Tg. According to the invention of Patent Literature 4, since the foam granules contain an amorphous thermoplastic polyester resin having a glass transition temperature Tg higher than that of a crystalline polyester resin, a foam granule-molded product obtained by in-mold foam molding using the thermoplastic polyester resin foam granules has excellent heat-dimensional stability without requiring a process for increasing the crystallinity.

CITATION LIST

Patent Literature

Patent Literature 1: Japanese Unexamined Patent Application Publication No. Hei 3-239527

Patent Literature 2: Japanese Unexamined Patent Application Publication No. 2014-028920

Patent Literature 3: International Patent Application Publication No. 2000/035650

Patent Literature 4: Japanese Unexamined Patent Application Publication No. 2014-070153

SUMMARY OF INVENTION

Technical Problem

However, the invention of Patent Literature 2 has low heat resistance. For this reason, the container after heating and the molded product obtained by heating the thermoplastic polyester resin foam sheet become soft and difficult to handle.

In this situation, an object of the present invention is to provide a thermoplastic resin foam having excellent heat resistance and a fiber-reinforced resin composite having excellent heat resistance.

Further, although the invention of Patent Literature 4 is excellent in heat-dimensional stability, the product of this invention becomes soft when heated (low heat resistance). Therefore, the increase in temperature creates a risk of decreasing rigidity.

Accordingly, it is a further object of the present invention to provide thermoplastic resin foam granules having excellent heat resistance.

Solution to Problem

As a result of intensive studies by the present inventors, it has been found that a mixture of a crystalline polyester resin and an amorphous polyester resin is not sufficiently compatibilized, so that when the temperature reaches the lower one of the glass transition temperatures of the two polyester resins, softening occurs resulting in deformation. Based on this finding, the present inventors has found that the heat resistance can be enhanced by including two types of highly compatible resins. In addition, based on the above finding, the present inventors have also found that when a thermoplastic resin foam layer and a fiber-reinforced resin layer containing a fiber-reinforced resin are combined to form a fiber-reinforced resin composite, the heat resistance of such a fiber-reinforced resin composite can be enhanced. Based on these findings, the present invention has been completed.

That is, the embodiments of the present invention are as follows.

<1>

A thermoplastic resin foam including a thermoplastic resin, wherein:

the thermoplastic resin includes a polyester resin and a polyimide resin, and the thermoplastic resin foam shows a single glass transition temperature Tg.

<2>

The thermoplastic resin foam according to <1>, wherein the glass transition temperature Tg is 80 to 130° C., preferably 85 to 125° C., more preferably 90 to 120° C.

<3>

The thermoplastic resin foam according to <1> or <2>, wherein an absolute value of difference between heat absorption and heat generation, each determined by heat flux differential scanning calorimetry at a heating rate of 10° C./min, is 3 to 35 J/g, preferably 5 to 30 J/g, more preferably 7 to 28 J/g.

<4>

The thermoplastic resin foam according to any one of <1> to <3>, wherein:

the polyester resin is present in an amount of 40 to 95% by mass, preferably 50 to 90% by mass, more preferably 60 to 80% by mass, based on a total mass of the thermoplastic resin; and the polyimide resin is present in an amount of 5 to 60% by mass, preferably 10 to 50% by mass, more preferably 20 to 40% by mass, based on a total mass of the thermoplastic resin.

<5>

The thermoplastic resin foam according to any one of claims 1 to 4, wherein a slope of an exponential approximation formula for storage elastic modulus E' between the glass transition temperature Tg and the glass transition temperature Tg+20° C. in a solid viscoelasticity measurement at a heating rate of 5° C./min and a frequency of 1 Hz is −0.18 to −0.025, preferably −0.15 to −0.030, more preferably −0.10 to −0.035.

<6>

The thermoplastic resin foam according to any one of <1> to <4>, wherein the polyimide resin is a polyetherimide resin.

<7>

The thermoplastic resin foam according to any one of <1> to <4>, wherein the polyester resin includes a plant-derived polyester resin.

<8>

The thermoplastic resin foam according to any one of <1> to <4>, wherein the thermoplastic resin includes a recycled raw material.

<9>

The thermoplastic resin foam according to <5>, wherein the polyimide resin is a polyetherimide resin.

<10>

The thermoplastic resin foam according to <5> or <9>, wherein the polyester resin includes a plant-derived polyester resin.

<11>

The thermoplastic resin foam according to any one of <5>, <9> and <10>, wherein the thermoplastic resin includes a recycled raw material.

<12>

The thermoplastic resin foam according to any one of <1> to <4> and <6> to <8>, which is granular.

<13>

The thermoplastic resin foam according to <12>, wherein a temperature at which a loss tangent tan δ in solid viscoelasticity measurement at a heating rate of 5° C./min and a frequency of 1 Hz is maximized is 120 to 230° C., preferably 130 to 225° C., more preferably 150 to 220° C.

<14>

The thermoplastic resin foam according to any one of <1> to <11>, which is in the form of a sheet.

<15>

A thermoplastic resin foam sheet having a layer of the thermoplastic resin foam of <14>.

<16>

A fiber reinforced resin composite including:

a thermoplastic resin foam layer which is the thermoplastic resin foam of <14> in the form of a sheet; and a fiber-reinforced resin layer provided on one side or both sides of the thermoplastic resin foam layer.

<17>

A thermoplastic resin foam sheet for a fiber reinforced resin composite used for forming a thermoplastic resin foam layer in a fiber reinforced resin composite including the thermoplastic resin foam layer of <14> in the form of a sheet, and a fiber reinforced resin layer provided on one side or both sides of the thermoplastic resin foam layer.

<18>

A method for producing the thermoplastic resin foam of any one of <1> to <11> and <14> which includes a step of extruding and foaming a thermoplastic resin composition including the thermoplastic resin and a blowing agent to obtain a thermoplastic resin foam.

<19>

The method according to <18>, wherein the thermoplastic resin composition further includes a cross-linking agent.

<20>

The method according to <18> or <19>, wherein the foam is in the form of granules.

<21>

A thermoplastic resin foam-molded product including a thermoplastic resin, wherein:

- the thermoplastic resin includes a polyester resin and a polyimide resin, and
- the thermoplastic resin foam-molded product shows a single glass transition temperature Tg.

<22>

The thermoplastic resin foam-molded product according to <21>, wherein the glass transition temperature Tg is 80 to 130° C., preferably 85 to 125° C., more preferably 90 to 120° C.

<23>

The thermoplastic resin foam-molded product according to <21> or <22>, wherein an absolute value of difference between heat absorption and heat generation, each determined by heat flux differential scanning calorimetry at a heating rate of 10° C./min, is 3 to 35 J/g, preferably 5 to 30 J/g, more preferably 7 to 28 J/g.

<24>

The thermoplastic resin foam-molded article according to any one of claims<21> to <23>, wherein an amount of the polyester resin is 40 to 95% by mass, preferably 50 to 90% by mass, more preferably 60 to 80% by mass, and an amount of the polyimide resin is 5 to 60% by mass, preferably 10 to 50% by mass, more preferably 20 to 40% by mass, each based on a total mass of the thermoplastic resin.

<25>

The thermoplastic resin foam-molded product according to any one of <21> to <24>, wherein a slope of an exponential approximation formula for storage elastic modulus E' between the glass transition temperature Tg and the glass transition temperature Tg+20° C. in a solid viscoelasticity measurement at a heating rate of 5° C./min and a frequency of 1 Hz is −0.18 to −0.025, preferably −0.15 to −0.030, more preferably −0.10 to −0.035.

<26>

The thermoplastic resin foam-molded product according to any one of <21> to <24>, wherein the polyimide resin is a polyetherimide resin.

<27>

The thermoplastic resin foam-molded product according to any one of <21> to <24>, wherein the polyester resin includes a plant-derived polyester resin.

<28>

The thermoplastic resin foam-molded product according to any one of <21> to <24>, wherein the thermoplastic resin includes a recycled raw material.

<29>

The thermoplastic resin foam-molded product according to any one of <21> to <24> and <26> to <28>, wherein a temperature at which a loss tangent tan δ in solid viscoelasticity measurement at a heating rate of 5° C./min and a frequency of 1 Hz is maximized is 120 to 230° C., preferably 130 to 225° C., more preferably 150 to 220° C.

<30>

The thermoplastic resin foam-molded product according to <25>, wherein the polyimide resin is a polyetherimide resin.

<31>

The thermoplastic resin foam-molded product according to <25> or <30>, wherein the polyester resin includes a plant-derived polyester resin.

<32>

The thermoplastic resin foam-molded product according to any one of <25>, <30> and <31>, wherein the thermoplastic resin includes a recycled raw material.

<33>

The thermoplastic resin foam-molded product according to any one of <21> to <32>, which is a food packaging container.

<34>

The thermoplastic resin foam-molded product according to any one of <21> to <33>, which is a microwave oven safe container.

<35>

A method for producing a resin foam-molded product, including a step of obtaining the thermoplastic resin foam of any one of <1> to <11> and <14>, and a step of molding the thermoplastic resin foam to obtain a thermoplastic resin foam-molded product.

<36>

A method for producing a thermoplastic resin foam-molded product, including: obtaining the thermoplastic resin foam granules by the method of <20>; filling the obtained thermoplastic resin foam granules into a cavity of a mold; heating the thermoplastic resin foam granules in the cavity to form secondary foam granules; and heat-fusing the secondary foam granules each other to obtain a thermoplastic resin foam-molded product.

<37>

A foamed resin composite, including the thermoplastic resin foam-molded product of any one of <21> to <24> and <26> to <29>, and a fiber-reinforced resin layer provided on at least part of a surface of the thermoplastic resin foam-molded product.

Advantageous Effects of Invention

The present invention can provide a thermoplastic resin foam and a fiber-reinforced resin composite including a foam sheet or foam granules with improved heat resistance.

DESCRIPTION OF EMBODIMENTS

In the context of the present specification, "to" indicating a numerical range means that the numerical values described before and after "to" are included as the lower limit and the upper limit of the range.

The thermoplastic resin foam of the present invention (hereinafter also simply referred to as "foam") is formed by foaming a thermoplastic resin composition (hereinafter also simply referred to as "resin composition") containing a thermoplastic resin and a blowing agent. The foam may be in the form of a sheet, a rod or granules. On a part or all of the surface of the foam, a non-foam resin layer may be provided.

For example, the sheet-like foam may be a single-layered sheet consisting only of a foam layer of the foam, or may be a thermoplastic resin laminated foam sheet formed by providing a non-foam layer on one or both sides of the foam layer (hereinafter also simply referred to as "laminated foam sheet").

Hereinafter, the single-layered sheet consisting only of a foam layer of the sheet-like foam and the laminated foam sheet including such a single-layered sheet may be collectively referred to as a "thermoplastic resin foam sheet" (foam sheet). The single-layered sheet consisting only of a foam layer encompasses a foam sheet composed of a single foam layer and a foam sheet composed only of two or more foam layers.

The foam layer of the present invention may be produced from the foam sheet, or may be produced from the foam granule-molded product described later.

Hereinbelow, the present invention are described with reference to embodiments of the present invention.

First Embodiment of Foam

Explanations are given below with respect to the foam according to the first embodiment of the present invention. The foam of the present embodiment is a sheet-like foam (foam sheet).

Figure 1:
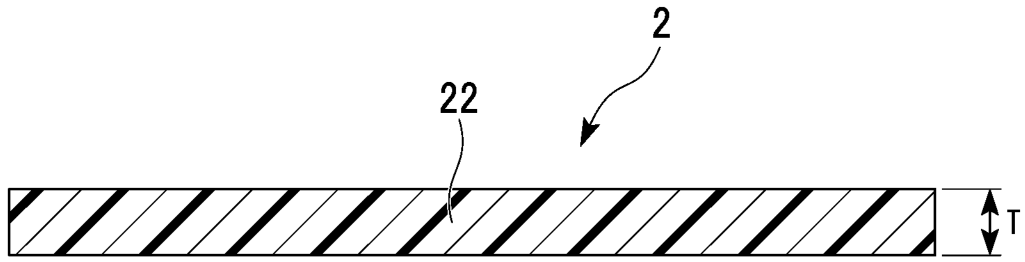
FIG. 1 is a cross-sectional view showing an example of the thermoplastic resin foam according to the first embodiment.

The foam sheet 2 shown in FIG. 1 is used as a raw material sheet for a thermoplastic resin foam-molded product (hereinafter also simply referred to as a "resin foam-molded product") or a flat cushioning material. Examples of resin foam-molded products include containers such as thermoformed products, air pressure-formed products, and deep draw-molded products.

FIG. 1 is a cross-sectional view of the foam sheet 2 of the present embodiment. The foam sheet 2 is composed of a single foam layer 22.

The thickness T of the foam sheet 2 can be set in consideration of application. For example, when the foam sheet 2 is for container molding, the thickness T is preferably 0.3 to 5.0 mm, more preferably 0.4 to 3.0 mm, even more preferably 0.5 to 2.5 mm. When the thickness T is not less than the lower limit value described above, the impact resistance and rigidity of the container can be enhanced. When the thickness T is not more than the upper limit value described above, the moldability of the foam sheet 2 can be enhanced.

The thickness T can be measured using, for example, a dial thickness gauge.

The foam layer 22 is formed by foaming a thermoplastic resin composition.

The thermoplastic resin composition includes a thermoplastic resin and a blowing agent. The foam layer 22 formed by foaming the thermoplastic resin composition has two or more cells in a matrix formed of the thermoplastic resin.

<Thermoplastic Resin>

The thermoplastic resin of the foam layer 22 includes a polyester resin and a polyimide resin. The presence of both the polyester resin and the polyimide resin improves the heat resistance of the foam sheet 22 of the present embodiment.

<<Polyester Resin>>

Examples of polyester resins include polyethylene terephthalate resin (PET), polybutylene terephthalate resin (PBT), polyethylene naphthalate resin (PEN), polyethylene furanoate resin (PEF), polybutylene naphthalate resin (PBN), polytrimethylene terephthalate resin (PTT), copolymers of terephthalic acid, ethylene glycol and cyclohexanedimethanol, and mixtures thereof. As the polyester resin, polyethylene terephthalate resin is preferable, and crystalline polyethylene terephthalate resin (C-PET) is more preferable. C-PET is a polyester resin with its acid component being terephthalic acid and its glycol component being ethylene glycol.

The polyester resin may be a petrochemical-derived polyester resin, a plant-derived polyester resin such as so-called bio-PET, or a mixture thereof.

Examples of plant-derived polyester resins include polyethylene terephthalate resin, plant-derived polyethylene furanoate resin, and plant-derived polytrimethylene terephthalate resin.

Further, the polyester resin may be a recycled raw material.

One of these polyester resins may be used alone, or two or more thereof may be used in combination.

Explanations are given below with respect to the plant-derived polyester resins.

Plant-derived polyester resins are polymers derived from plant raw materials such as sugar cane and corn. The expression "derived from plant raw materials" is intended to include polymers synthesized or extracted from plant materials. Further, for example, the expression "derived from plant raw materials" is also intended to include polymers obtained by polymerizing monomers synthesized or extracted from plant raw materials. The "monomers synthesized or extracted from plant raw materials" encompass monomers synthesized from compounds synthesized or extracted from plant raw materials. The plant-derived polyester resins encompass those in which a part of the monomers is "derived from plant raw materials".

Explanations are given below with respect to the plant-derived polyester resins, taking PET and PEF as examples.

The synthesis reaction of PET is shown in formula (1). PET is synthesized by a dehydration reaction between n moles of ethylene glycol and n moles of terephthalic acid (benzene-1,4-dicarboxylic acid). The stoichiometric mass ratio in this synthesis reaction is ethylene glycol:terephthalic acid=30:70 (mass ratio).

(1)

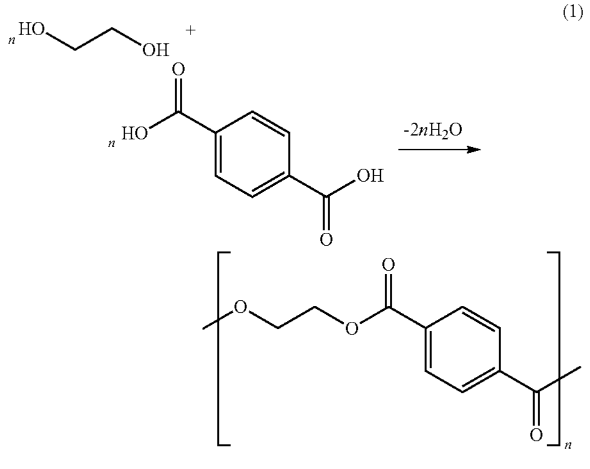

In the formula (1), n is a stoichiometric coefficient (polymerization degree) and is a number of 250 to 1,100.

Ethylene glycol is produced industrially by oxidizing and hydrating ethylene. On the other hand, terephthalic acid is industrially produced by oxidizing paraxylene.

Figure 2:
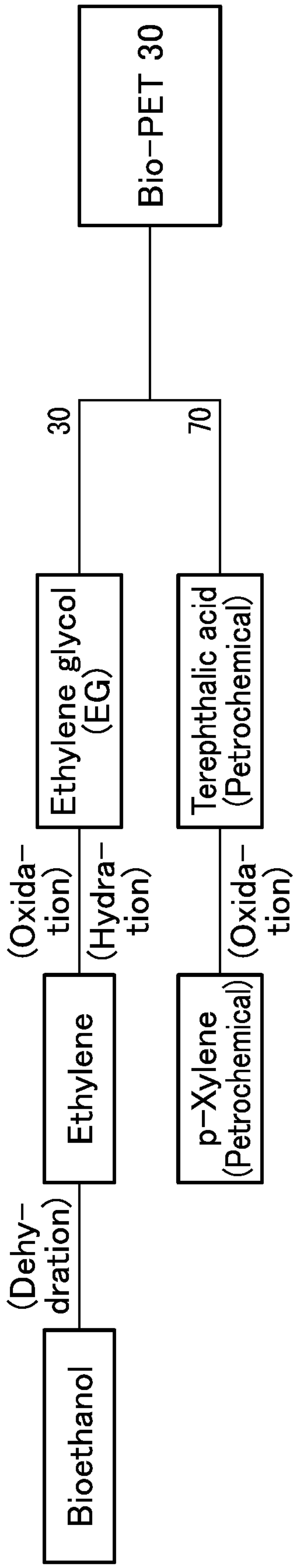
FIG. 2 is a flow chart showing an example of a process for producing a plant-derived polyester resin.

In this context, when, as shown in FIG. 2, ethylene is obtained by dehydration reaction of plant-derived ethanol (bioethanol), and PET is synthesized from ethylene glycol synthesized from this ethylene (ethylene glycol derived from bioethanol) and terephthalic acid derived from petrochemicals, the PET produced is a 30% by mass plant-derived PET.

Figure 3:
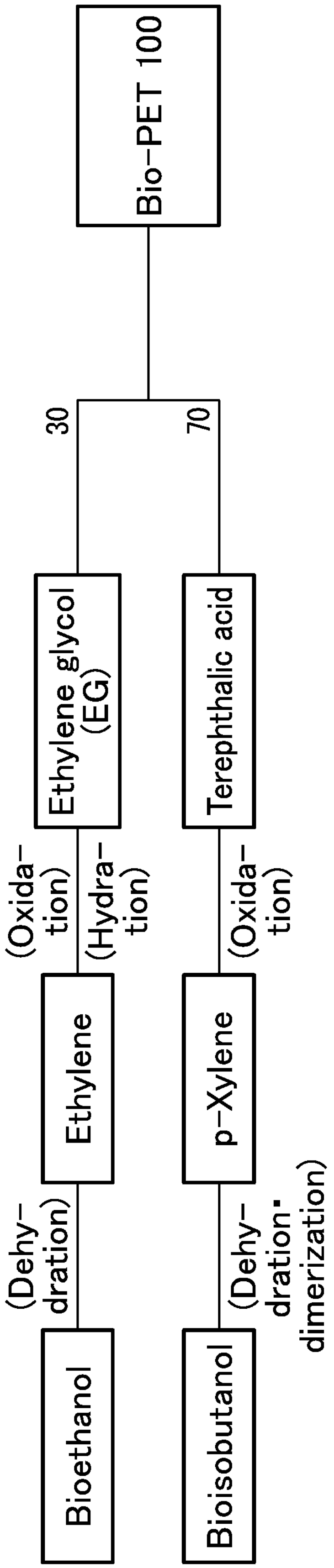
FIG. 3 is a flow chart showing an example of a process for producing a plant-derived polyester resin.

Further, when, as shown in FIG. 3, paraxylene is obtained by dehydration reaction of plant-derived isobutanol (bio-isobutanol), and PET is synthesized from terephthalic acid synthesized from this paraxylene and ethylene glycol derived from bioethanol, the PET produced is a 100% by mass plant-derived PET.

The synthesis reaction of PEF is shown in formula (2). PEF is synthesized by a dehydration reaction of n moles of ethylene glycol and n moles of furandicarboxylic acid (2,5-furandicarboxylic acid).

(2)

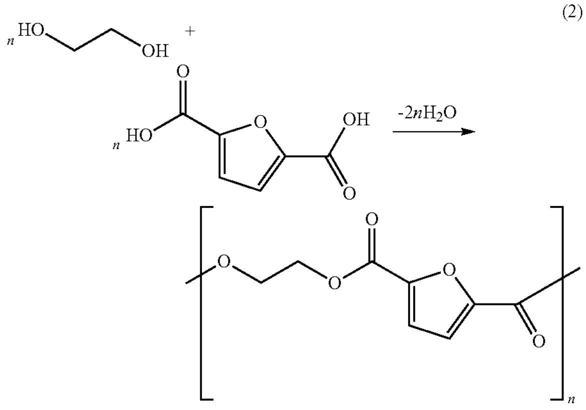

In the formula (2), n is a stoichiometric coefficient (polymerization degree) and is a number of 250 to 1,100.

Furandicarboxylic acid (FDCA) is obtained, for example, by dehydrating plant-derived fructose or glucose to obtain hydroxymethylfurfural (HMF) and oxidizing the HMF.

Figure 4:
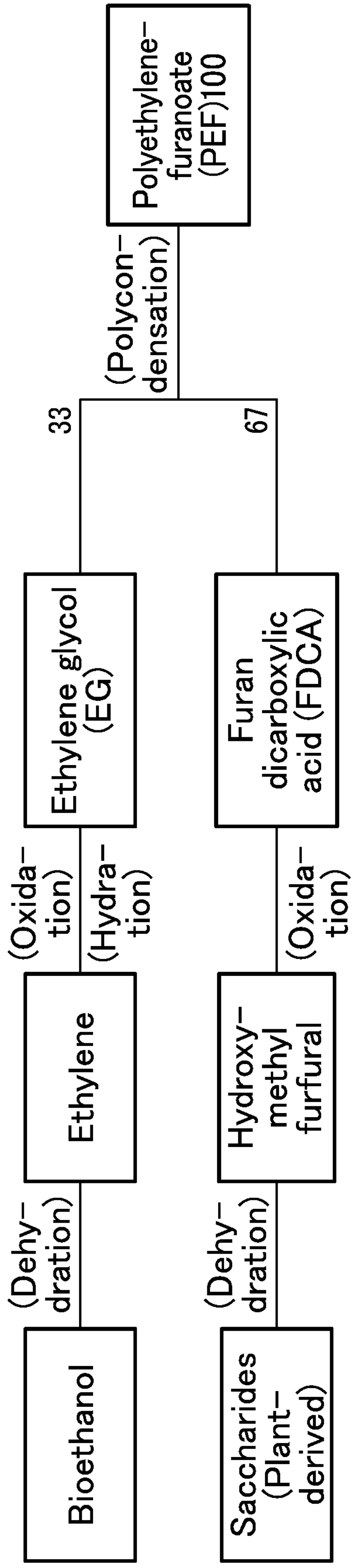
FIG. 4 is a flow chart showing an example of a process for producing a plant-derived polyester resin.

As shown in FIG. 4, when both FDCA and ethylene glycol are plant-derived, the PEF produced is a 100% by weight plant-derived PEF.

The glass transition temperature Tg1 of the polyester resin is preferably 50 to 100° C., more preferably 60 to 90° C., even more preferably 70 to 85° C. When the Tg1 is not less than the lower limit value described above, heat resistance and heat-dimensional stability can be further enhanced. When the Tg1 is not more than the upper limit value described above, the molding cycle can be shortened to improve productivity, and the moldability can be improved. In this context, the expression "moldability" means that, for example, when the foam sheet is sandwiched between mold halves and thermoformed, the shape of the foam sheet changes following the cavity of the mold to get closer a desired shape. The closer the shape of the resulting foam sheet is to a desired shape, the better the moldability.

The glass transition temperature Tg1 of the polyester resin is determined by heat flux differential scanning calorimetry (DSC) in the second run of heating process performed with a heating rate of 10° C./min.

The melting point of the polyester resin is preferably 230 to 270° C., more preferably 240 to 260° C., even more preferably 245 to 255° C. When the melting point is not less than the lower limit value described above, heat resistance and heat-dimensional stability can be further enhanced. When the melting point is not more than the upper limit value described above, the molding cycle can be shortened to improve productivity, and the moldability can be improved.

The intrinsic viscosity (IV value) of the polyester resin is preferably 0.5 to 1.5, more preferably 0.6 to 1.3, even more preferably 0.7 to 1.2. When the IV value is not less than the lower limit value described above, breakage of foam during foaming is suppressed, and the open cell ratio can be further reduced. When the IV value is not more than the upper limit value described above, the density can be further decreased to increase the surface smoothness and enhance the excellent appearance.

The IV value can be measured by the method of JIS K 7367-5 (2000).

The number average molecular weight Mn of the polyester resin is preferably 9,000 to 26,000, more preferably 15,000 to 26,000, even more preferably 20,000 to 25,000.

When the Mn is not less than the lower limit value described above, the cold resistance (i.e., mechanical strength at low temperatures) can be further enhanced. When the Mn is not more than the upper limit value described above, the heat resistance can be further enhanced.

The Z-average molecular weight Mz of the polyester resin is preferably 100,000 to 500,000, more preferably 150,000 to 450,000, even more preferably 200,000 to 400,000.

When the Mz is within the above range, the cold resistance (i.e., mechanical strength at low temperatures) can be further enhanced Mn and Mz can be measured by the following methods.

[Molecular Weight of Polyester Resin]

5 mg of a sample is taken from a measurement target, to which 0.5 mL of hexafluoroisopropanol (HFIP) and 0.5 mL of chloroform are added in this order, followed by gentle manual shaking. The resulting is left to stand with an immersion time of 24±1.0 hr. After confirming that the sample is completely dissolved, the resulting is diluted to 10 mL with chloroform, followed by mixing through gentle manual shaking. Then, the resulting is filtered through a non-aqueous 0.45 μm chromatodisc manufactured by GL Sciences, Inc. or a non-aqueous 0.45 μm syringe filter manufactured by Shimadzu GLC Ltd. to obtain a measurement sample. The measurement sample is subjected to measurement with a chromatograph under the following measurement conditions, and the number average molecular weight Mn and the Z average molecular weight Mz of the sample are obtained from a standard polystyrene calibration curve prepared in advance.

(Measuring Device)

Measuring device="HLC-8320GPC EcoSEC" manufactured by Tosoh Corporation, gel permeation chromatograph (with built-in RI detector and UV detector) (GPC Measurement Conditions)

Column

<Sample Side>

Guard column=TSK guard column HXL-H (6.0 mm×4.0 cm) manufactured by Tosoh Corporation×1 column Measurement column=TSKgel GMHXL (7.8 mm I.D.×30 cm) manufactured by Tosoh Corporation×2 in series <Reference Side>

Resistance tube (inner diameter 0.1 mm×2 m)×2 in series

Column temperature=40° C.

Mobile phase=chloroform

<Mobile Phase Flow Rate>

Sample-side pump=1.0 mL/min

Reference-side pump=0.5 mL/min

Detector=UV detector (254 nm)

Injection volume=15 μL

Measurement time=26 min

Sampling pitch=500 ins

[Standard Polystyrene Samples for Calibration Curve]

The standard polystyrene samples to be used for calibration curve are those with mass average molecular weights Mw of U.S. Pat. Nos. 5,620,000, 3,120,000, 1,250,000, 442,000, 131,000, 54,000, 20,000, 7,590, 3,450 and 1,320, selected from products with product names "STANDARD SM-105" and "STANDARD SH-75" manufactured by Showa Denko K.K.

The standard polystyrene samples for calibration curve is divided into group A (5,620,000, 1,250,000, 131,000, 20,000, and 3,450) and group B (3,120,000, 442,000, 54,000, 7,590, and 1,320). The group A samples are weight out (2 mg, 3 mg, 4 mg, 4 mg, and 4 mg) and dissolved in 30 mL of chloroform. The group B samples are weighed out (3 mg, 4 mg, 4 mg, 4 mg, and 4 mg) and dissolved in 30 mL of chloroform. A standard polystyrene calibration curve is obtained by preparing a calibration curve (cubic equation) from the retention times obtained after measurement carried out following injection of 50 μL of each of the prepared A and B solutions. Using the obtained calibration curve, the number average molecular weight Mn and the Z average molecular weight Mz are calculated.

The proportion of the polyester resin is preferably 40 to 95% by mass, more preferably 50 to 90% by mass, even more preferably 60 to 80% by mass, based on to the total mass of the thermoplastic resin contained in the foam sheet 2. When the proportion of the polyester resin is not less than the lower limit value described above, the moldability can be enhanced. When the proportion of the polyester resin is not more than the upper limit value described above, the heat resistance can be further enhanced.

<<Polyimide Resin>>

The polyimide resin is not particularly limited, but is preferably a polymer containing cyclic imide groups as repeating units, and is preferably a polymer having melt moldability.

Examples of polyimide resins include polyetherimides described in U.S. Pat. No. 4,141,927, Japanese Patent No. 2622678, Japanese Patent No. 2606912, Japanese Patent No. 2606914, Japanese Patent No. 2596565, Japanese Patent No. 2596566, Japanese Patent No. 2598478, etc., and polymers described in Japanese Patent No. 2598536, Japanese Patent No. 2599171, Japanese Patent Application Unexamined Publication No. Hei 9-48852, Japanese Patent No. 2565556, Japanese Patent No. 2564636, Japanese Patent No. 2564637, Japanese Patent No. 2563548, Japanese Patent No. 2563547, Japanese Patent No. 2558341, Japanese Patent No. 2558339, and Japanese Patent No. 2834580. As long as the effects of the present invention are not impaired, the main chain of the polyimide resin may contain structural units other than cyclic imide. Examples of structural units other than cyclic imides include aromatic, aliphatic, alicyclic and alicyclic ester units, and oxycarbonyl units.

Further, the polyimide resin may be a recycled raw material.

One of these polyimide resins may be used alone, or two or more thereof may be used in combination.

The polyimide resin is preferably, for example, a compound represented by the following formula (3).

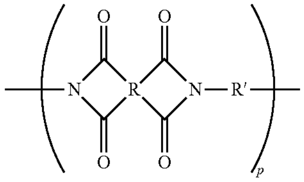

(3)

In the formula (3), R is an aromatic group having 6 to 42 carbon atoms, R' is at least one divalent organic group selected from the group consisting of a divalent aromatic group having 6 to 30 carbon atoms, an aliphatic group having 2 to 30 carbon atoms, and an alicyclic group having 4 to 30 carbon atoms, and p represents a number of repeating units, which ranges from 5 to 100.

As the polyimide resin, a polyetherimide resin having a structural unit having an ether bond is preferable in terms of enhancing compatibility with the polyester resin.

The polyimide resin can be prepared by a conventionally known production method. For example, the polyimide resin can be obtained by dehydration condensation of one or both of tetracarboxylic acid and its acid anhydride, which are raw materials from which R in formula (3) can be derived, and at least one compound selected from the group consisting of primary aliphatic diamines and primary aromatic diamines, which are raw materials from which R' in formula (3) can be derived. Specific examples of the method for producing a polyimide resin include a method in which a polyamic acid is prepared and then subjected to ring-closure by heating. Alternative examples of the method include a method in which chemical ring closure is performed using an acid anhydride and a chemical ring-closing agent such as pyridine or carbodiimide, and a method in which the above tetracarboxylic acid anhydride and a diisocyanate capable of providing the above R' are heated to allow decarboxylation and polymerization to proceed.

Examples of tetracarboxylic acids include pyromellitic acid, 1,2,3,4-benzenetetracarboxylic acid, 3,3',4,4'-biphenyltetracarboxylic acid, 2,2',3,3'-biphenyltetracarboxylic acid, 3,3',4,4'-benzophenonetetracarboxylic acid, 2,2',3,3'-benzophenonetetracarboxylic acid, bis(2,3-dicarboxyphenyl)methane, bis(3,4-dicarboxyphenyl)methane, 1,1'-bis(2,3-dicarboxyphenyl)ethane, 2,2'-bis(3,4-dicarboxyphenyl)propane, 2,2'-bis(2,3-dicarboxyphenyl)propane, bis(3,4-dicarboxyphenyl)ether, bis(2,3-dicarboxyphenyl)ether, bis(3,4-dicarboxyphenyl)sulfone, bis(2,3-dicarboxyphenyl)sulfone, 2,3,6,7-naphthalenetetracarboxylic acid, 1,4,5,8-naphthalenetetracarboxylic acid, 1,2,5,6-naphthalenetetracarboxylic acid, 2,2'-bis[(2,3-dicarboxyphenoxy)phenyl]propane and acid anhydrides thereof.

Examples of diamines include benzidine, diaminodiphenylmethane, diaminodiphenylethane, diaminodiphenylpropane, diaminodiphenylbutane, diaminodiphenyl ether, diaminodiphenylsulfone, diaminodiphenylbenzophenone, o,m,p-phenylenediamine, tolylenediamine, xylenediamine, etc., and aromatic primary diamines having hydrocarbon groups of the above-mentioned aromatic primary diamines as structural units; and ethylenediamine, 1,2-propanediamine, 1,3-propanediamine, 2,2-dimethyl-1,3-propanediamine, 1,6-hexamethylenediamine, 1,8-octamethylenediamine, 1,9-nonamethylenediamine, 1,10-decamethylenediamine, 1,11-undecamethylenediamine, 1,12-dodecamethylenediamine, 2,2,4-trimethylhexamethylenediamine, 2,4,4-trimethylhexamethylenediamine, 1,3-cyclohexanediamine, 1,4-cyclohexanediamine, 1,4-cyclohexanedimethylamine, 2-methyl-1,3-cyclohexanediamine, isophoronediamine, etc., and aliphatic and alicyclic primary diamines having hydrogen groups of the above-mentioned aliphatic and alicyclic primary diamines as structural units.

The glass transition temperature Tg2 of the polyimide resin is preferably 190 to 240° C., more preferably 200 to 230° C., even more preferably 210 to 220° C. When the Tg2 is not less than the lower limit value described above, the heat resistance and the heat-dimensional stability can be further enhanced. When the Tg2 is not more than the upper limit value described above, the molding cycle can be shortened to improve productivity, and the moldability can be improved.

The glass transition temperature Tg2 of the polyimide resin can be determined by the same method as for the glass transition temperature Tg1 of the polyester resin.

The melt flow rate (MFR) of the polyimide resin is preferably 3 to 30 g/10 min, more preferably 5 to 25 g/10 min, even more preferably 7 to 20 g/10 min. When the MFR is not less than the lower limit value described above, the molding cycle can be shortened to improve productivity, and the moldability can be improved. When the MFR is not more than the upper limit value described above, heat resistance and heat-dimensional stability can be further enhanced.

In the context of the present specification, MFR is a value measured at 337° C. and 6.6 kgf, and can be measured according to the method prescribed in ASTM D1238.

The number average molecular weight of the polyimide resin is preferably 5,000 to 50,000, more preferably 6,000 to 39,000, even more preferably 7,000 to 27,000. When the number average molecular weight of the polyimide resin is not less than the lower limit value described above, the impact resistance can be further enhanced. When the number average molecular weight of the polyimide resin is not more than the upper limit value described above, the moldability can be further enhanced.

The number average molecular weight of the polyimide resin is determined by gel permeation chromatography (GPC) using polyethylene oxide as a standard substance.

The proportion of the polyimide resin is preferably 5 to 60% by mass, more preferably 10 to 50% by mass, even more preferably 20 to 40% by mass, based on the total mass of the thermoplastic resin contained in the foam sheet 2. When the proportion of the polyimide resin is not less than the lower limit value described above, the heat resistance strength can be further enhanced. When the proportion of the polyimide resin is not more than the upper limit value described above, the moldability can be further enhanced.

When it is necessary to grasp the proportion of the polyimide resin in the foam sheet 2, the proportion of the polyimide resin can be measured by, for example, the following method.

The foam sheet 2 is sliced along the direction (plane direction) orthogonal to the thickness direction of the foam sheet 2 to prepare a thin sample (for example, a sample with a thickness of 0.2 mm).

The proportion of the polyimide resin is measured with respect to this sample. Hereinbelow, the measuring method is illustrated on the proportion of the polyimide resin, based on the total mass of the resin mixture of the polyester resin and the polyimide resin. In the measuring method described below, polyethylene terephthalate (PET) is used as the polyester resin, and polyetherimide (PEI) is used as the polyimide resin.

[Method for Measuring Proportion of Polyimide Resin]

From the surface of the foam sheet 2, 0.2 mm is sliced along the direction (planar direction) orthogonal to the thickness direction to obtain a measurement sample. The surface of the measurement sample is subjected to infrared spectroscopic analysis (IR) under the following conditions to obtain an infrared absorption spectrum.

Measuring device: Fourier transform infrared spectrophotometer "Nicolet iS10" manufactured by Thermo SCIENTIFIC and single-reflection horizontal ATR "Smart-iTR" manufactured by Thermo SCIENTIFIC ATR crystal: diamond-attached KRS-5 (angle=42°)

Measurement method: single-reflection ATR method

Measurement wavenumber range: 4000 $cm^{-1}$ to 400 $cm^{-1}$

Wavenumber dependence of measurement depth: not corrected

Detector: deuterated triglycine sulfate (DTGS) detector and KBr beam splitter

Resolution: 4 $cm^{-1}$

Integration number: 16 times (same for background measurement)

From the obtained infrared absorption spectrum chart, the peak heights of D1410 and D1778 are obtained, and the polyimide resin content is calculated from the following formula (p) obtained from the calibration curve prepared using the standard samples.

$$\text{Polyimide resin content (\% by mass)}=100-\{19.00\ \ln(R)+37.95\}\times 100 \quad \text{(p)},$$

wherein R=D1410/D1778.

D1410 means the maximum absorbance difference from the baseline of an infrared absorption spectrum curve in the region of the wave number 1410 $cm^{-1}$±5 $cm^{-1}$, which is ascribed to the polyester resin (i.e., measured absorbance-baseline absorbance). The baseline is a straight line connecting the lowest absorption position at the wave number 1400 $cm^{-1}$±5 $cm^{-1}$ in the infrared absorption spectrum curve, and the lowest absorption position at the wave number 1420 $cm^{-1}$±5 $cm^{-1}$ in the infrared absorption spectrum curve.

Further, D1778 means the maximum absorbance difference from the baseline of the infrared absorption spectrum curve in the region of the wave number 1778 $cm^{-1}$±5 $cm^{-1}$, which is ascribed to the polyimide resin (i.e., measured absorbance-baseline absorbance). The baseline is a straight line connecting the lowest absorption position at the wave number 1760 $cm^{-1}$±5 $cm^{-1}$ in the infrared absorption spectrum curve, and the lowest absorption position at the wave number 1800 $cm^{-1}$±5 $cm^{-1}$ in the infrared absorption spectrum curve.

The standard samples can be prepared as follows.

[Preparation of Standard Samples]

First, according to the formulation shown in Table 1, a polyester resin (PET: trade name "CH-653" manufactured by Far Eastern New Century) and a polyimide resin (PEI: trade name "Ultem 1000" manufactured by SABIC Innovative Plastics) and pyromellitic anhydride (PMDA) are mixed to prepare a mixture. This mixture is fed into a Labo Plastomill twin-screw extruder (model: 2DC15W, manufactured by Toyo Seiki Seisaku-sho, Ltd., opening diameter 15 mm, L/D=17) and melt-kneaded at 350° C. to form a resin composition. This resin composition is extruded from a nozzle die (3.0 mm in diameter) attached to the front end of the Labo Plastomill twin-screw extruder. The extruded resin composition is immediately cooled in a cooling water bath. Then, after sufficiently draining the cooled strand-shaped resin composition, a pelletizer is used to cut the strand into small granules having a length of about 2 mm and a diameter of about 3 mm to prepare standard samples (A to I).

Table 1 shows the compositions of the standard samples (A to I).

TABLE 1

| Standard sample | | | A | B | C | D | E | F | G | H | I |
|---|---|---|---|---|---|---|---|---|---|---|---|
| Polyester resin | CH-653 | % by mass | 90 | 80 | 70 | 60 | 50 | 40 | 30 | 20 | 10 |
| Polyimide resin | Ultem1000 | % by mass | 10 | 20 | 30 | 40 | 50 | 60 | 70 | 80 | 90 |
| Cross-linking agent | PMDA | Part by mass | 0.225 | 0.200 | 0.175 | 0.150 | 0.125 | 0.100 | 0.075 | 0.050 | 0.025 |

The above calibration curve is prepared as follows.

[Preparation of Calibration Curve]

The surfaces of the reference samples (A to I) are subjected to infrared spectroscopic analysis under the following conditions to obtain infrared absorption spectra.

Measuring device: Fourier transform infrared spectrophotometer "Nicolet iS10" manufactured by Thermo SCIENTIFIC and single-reflection horizontal ATR "Smart-iTR" manufactured by Thermo SCIENTIFIC ATR crystal: diamond-attached KRS-5 (angle=42°)

Measurement method: single-reflection ATR method

Measurement wavenumber range: 4000 $cm^{-1}$ to 400 $cm^{-1}$

Wavenumber dependence of measurement depth: not corrected

Detector: deuterated triglycine sulfate (DTGS) detector and KBr beam splitter

Resolution: 4 $cm^{-1}$

Integration number: 16 times (same for background measurement)

Number of measurements: 10 times

From the infrared absorption spectrum charts obtained in the measurements, the peak heights of D1410 and D1778 are determined by implementing the data processing in the same manner as for determining the proportion of the polyimide resin, and the absorbance ratios (R=D1410/D1778) are calculated. The mixing ratios of the polyester resin are plotted against the absorbance ratios of the standard samples (A to I), and the logarithmic approximation formula in the plots is used as a calibration curve.

The thermoplastic resin contained in the foam sheet 2 may contain recycled raw materials. Either one of the polyester resin and the polyimide resin may contain the recycled raw materials, or both of the polyester resin and the polyimide resin may contain the recycled raw materials. Part or all of the polyester resin may be a recycled polyester resin material, and part or all of the polyimide resin may be a recycled polyimide resin material.

Examples of recycled raw materials include the following raw materials.

1) Recovered pellets obtained by remelting resin flakes obtained by pulverizing a foam with an extruder and extruding the resulting melt into a strand from a nozzle die, which is then cooled and pelletized. (In this context, the term "foam" refers to a "rod-shaped foam" in the case of the second embodiment described later, "foam granules" in the case of the third embodiment described later, and a "foam layer" in the case of the fourth to seventh embodiments, the fiber-reinforced resin composite, and the foamed resin composite.)
2) Recycled PET obtained by remelting resin flakes obtained by pulverizing a PET bottle with an extruder and extruding the resulting melt into a strand from a nozzle die, which is then cooled and pelletized.

<<Other Resins>>

The foam sheet 2 is substantially free of a thermosetting resin. In this context, the expression "substantially free of" means that a thermosetting resin is not included at all or included in such an amount that the quality of the foam sheet 2 is not affected. The amount of the thermosetting resin contained in the foam sheet 2 is preferably 5 parts by mass or less, more preferably 2 parts by mass or less, even more preferably 1 part by mass or less, and most preferably 0 mass parts by mass, with respect to 100 parts by mass of the thermoplastic resin.

The thermoplastic resin may include thermoplastic resins (other thermoplastic resins) other than polyester resins and polyimide resins. Examples of other thermoplastic resins include polyolefin resins such as polyethylene and polypropylene, polystyrene resins, polyphenylene ether resins, polyamide resins, polycarbonate resins, polyarylate resins, polyphenylsulfone resins, polysulfone resins, and polyethersulfone resins.

The proportion of the sum of the polyester resin content and the polyimide resin content is preferably 90% by mass or more, more preferably 95% by mass or more, even more preferably 98% by mass or more, most preferably 100% by mass, based on the total mass of the thermoplastic resin. The proportion of the sum of the polyester resin content and the polyimide resin content is not less than the lower limit value described above, the heat resistance of the foam sheet 2 can be further enhanced.

<<Properties>>

The foam sheet 2 shows a single glass transition temperature Tg. When the polyester resin and the polyimide resin are compatible with each other, a single glass transition temperature Tg is shown. Since the foam sheet 2 has a single glass transition temperature Tg, the glass transition temperature Tg is higher than the glass transition temperature Tg1 of the polyester resin, and the heat resistance increases.

In this context, the glass transition temperature being "single" means that in a heat flux differential scanning calorimetry chart (DSC curve) obtained at a heating rate of 10° C./min, the glass transition temperature Tg on a lower temperature side than the crystallization peak in the second run of heating process can be recognized as being single. However, in the case where no crystallization peak is observed in the second run of heating process, the glass transition temperature being "single" means that the glass transition temperature Tg within a temperature range (30 to 300° C.) in the second run of heating process can be recognized as being single.

The glass transition temperature Tg of the foam sheet 2 is, for example, preferably 80 to 130° C., more preferably 85 to 125° C., even more preferably 90 to 120° C. When the Tg is not lower than the lower limit value described above, heat resistance and heat-dimensional stability can be further enhanced. When the Tg is not more than the upper limit value described above, the molding cycle can be shortened to improve productivity, and the moldability can be improved.

The glass transition temperature Tg of the foam sheet 2 is determined by heat flux differential scanning calorimetry at a heating rate of 10° C./min.

The glass transition temperature Tg of the foam sheet 2 can be equated with the glass transition temperature Tg of the thermoplastic resin forming the foam sheet 2.

The absolute value of the difference between the heat absorption and the heat generation (heat absorption-heat generation difference) in the foam sheet 2 is preferably 3 to 35 J/g, more preferably 5 to 30 J/g, even more preferably 7 to 28 J/g. When the heat absorption-heat generation difference is not less than the lower limit value described above, the crystallinity increases, and heat resistance and heat-dimensional stability are further enhanced. When the heat absorption-heat generation difference is not more than the upper limit value described above, excessive increase in crystallinity would not occur, and the moldability can be improved.

The heat absorption-heat generation difference is the difference between the heat absorption and the heat generation, determined by DSC measurement in the first run of heating process performed with a heating rate of 10° C./min.

The heat absorption-heat generation difference for the foam sheet 2 can be equated with the heat absorption-heat generation difference for the thermoplastic resin forming the foam sheet 2.

In the foam sheet 2, a slope (hereinafter also referred to simply as "slope r") of an exponential approximation formula for storage elastic modulus E' between the glass transition temperature Tg and the glass transition temperature Tg+20° C. in a solid viscoelasticity measurement at a heating rate of 5° C./min and a frequency of 1 Hz is −0.18 to −0.25, more preferably −0.15 to −0.030, even more preferably −0.10 to −0.035. When the slope r is not less than the lower limit value described above, the change in the storage elastic modulus E' due to temperature increase is small, and the heat resistance can be further enhanced. When the slope r is not more than the upper limit value described above, excessive decrease in the change in the storage elastic modulus E' due to temperature increase is prevented, and the moldability can be further enhanced.

The slope r of the exponential approximation formula for the storage elastic modulus E' is the coefficient r of x in the following formula (e).

$$y=p\times\exp(r\times x) \qquad \text{(e)}$$

y: storage modulus E' (Pa)
x: temperature (° C.)
p: value of y at x=0 (Pa)

<Blowing Agent>

Examples of the blowing agent include saturated aliphatic hydrocarbons such as propane, normal butane, isobutane, normal pentane, isopentane, and hexane; ethers such as dimethyl ether; halogenated hydrocarbnons such as methyl chloride, 1,1,1,2-tetrafluoroethane, 1,1-difluoroethane, and monochlorodifluoromethane; carbon dioxide; and nitrogen. Among these, dimethyl ether, propane, normal butane, isobutane, carbon dioxide and nitrogen are preferable. These blowing agents may be used individually or in combination of two or more type of the blowing agents.

The content of the blowing agent is not particularly limited, but is preferably, for example, 0.1 to 12 parts by mass with respect to 100 parts by mass of the thermoplastic resin.

<Optional Components>

The foam sheet 2 of the present embodiment may contain other components (optional components) than the thermoplastic resin and the blowing agent. Examples of optional components include cell regulators, stabilizers, ultraviolet absorbers, colorants, antioxidants, crystallization accelerators, lubricants, cross-linking agents, surfactants, shrinkage inhibitors, flame retardants, antidegradants, and the like.

Examples of cross-linking agents include acid dianhydrides such as pyromellitic anhydride, polyfunctional epoxy compounds, oxazoline compounds, and oxazine compounds. By adding a cross-linking agent to the thermoplastic resin composition, the cell breakage during foaming can be suppressed, and the open cell ratio can be further reduced.

The amount of the cross-linking agent is preferably, for example, 0.08 to 0.8 parts by mass with respect to 100 parts by mass of the thermoplastic resin.

Examples of cell regulators include a mixture of inorganic powders such as talc and silica. These cell regulators increase the closed cell ratio of the foam layer 22 and facilitate the formation of the foam layer 22.

The amount of the cell regulator is preferably, for example, 0.2 to 5 parts by mass with respect to 100 parts by mass of the thermoplastic resin.

Examples of stabilizers include calcium-zinc heat stabilizers, tin heat stabilizers, and lead heat stabilizers.

The amount of the stabilizer is preferably, for example, 1 part by mass or less with respect to 100 parts by mass of the thermoplastic resin.

Examples of ultraviolet absorbers include cesium oxide ultraviolet absorbers, titanium oxide ultraviolet absorber, and the like.

The amount of the ultraviolet absorber is preferably, for example, 1 part by mass or less with respect to 100 parts by mass of the thermoplastic resin.

Examples of antioxidants include cerium oxide, cerium oxide/zirconia solid solution, cerium hydroxide, carbon, carbon nanotubes, titanium oxide, and fullerene.

The amount of the antioxidant is preferably, for example, 1 part by mass or less with respect to 100 parts by mass of the thermoplastic resin.

Examples of colorants include titanium oxide, carbon black, titanium yellow, iron oxide, ultramarine blue, cobalt blue, baked pigments, metallic pigments, mica, pearlescent pigments, zinc oxide, precipitated silica, and cadmium red.

When the foam sheet 2 of the present embodiment is used for a food container, it is preferable to select products registered with the Sanitation Council form the colorants listed above.

The amount of the colorant is preferably, for example, 2 parts by mass or less with respect to 100 parts by mass of the thermoplastic resin.

Examples of crystallization accelerators include silicates, carbon, metal oxides, and the like. Examples of the silicate include talc which is hydrous magnesium silicate. Examples of the carbon include carbon black, carbon nanofibers, carbon nanotubes, carbon nanohorns, activated carbon, graphite, graphene, coke, mesoporous carbon, glassy carbon, hard carbon, soft carbon and the like. Specific examples of the carbon black includes furnace black, acetylene black, Ketjen black, and thermal black. Examples of the metal oxides include zinc oxide and titanium oxide.

The amount of the crystallization accelerator is preferably, for example, 3 parts by mass or less with respect to 100 parts by mass of the thermoplastic resin.

One of the optional components described above may be used alone, or two or more thereof may be used in combination.

The total amount of the optional components contained in the foam layer 22 is preferably 0.1 to 5 parts by mass, more preferably 0.5 to 3 parts by mass, based on the total mass of the foam layer 22.

<Properties>

The open cell ratio of the foam layer 22 is preferably 20% or less, more preferably 18% or less, even more preferably 16% or less. When the open cell ratio of the foam layer 22 is not more than the upper limit value described above, the impact resistance of the resin foam-molded product can be further enhanced, and the moldability can be further enhanced. The lower limit of the open cell ratio of the foam layer 22 is not particularly limited, but is preferably 0%. The open cell ratio of the foam layer 22 is determined by the method described in JIS K7138:2006 "Rigid Foamed Plastics—Determination of Open and Closed Cell Ratios".

The basis weight of the foam layer 22 is, for example, preferably 50 to 900 $g/m^2$, more preferably 100 to 700 $g/m^2$, even more preferably 150 to 600 $g/m^2$. When the basis weight of the foam layer 22 is not less than the lower limit value described above, the impact resistance of the resin foam-molded product can be further enhanced. When the basis weight of the foam layer 22 is not more than the upper limit value described above, the resin foam-molded product can be made lighter. In addition, when the basis weight of the foam layer 22 is not more than the upper limit value described above, the heating time during heat molding would not be excessively prolonged, and the productivity of the resin foam-molded product can be further enhanced.

The basis weight of the foam layer 22 can be measured by the following method.

Leaving 20 mm at both ends in the width direction of the foam layer 22, five or more pieces of 10 cm×10 cm are cut out from the foam layer 22 at equal intervals in the width direction, and the mass (g) of each piece is measured with accuracy to the nearest 0.001 g. The value obtained by converting the average value of the masses (g) of the pieces into the mass per 1 $m^2$ is taken as the basis weight of the foam layer 22 ($g/m^2$).

The apparent density of the foam layer 22 is, for example, preferably 0.050 to 0.666 $g/cm^3$, more preferably 0.066 to 0.500 $g/cm^3$, even more preferably 0.100 to 0.400 $g/cm^3$. When the apparent density of the foam layer 22 is not less than the lower limit value described above, the heat insulation of the resin foam-molded product can be further enhanced, and the impact resistance of the molded product can be further enhanced. When the apparent density of the foam layer 22 is not more than the upper limit value described above, the resin foam-molded product can be made lighter.

The expansion ratio of the foam layer 22 is, for example, preferably 2 to 30 times, more preferably 3 to 20 times, even more preferably 3.5 to 15 times. When the expansion ratio of the foam layer 22 is not less than the lower limit value described above, the heat insulation of the resin foam-molded product can be further enhanced, and the impact resistance can be further enhanced. When the expansion ratio of the foam layer 22 is not more than the upper limit value described above, the moldability of the foam sheet 2 can be further enhanced.

The average cell diameter of the foam layer 22 is, for example, preferably 80 to 1000 μm, more preferably 150 to 750 μm, even more preferably 200 to 500 μm. When the average cell diameter of the foam layer 22 is not less than the lower limit value described above, the impact resistance of the resin foam-molded product can be further enhanced. When the average cell diameter of the foam layer 22 is not more than the upper limit value described above, the surface smoothness of the resin foam-molded product can be further enhanced.

The average cell diameter of the foam layer 22 can be measured according to the method described in ASTM D2842-69.

<Production Method>

The foam sheet 2 is produced by a conventionally known production method.

For example, the foam sheet 2 can be produced by the following method.

Figure 5:
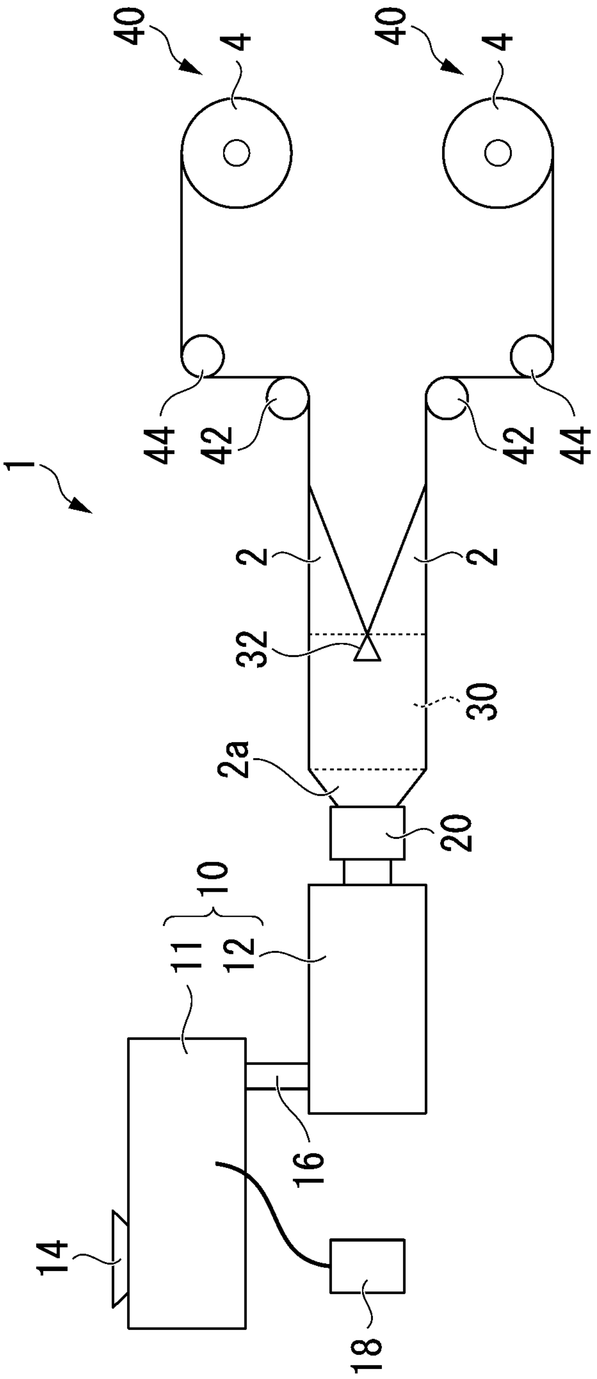
FIG. 5 is a schematic diagram showing an example of an apparatus for producing the thermoplastic resin foam (or foam layer) according to the first embodiment.

A foam sheet production apparatus 1 of FIG. 5 is an apparatus for obtaining a foam sheet by extrusion molding (co-extrusion method). The production apparatus 1 includes an extruder 10, a blowing agent supply unit 18, a circular die 20, a mandrel 30, and two winders 40.

The extruder 10 is a so-called tandem extruder. The extruder 10 includes a first extrusion section 11 and a second extrusion section 12 connected to the first extrusion section 11 by a pipe 16. The first extrusion section 11 includes a hopper 14. The blowing agent supply unit 18 is connected to the first extrusion section 11.

The circular die 20 is connected to the second extrusion section 12. The mandrel equipped with a cutter 32 is provided downstream of the circular die 20. A cooling blower (not shown) is provided between the circular die 20 and the mandrel 30.

The extruder 10 of the production apparatus 1 may be an extruder other than a tandem extruder. For example, the extruder 10 may be an extruder in which a circular die 20 is connected to the first extrusion section 11. Further, the extruder 10 of the production apparatus 1 may be a single-screw extruder or a multi-screw extruder such as a twin-screw extruder.

Raw materials for forming the foam layer are fed from the hopper 14 into the first extrusion section 11. The raw materials fed from the hopper 14 are the resin to form the foam layer and optional components blended as necessary.

In the first extrusion section 11, the raw materials are mixed while being heated to a predetermined temperature, to form a resin melt, which is then mixed with a blowing agent supplied from the blowing agent supply unit 18 to the first extrusion section 11, to form a resin composition.

The heating temperature is appropriately set in consideration of the type of resin, etc., within a range where the resin is melted and the optional components are not denatured.

The glass transition temperature Tg1, melting point, intrinsic viscosity (IV value), number average molecular weight Mn, and Z-average molecular weight Mz of the polyester resin (raw material polyester resin) blended in the thermoplastic resin composition are as described above for the foam layer 22.

The thermoplastic resin composition is supplied from the first extrusion section 11 through the pipe 16 to the second extrusion section 12 and further mixed. Then, the resin composition is cooled to a predetermined temperature and then guided to the resin flow path inside the circular die 20.

The thermoplastic resin composition guided to the resin flow path is extruded from the circular die 20 and the blowing agent is foamed to form a cylindrical foam sheet 2.

The cylindrical foam sheet 2 is guided to the mandrel 30 while being blown with cooling air blown from the cooling blower. The cylindrical foam sheet 2 passes through the outer surface of the mandrel 30, is cooled to a predetermined temperature, and is cut into two by a cutter 32 to form a foam sheet 2. The foam sheet 2 is wound around a guide roll 42 and a guide roll 44, respectively, and wound up by a winder 40 to form a foam sheet roll 4.

Examples of the method for producing the laminated foam sheet include a method in which the foam sheet 2 is obtained by the production method described above and forming a non-foam layer on the surface thereof by a T-die method, and a method in which a non-foam layer is formed by a co-extrusion method.

(Thermoplastic Resin Foam-Molded Product)

The resin foam-molded product of the present embodiment is obtained by molding the foam sheet 2. Examples of the resin foam-molded product include containers such as food trays, cushioning materials used for industrial products such as electric appliances and automobiles, packing materials, structural members, heat insulating materials, and the like.

Figure 6:
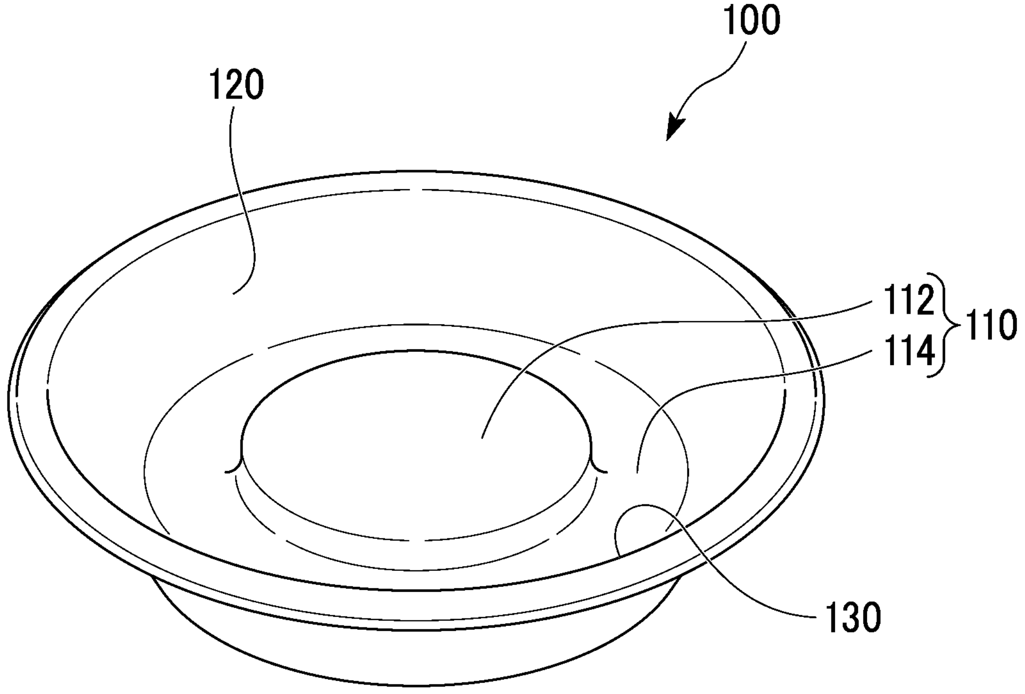
FIG. 6 is a perspective view of the thermoplastic resin foam-molded product according to the first embodiment.

The container 100 in FIG. 6 is a bowl-shaped container that has a true circle shape as viewed in plan. The container 100 has a circular bottom wall 110 and a side wall 120 rising from the periphery of the bottom wall 110. The container 100 is formed with an opening 130 surrounded by the upper ends of the side wall 120. The side wall 120 widens outward toward the upper end. The opening 130 surrounded by the upper ends of the side wall 120 has a perfect circular shape as viewed in plan. The bottom wall 110 is composed of a protrusion 112 that is perfectly circular in plan view and protrudes toward the opening 130, and an annular recess 114 that surrounds the protrusion 112.

The thickness of each of the bottom wall 110 and the side wall 120 of the container 100 (hereinafter also referred to as "wall thickness") is set in consideration of the application and the like. For example, the lower limit is 20 μm, 40 μm, 60 μm, 200 μm, 300 μm or 400 μm, and the upper limit is 4000 μm, 2500 μm, 2000 μm, 1000 μm, 800 μm or 600 μm. The wall thickness range (combination of upper limit and lower limit) is preferably 20 to 1000 μm, more preferably 40 to 800 μm, even more preferably 60 to 600 μm in one embodiment of the present invention. In another embodiment of the present invention, the wall thickness is preferably 200 to 4000 μm, more preferably 300 to 2500 μm, even more preferably 400 to 2000 μm.

When the wall thickness of the container 100 is not less than the lower limit value described above, the impact resistance of the container 100 can be further enhanced. When the wall thickness of the container 100 is not more than the upper limit value described above, the weight of the container 100 can be further reduced.

The container 100 is suitable as a food packaging container, and particularly suitable as a microwave oven safe container.

Further, although the container 100 of the present embodiment has a perfect circular shape in plan view, the present invention is not limited to this example. The plan view shape of the container may be an ellipse or a polygon such as a quadrangle.

The resin foam-molded product of the present embodiment, such as the container 100, is obtained by molding the foam sheet 2 of the first embodiment. That is, the resin foam-molded product such as the container 100 has cells in the thermoplastic resin.

The resin foam-molded product such as the container 100 shows a single glass transition temperature Tg. When the polyester resin and the polyimide resin are compatible with each other, a single glass transition temperature Tg is shown. Since the resin foam-molded product such as the container 100 has a single glass transition temperature Tg, the glass transition temperature Tg is higher than the glass transition temperature Tg1 of the polyester resin, and the heat resistance increases.

The glass transition temperature Tg of the resin foam-molded product such as the container 100 is, for example, preferably 80 to 130° C., more preferably 85 to 125° C., even more preferably 90 to 120° C. When the Tg is not lower than the lower limit value described above, heat resistance and heat-dimensional stability can be further enhanced. When the Tg is not higher than the upper limit value described above, the moldability improves, and a container with excellent appearance can be obtained.

The heat absorption-heat generation difference of the resin foam-molded product such as the container 100 is preferably 3 to 35 J/g, more preferably 5 to 30 J/g, even more preferably 7 to 28 J/g. When the heat absorption-heat generation difference is not less than the lower limit value described above, the crystallinity increases, and the heat-dimensional stability can be enhanced. When the heat absorption-heat generation difference is not more than the upper limit value described above, excessive increase in crystallinity would not occur, and the moldability can be improved.

The heat absorption-heat generation difference is the difference between the heat absorption and the heat generation, determined by heat flux differential scanning calorimetry performed with a heating rate of 10° C./min.

In the resin foam-molded product such as the container 100, the slope r is preferably −0.18 to −0.25, more preferably −0.15 to −0.030, even more preferably −0.10 to −0.035. When the slope r is not less than the lower limit value described above, the change in the storage elastic modulus E' due to temperature increase is small, and the heat resistance can be further enhanced. When the slope r is not more than the upper limit value described above, excessive decrease in the change in the storage elastic modulus E' due to temperature increase is prevented, and the moldability can be further enhanced.

<Method for Producing Resin Foam-Molded Product>

The method for producing a resin foam-molded product such as the container 100 may be, for example, a method (thermoforming method) in which the foam sheet 2 is heated and inserted between a female mold (cavity) and a male mold (core) to perform molding.

Figure 7:
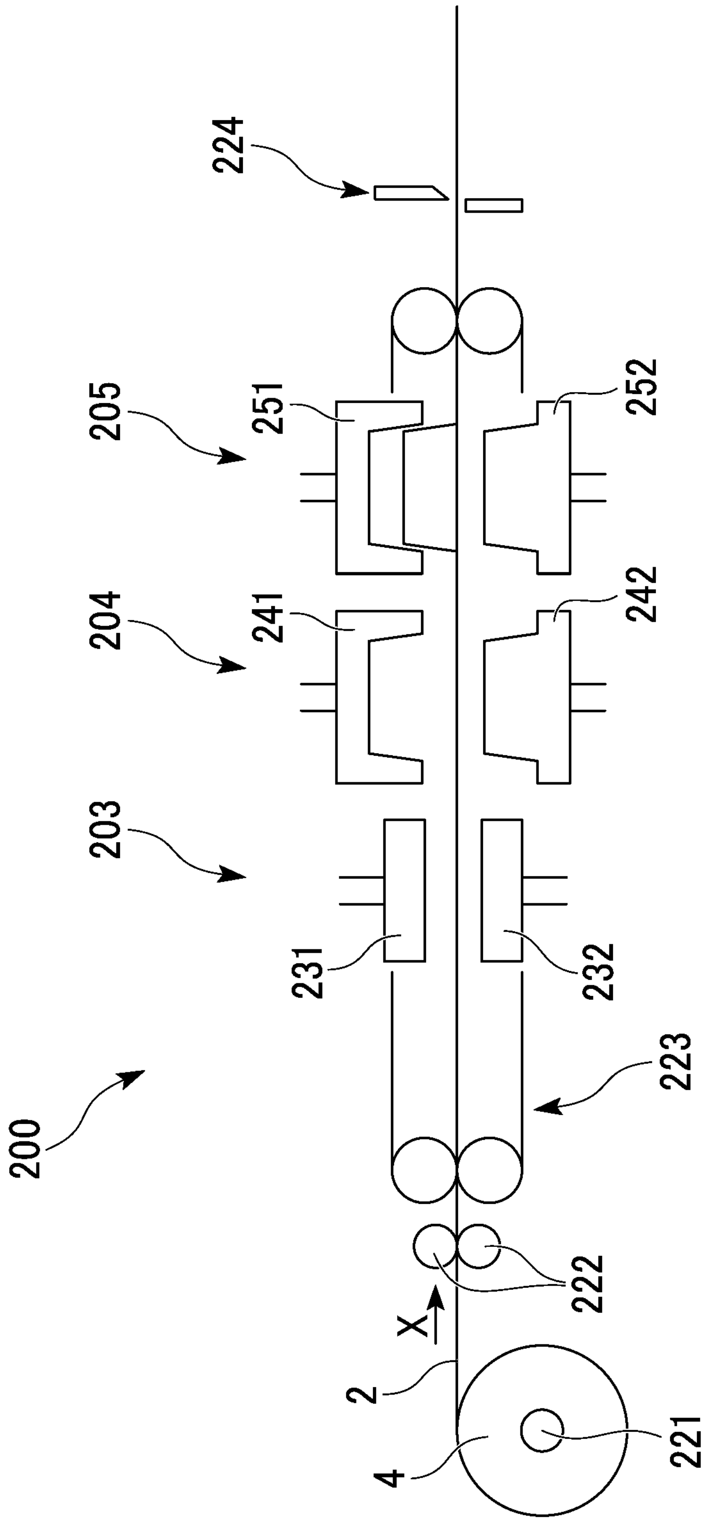
FIG. 7 is a schematic diagram showing an example of an apparatus for producing a thermoplastic resin foam-molded product.

FIG. 7 shows an example of a molding apparatus used in the method for producing a resin foam-molded product such as the container 100.

A molding apparatus 200 in FIG. 7 has a shaft 221, a pair of supply rollers 222, a transport conveyor 223, a preheating section 203, a heating mold 204, a cooling mold 205 and a blanking machine 224.

The preheating section 203 has an upper heating plate 231 and a lower heating plate 232 facing the upper heating plate 231. The preheating section 203 may be a heating furnace instead of the combination of the upper heating plate 231 and the lower heating plate 232.

The heating mold 204 has a heating cavity 241 and a heating core 242. Examples of the heating mold 204 include a vacuum forming machine, an air pressure-forming machine, and the like.

The cooling mold 205 has a cooling cavity 251 and a cooling core 252.

The heating cavity 241 and the cooling cavity 251 are of the same shape, and the heating core 242 and the cooling core 252 are of the same shape.

First, the foam sheet roll 4 is attached to the shaft 221. The foam sheet 2 is fed out from the foam sheet roll 4 and intermittently transported in the X direction by a pair of the supply rollers 222. The preheating section 203 heats the transported foam sheet 2 (preheating step). The surface temperature of the foam sheet 2 immediately after the preheating step is, for example, preferably 90 to 230° C., more preferably 100 to 210° C., even more preferably 105 to 190° C. When the heating temperature is not lower than the lower limit value described above, the foam sheet 2 is softened and the moldability can be enhanced. When the heating temperature is not higher than the upper limit value described above, excessive increase in crystallinity of the foam sheet 2 is suppressed, and moldability can be enhanced.

The heating time in the preheating step is preferably 5 to 90 seconds, more preferably 10 to 60 seconds, even more preferably 15 to 50 seconds.

Then, the heating mold 204 sandwiches the foam sheet 2 between the heating cavity 241 and the heating core 242 to heat and mold the foam sheet 2 (molding step). The temperature (heating temperature) of the heating mold in the molding step is preferably 30 to 240° C., more preferably 35 to 200° C., even more preferably 40 to 180° C. When the heating temperature is not lower than the lower limit value described above, the foam sheet 2 is softened so that the moldability can be enhanced by pressing the foam sheet 2 against the heating cavity 241. When the heating temperature is not higher than the upper limit value described above, the releasability of the molded product can be further enhanced. The molding time in the molding step is preferably 1 to 10 seconds, more preferably 2 to 8 seconds, even more preferably 3 to 7 seconds. When the molding time is not less than the lower limit value described above, the foam sheet 2 is softened so that the moldability can be enhanced by pressing the foam sheet 2 against the heating cavity 241. Further, the heat-dimensional stability can be enhanced. When the molding time is not more than the upper limit described above, the time per cycle can be shortened to improve productivity.

The heating mold 204 may further heat the foam sheet 2 in the heating mold 204 after the molding step (heat set step). By providing the heat set step, the degree of crystallinity of the foam sheet 2 can be increased, and the heat-dimensional stability can be further enhanced. The temperature of the heating mold (heat set temperature) in the heat setting step is preferably 130 to 240° C., more preferably 140 to 220° C., even more preferably 150 to 200° C. When the heat setting temperature is not lower than the lower limit value described above, the crystallinity of the foam sheet 2 can be increased, and the heat-dimensional stability can be enhanced. When the heat setting temperature is not higher than the upper limit value described above, the releasability of the molded product can be further enhanced. The heating time (heat set time) in the heat setting step is preferably 3 to 90 seconds, more preferably 5 to 60 seconds, even more preferably 7 to 50 seconds. When the heat setting time is not lower than the lower limit value described above, the crystallinity of the foam sheet 2 can be increased, and the heat-dimensional stability can be enhanced. When the heat setting time is not more than the upper limit described above, the time per cycle can be shortened to improve productivity.

Further, even if the heat set step is omitted, the foam sheet 2 of the present embodiment does not suffer decrease in heat resistance, and its heat-dimensional stability is not significantly impaired.

Then, the heating mold 203 is opened, the foam sheet 2 molded into a desired shape is transferred to the position of the cooling mold 205, and the foam sheet 2 is clamped between the cooling cavity 251 and the cooling core 252 (cooling step).

The cooling step may be omitted.

Then, the blanking machine 224 cuts out the container 100 as a resin foam-molded product from the foam sheet 2.

In the foam (foam sheet) of the present embodiment, the polyester resin and the polyimide resin are compatibilized with each other, and the thermoplastic resin shows a single glass transition temperature. Therefore, the glass transition temperature Tg of the foam becomes higher than the glass transition temperature Tg1 of the polyester resin, and the heat resistance increases. As a result, a resin foam-molded product obtained by heat-molding the foam shows excellent heat resistance.

In addition, since the foam of the present embodiment shows excellent heat resistance without requiring a heat set step, the productivity of the resin foam-molded product can be improved. The resin foam-molded product of the present embodiment shows excellent heat resistance even when the crystallinity is less than 20%.

Furthermore, when the resin foam-molded product of the present embodiment is produced by a method involving the heat set step, the crystallinity is increased and the heat-dimensional stability is further enhanced.

Second Embodiment of Foam

The foam according to the second embodiment of the present invention is described below. The foam of the present embodiment is a rod-shaped foam. The rod-shaped foam is used as a joint material, an elastic sealant backup material, a fishery rope, a core material for shimenawa (sacred rice-straw ropes), a buoyancy material, a cushioning material for packaging, and the like.

The rod-shaped foam is formed by foaming a thermoplastic resin composition. The thermoplastic resin composition is the same as the thermoplastic resin composition in the first embodiment. Further, the description regarding “other resins” in the first embodiment also applies mutatis mutandis to the second embodiment while replacing the “foam sheet 2” with the “rod-shaped foam”.

The shape of the rod-shaped foam may be cylindrical or prismatic.

The size of the rod-shaped foam is appropriately set in consideration of the application. For example, when the rod-shaped foam is cylindrical, the diameter of the circular cross section is 0.1 to 10 cm, and the length is 10 to 200 cm.

The open cell ratio of the rod-shaped foam is the same as the open cell ratio of the foam sheet of the first embodiment.

The apparent density of the rod-shaped foam is, for example, preferably 0.050 to 0.666 g/cm$^3$, more preferably 0.066 to 0.500 g/cm$^3$, even more preferably 0.100 to 0.400 g/cm$^3$. When the apparent density is not less than the lower limit value described above, the cushioning effect can be increased. When the apparent density is not more than the upper limit value described above, the mechanical strength can be increased.

The expansion ratio of the rod-shaped foam is, for example, preferably 2 to 30 times, more preferably 3 to 20 times, even more preferably 3.5 to 15 times. When the expansion ratio is not less than the lower limit value described above, the cushioning effect can be increased. When the expansion ratio is not more than the upper limit value described above, the mechanical strength can be increased.

The average cell diameter of the rod-shaped foam is, for example, preferably 80 to 1000 μm, more preferably 150 to 750 μm, even more preferably 200 to 500 μm. When the average cell diameter is not less than the lower limit value described above, the cushioning effect can be increased. When the average cell diameter is not more than the upper limit value described above, the mechanical strength can be increased.

The rod-shaped foam is produced by a conventionally known production method.

The method for producing the rod-shaped foam may be, for example, a method in which a thermoplastic resin and a blowing agent are supplied to an extruder and melt-kneaded, and the resulting thermoplastic resin composition in a molten state is extruded through a die hole provided at the tip of the extruder, thereby foaming the resin composition to obtain a rod-shaped foam.

Third Embodiment of Foam

The foam according to the third embodiment of the present invention is described below. The foam of the present embodiment is in the form of granules (foam granules). The foam granules are granules obtained by granulating and foaming a thermoplastic resin composition. The thermoplastic resin composition is the same as the thermoplastic resin composition in the first embodiment. Further, the description regarding “other resins” in the first embodiment also applies mutatis mutandis to the third embodiment while replacing the “foam sheet 2” with the “foam granules”.

The foam granules are granular foam. The foam granules are used as raw materials for a thermoplastic resin foam granule-molded product (foam granule-molded product) formed by the so-called in-mold foam molding.

The properties attributable to the single glass transition temperature Tg shown by the foam granules are also as described in the item <<Properties>> for the first embodiment. However, the heat resistance of the “foam granule-molded product” as mentioned above can be increased in the third embodiment. Likewise, regarding the effects achievable when the glass transition temperature Tg is not less than the lower limit value described above, the heat resistance and heat-dimensional stability of the “foam granule-molded product” described above can be further enhanced in the third embodiment. Further, as described in relation to the first embodiment, in one aspect of the third embodiment, when the glass transition temperature Tg1 of the polyester resin is not more than the upper limit value described above, the effect of enhancing moldability can be achieved, wherein the expression “moldability” means that, for example, when the foam granules are filled into a mold cavity and heated to cause secondary foaming, the shape of the resulting product can be brought closer to a desired shape, and the closer the shape of the resulting product is to a desired shape, the better the moldability.

In one example of the third embodiment, the polyester resin has a number average molecular weight Mn of 9,000 to 45,000, preferably 15,000 to 43,000, more preferably 20,000 to 40,000.

When the Mn is not less than the lower limit value described above, the cold resistance (i.e., mechanical strength at low temperatures) can be further enhanced. When the Mn is not more than the upper limit value described above, the heat resistance can be further enhanced.

In one example of the third embodiment, the polyester resin has a Z average molecular weight Mz of 50,000 to 500,000, preferably 180,000 to 450,000, more preferably 100,000 to 400,000.

When the Mz is within the above range, the cold resistance (i.e., mechanical strength at low temperatures) can be further enhanced.

Further, in one example of the third embodiment, the proportion of the polyester resin is preferably 40 to 95% by mass, more preferably 45 to 90% by mass, even more preferably 50 to 80% by mass, particularly preferably 50 to 70% by mass, based on the total mass of the thermoplastic resin contained in the form granules. When the proportion of the polyester resin is not less than the lower limit value described above, the moldability can be enhanced. When the proportion of the polyester resin is not more than the upper limit value described above, the heat resistance can be further enhanced.

Further, in one example of the third embodiment, the proportion of the polyimide resin is preferably 5 to 60% by mass, more preferably 10 to 55% by mass, even more preferably 20 to 50% by mass, particularly preferably 30 to 50% by mass, based on the total mass of the thermoplastic resin contained in the form granules. When the proportion of the polyimide resin is not less than the lower limit value described above, the heat resistance strength can be further enhanced. When the proportion of the polyimide resin is not more than the upper limit value described above, the moldability can be further enhanced.

In one example of the third embodiment, the absolute value of the difference between the heat absorption and the heat generation (heat absorption-heat generation difference) in the foam granules is preferably 3 to 35 J/g, more preferably 5 to 25 J/g, even more preferably 7 to 15 J/g. When the heat absorption-heat generation difference is not less than the lower limit value described above, the crystallinity increases, and the heat resistance and heat-dimensional stability of the foam granule-molded product are further enhanced. When the heat absorption-heat generation difference is not more than the upper limit value described above, excessive increase in crystallinity would not occur, and excellent secondary foamability and heat-sealability can be exhibited, so that the moldability and mechanical strength can be enhanced.

The heat absorption-heat generation difference is the difference between the heat absorption and the heat generation, determined by heat flux differential scanning calorimetry performed with a heating rate of 10° C./min.

The heat absorption-heat generation difference for the foam granules can be equated with the heat absorption-heat generation difference for the thermoplastic resin forming the foam granules.

The size of the foam granules is set appropriately depending on the application, and the mass average particle size of the foam granules is, for example, 0.5 to 5 mm.

The average particle size of the foam granules is a D50 value.

Specifically, using a low tap type sieve shaker (manufactured by Sieve Factory Lida Co., Ltd.), about 25 g of a sample is classified for 10 minutes with JIS standard sieves (JIS Z8801-1: 2006) with sieve openings of 26.5 mm, 22.4 mm, 19.0 mm, 16.0 mm, 13.2 mm, 11.20 mm, 9.50 mm, 8.80 mm, 6.70 mm, 5.66 mm, 4.76 mm, 4.00 mm, 3.35 mm, 2.80 mm, 2.36 mm, 2.00 mm, 1.70 mm, 1.40 mm, 1.18 mm, 1.00 mm, 0.85 mm, 0.71 mm, 0.60 mm, 0.50 mm, 0.425 mm, 0.355 mm, 0.300 mm, 0.250 mm, 0.212 mm and 0.180 mm, and the weights of the sample on the sieves are measured. A cumulative weight distribution curve is created from the obtained results, and the particle size (median size) at which the cumulative weight is 50% is taken as the average particle size.

The open cell ratio of the foam granules is the same as the open cell ratio of the foam sheet of the first embodiment. When the open cell ratio of the foam granules is not more than the upper limit value described above, the secondary foamability of the foam granules can be further enhanced, and the moldability and the mechanical strength can be further enhanced.

The apparent density of the foam granules is, for example, preferably 0.027 to 0.675 g/cm$^3$, more preferably 0.045 to 0.45 g/cm$^3$, even more preferably 0.0675 to 0.27 g/cm$^3$. When the apparent density is not less than the lower limit value described above, the cushioning effect of the foam granule-molded product can be increased. When the apparent density is not more than the upper limit value described above, the mechanical strength of the foam granule-molded product can be increased.

The bulk expansion ratio of the foam granules is, for example, preferably 2 to 50 times, more preferably 3 to 30 times, even more preferably 5 to 20 times. When the bulk expansion ratio is not less than the lower limit value described above, the cushioning effect can be increased. When the bulk expansion ratio is not more than the upper limit value described above, the mechanical strength can be increased.

The average cell diameter of the foam granules is, for example, preferably 5 to 500 μm, more preferably 10 to 400 even more preferably 20 to 300 pun. When the average cell diameter is not less than the lower limit value described above, the cushioning effect can be increased. When the average cell diameter is not more than the upper limit value described above, the mechanical strength can be increased.

The average cell diameter can be measured according to the test method of ASTM D3576-77.

<Production Method>

Examples of the method for producing the foam granules of the present invention include a method in which a resin composition containing a thermoplastic resin and a blowing agent is extruded and foamed to obtain foam granules, and a method in which a thermoplastic resin is extruded to obtain resin granules, and the resin granules are impregnated with a blowing agent to form foam granules.

More specific examples of the method for producing foam granules include the following methods:

1) A method in which a thermoplastic resin and a blowing agent are supplied to an extruder and melt-kneaded, the resulting molten resin composition is extruded into the air through a die hole provided at the tip of the extruder to allow the composition to foam, while simultaneously cutting the foamed extrudate, and the resulting cut foamed spherical granules are plunged into water to cool, thereby obtaining foam granules.

2) A method in which a thermoplastic resin and a blowing agent are supplied to an extruder and melt-kneaded, the resulting molten resin composition is extruded into water through a die hole provided at the tip of the extruder to allow the composition to foam and cool, while simultaneously cutting the foamed extrudate, thereby obtaining cut foamed spherical granules as foam granules.

3) A method in which a thermoplastic resin and a blowing agent are supplied to an extruder and melt-kneaded, and the resulting molten resin composition is extruded into water through a die hole provided at the tip of the extruder to allow the composition to cool, while simultaneously cutting the cooled extrudate, to thereby obtain cut spherical foamable granules, and the obtained foamable granules are heated to obtain foam granules.
4) A method in which a thermoplastic resin is supplied to an extruder and melt-kneaded, the resulting molten thermoplastic resin is extruded into the air through a die hole provided at the tip of the extruder, while simultaneously cutting the extrudate, the resulting cut spherical resin granules are plunged into water to cool, the resulting resin granules are impregnated with a blowing agent to obtain foamable granules, and the obtained foamable granules are heated to obtain foam granules.
5) A method in which a thermoplastic resin is supplied to an extruder and melt-kneaded, the resulting molten thermoplastic resin is extruded into water through a die hole provided at the tip of the extruder to cool, while simultaneously cutting the cooled extrudate, the resulting cut spherical resin granules are impregnated with a blowing agent to obtain foamable granules, and the obtained foamable granules are heated to obtain foam granules.
6) A method in which a thermoplastic resin is supplied to an extruder and melt-kneaded, the resulting molten thermoplastic resin is extruded into a strand through a die hole provided at the tip of the extruder, which is then lead into water to cool, the cooled strand is cut into predetermined lengths to obtain columnar resin granules, the obtained resin granules are impregnated with a blowing agent to obtain foamable granules, and the obtained foamable granules are heated to obtain foam granules.

Hereinbelow, more specific explanation is given with respect to the method of extruding the resin composition into the air for foaming, subsequently cutting the resulting into spherical granules, and plunging the granules into water for cooling.

The extruder used for producing the foam granules of the present invention is described below.

Figure 12:
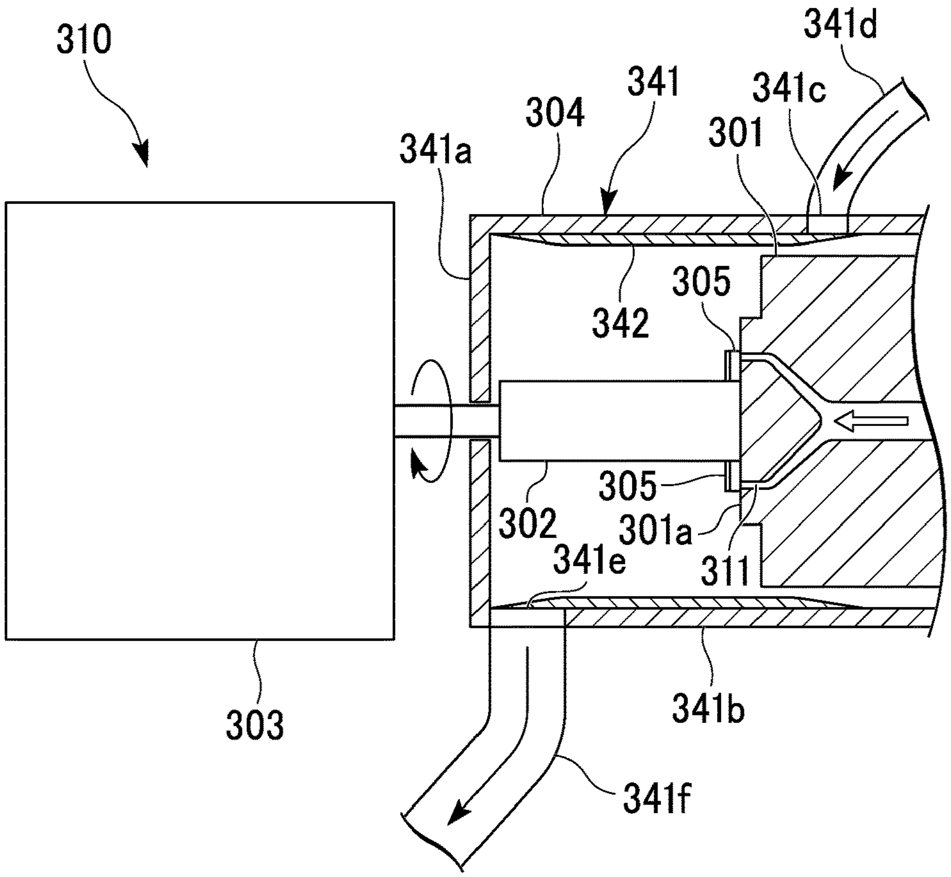
FIG. 12 is a schematic side cross-sectional view showing an example of an apparatus for producing the thermoplastic resin foam granules of the present invention.

A foam granule production apparatus 310 of FIG. 12 has an extruder (not shown) and a nozzle die 301 provided at the tip of the extruder. A rotary shaft 302 is connected to the tip of the nozzle die 301. The rotary shaft 302 passes through a front portion 341*a* of a cooling drum 341 belonging to a cooler 304 described below, and is connected to a driving member 303 such as a motor.

Figure 13:
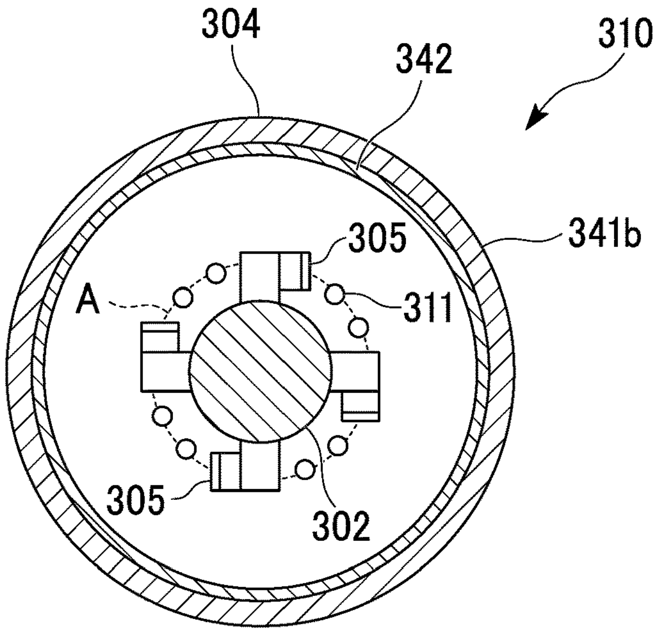
FIG. 13 is a schematic front view showing an example of an apparatus for producing the thermoplastic resin foam granules of the present invention.

At the front end surface 301*a* of the nozzle die 301, a plurality of nozzle outlets 311 are formed at equal intervals on the same virtual circle A centered on the rotary shaft 302 (see FIG. 13).

The number of nozzles (that is, the number of outlets 311) of the nozzle die 301 is preferably 2 to 80. When the number of nozzles is one, the production efficiency of the foam granules may worsen. When this number is more than 80, the foam granules extruded from the mutually adjacent nozzles may come into contact with each other and be fused together. Further, the foam granules obtained by cutting the extruded foam may be fused together. The number of nozzles is more preferably 5 to 60, particularly preferably 8 to 50.

The diameter (opening diameter) of the outlet 311 of the nozzle in the nozzle die 301 is preferably 0.2 to 2 mm. When the opening diameter of the outlet 311 is less than 0.2 mm, the extrusion pressure may become too high, which hampers the extrusion foaming. When the opening diameter of the outlet 311 is larger than 2 mm, the diameter of the foam granules becomes large, which may decrease the efficiency of filling the mold. The opening diameter of the outlet 311 is more preferably 0.3 to 1.6 mm, particularly preferably 0.4 to 1.2 mm.

The land length of the nozzle die 301 is preferably 4 to 30 times the opening diameter of the outlet 311 of the nozzle of the nozzle die 301. When the land length is less than 4 times, fractures may occur, which hinders stable extrusion foaming. When the land length is more than 30 times, excessive pressure may be applied to the nozzle die 1, such that extrusion foaming cannot be performed. The land length is more preferably 5 to 20 times.

In a portion of the front end face 301*a* of the nozzle die 301, which is surrounded by the outlet portion 311 of the nozzle, a rotating shaft 302 is disposed so as to protrude forward.

One or more rotary blades 305 are integrally provided on the outer peripheral surface of the rear end portion of the rotary shaft 302, and all the rotary blades 305 are allowed to be constantly in contact with the front end surface 301*a* during rotation. When a plurality of rotary blades 305 are provided integrally with the rotary shaft 302, the rotary blades 305 are arranged in the circumferential direction of the rotary shaft 302 at regular intervals. FIG. 13 shows, as an example, a case where four rotary blades 305 are integrally provided on the outer peripheral surface of the rotary shaft 302.

The rotary blades 305 are configured to be able to successively and continuously cut the extruded foam extruded from the outlet 311 of the nozzle by moving, as the rotary shaft 302 rotates, so as to draw a virtual circle A on which the nozzle outlet 311 is formed, while being constantly in contact with the front end surface 301*a*.

The foam granule production apparatus 310 is provided with a cooler 304 surrounding at least the front end surface 301*a* of the nozzle die 301 and the rotary shaft 302. The cooler 304 has a closed-bottomed cylindrical cooling drum 341 having a front portion 341*a* with a circular front having a larger diameter than the nozzle die 301, and a cylindrical peripheral wall portion 341*b* extending backward from the outer peripheral edge of the front portion 341*a*.

A feed inlet 341*c* for feeding the cooling liquid 42 is formed in a region of the peripheral wall portion 341*b* facing the outer surface of the nozzle die 301. The feed inlet 341*c* penetrates the peripheral wall portion 341*b*. A feed pipe 341*d* for feeding the cooling liquid 342 into the cooling drum 341 is connected to the feed inlet 341*c* on the outer surface of the peripheral wall portion 341*b*.

The cooling liquid 342 is allowed to be fed diagonally forward along the inner peripheral surface of the peripheral wall portion 341*b* of the cooling drum 341 through the feed pipe 341*d*.

An outlet 341*e* is formed in the lower surface of the front end portion of the peripheral wall portion 341*b*. The outlet 341*e* penetrates the peripheral wall portion 341*b*. A discharge pipe 341*f* is connected to the outlet 341*e* on the outer surface of the peripheral wall portion 341*b*.

The extruder is not particularly limited as long as it is an extruder that has conventionally and widely been used, and examples thereof include a single screw extruder, a twin screw extruder, and a tandem extruder in which a plurality of extruders are connected.

Hereinbelow, a method for producing foam granules using the foam granule production apparatus 310 is described.

The cooling liquid 342 is fed into the cooling drum 341 from the feed pipe 341*d* via the feed inlet 341*c*. The fed cooling liquid 342 proceeds forward (toward the front portion 341*a*) in a spiral along the inner peripheral surface of the peripheral wall portion 341*b* due to the centrifugal force associated with the flow velocity caused by feeding. The cooling liquid 342 gradually spreads in a direction perpendicular to the traveling direction (that is, in the circumferential direction of the peripheral wall portion 341*b*) while traveling along the inner peripheral surface of the peripheral wall portion 341*b*. The cooling liquid 342 spreading in the circumferential direction of the peripheral wall portion 341*b* entirely covers the inner peripheral surface of the peripheral wall portion 341*b* at its section positioned ahead of the feed inlet 341*c*.

The cooling liquid 342 is not particularly limited as long as the foam granules can be cooled, and examples thereof include water and alcohol, but water is preferable in consideration of post-use treatment.

The temperature of the cooling liquid 342 is preferably 10 to 40° C. When the temperature of the cooling liquid is 10° C. or higher, the resin composition can be extruded more smoothly from the outlet 311 without excessively cooling the nozzle die 1 located near the cooling drum 341. When the temperature of the cooling liquid is 40° C. or lower, the cut granules can be cooled more quickly.

While the rotary blade 305 is being rotated, the resin composition is extruded from the nozzle outlet 311.

In this context, the glass transition temperature Tg, melting point, and intrinsic viscosity (IV value) of the polyester resin (raw material polyester resin) blended in the resin composition are the same as the glass transition temperature Tg, melting point, and intrinsic viscosity (IV value) of the polyester resin (raw material polyester resin) in the first embodiment.

The number average molecular weight Mn of the raw material polyester resin is 9,000 to 45,000, preferably 15,000 to 43,000, more preferably 20,000 to 40,000. When the Mn is not less than the lower limit value described above, the cold resistance (i.e., mechanical strength at low temperatures) of the foam granule-molded product can be further enhanced. When the Mn is not more than the upper limit value described above, the heat resistance of the foam granule-molded product can be further enhanced.

The Z-average molecular weight Mz of the raw material polyester resin is 50,000 to 500,000, preferably 80,000 to 450,000, more preferably 100,000 to 400,000.

When the Mz is within the above range, the cold resistance of the foam granule-molded product can be further enhanced.

The resin composition is extrusion-foamed from the nozzle die 301 to form an extruded foam, which then is cut by the rotary blade 305 to form cut granules. All the rotary blades 305 are rotating while constantly contacting the front end surface 301*a*, and the extruded foam extruded from the nozzle die 301 is cut into cut granules in the air at regular time intervals by shear stress caused between the rotary blades 305 and the edge of the nozzle outlet 311. In this process, the extruded foam may be sprayed with water in the form of a mist to an extent that does not excessively cool the extruded foam.

The resin composition is kept from foaming inside the nozzle of the nozzle die 301. The resin composition is not yet foamed immediately after being discharged from the nozzle outlet 311, and starts to foam shortly after being discharged. Therefore, the extruded foam consists of an unfoamed portion immediately after being discharged from the nozzle outlet 311, and a foamed portion that is continuous with the unfoamed portion and has been extruded prior to the unfoamed portion.

The unfoamed portion remains unfoamed during the period from discharge from the nozzle outlet 311 until start of the foaming. The time during which the unfoamed portion remains unfoamed can be adjusted by the resin pressure at the nozzle outlet 311, the amount of blowing agent, and the like. When the resin pressure at the nozzle outlet 311 is high, the resin composition does not foam immediately after being extruded from the nozzle die 301, and maintains an unfoamed state. The discharge pressure of the thermoplastic resin at the nozzle outlet 311 can be controlled by adjusting the opening diameter of the nozzle outlet 311, the extrusion rate, and the melt viscosity and melt tension of the resin composition. Further, by adjusting the amount of the blowing agent to an appropriate amount, it is possible to prevent the thermoplastic resin composition from foaming inside the nozzle die 301 and to make sure that an unfoamed portion is formed.

Since all the rotary blades 305 cut the extruded foam while constantly in contact with the front end surface 301*a*, the extruded foam is allowed to be cut at its unfoamed portion immediately after being discharged from the nozzle outlet 311 to form cut granules.

The rotation speed of the rotary blade 305 is preferably 2000 to 10000 rpm, more preferably 2000 to 9000 rpm, particularly preferably 2000 to 8000 rpm. When the rotation speed is not less than the lower limit value described above, the extruded foam can be cut with higher certainty by the rotary blade 305, while preventing fusion of the cut granules, to thereby further increase uniformity of shape of the foam granules. When the rotation speed is not more than the upper limit value described above, a sufficient time is ensured until reaching the cooling liquid 342 described later, and the bulk expansion ratio can be further increased.

Figure 14:
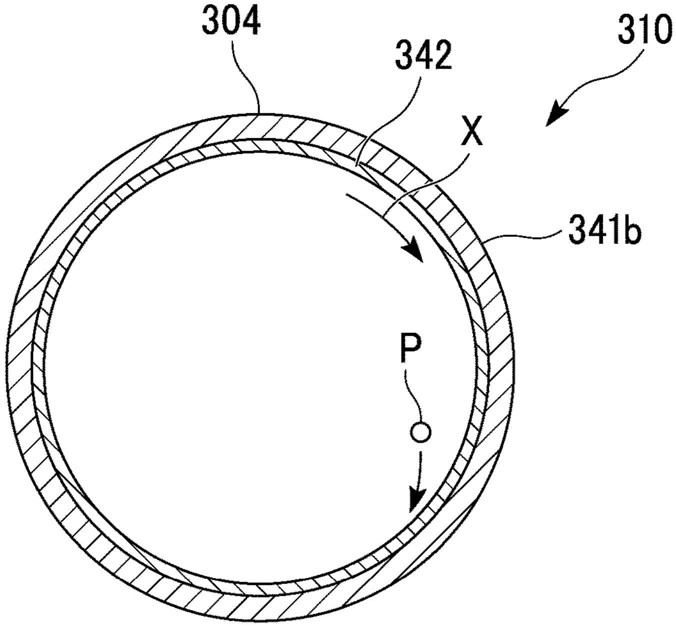
FIG. 14 is a schematic front view showing an example of an apparatus for producing the thermoplastic resin foam granules of the present invention.

As shown in FIG. 14, the cut granules P cut by the rotary blade 305 are scattered toward the inner wall of the cooling drum 341 simultaneously with the cutting due to the cutting stress caused by the rotary blade 305, and collide with the cooling liquid 342 covering the inner peripheral surface of the peripheral wall portion 341*b*. The cut granules continue to foam until collusion with the cooling liquid 342, and the cut granules grow into a substantially spherical shape due to the foaming. Therefore, the obtained foam granule are substantially spherical. In this process, the cut granules P preferably collide with the cooling liquid 342 along a direction obliquely crossing the surface of the cooling liquid 342 and from upstream to downstream in the flow direction X of the cooling liquid 342 (see FIG. 14). By allowing the cut granules P to collide with the cooling liquid 342 along a direction following the flow of the cooling liquid 342, the cut granules P are allowed to smoothly and surely enter the cooling liquid 342 without being repelled by the surface of the cooling liquid 342, so as to be cooled by the cooling liquid 342 to become foam granules.

According to the present embodiment, after the extruded foam is cut by the rotary blade 305, the cut granules are immediately cooled by the cooling liquid 342, so that excessive foaming of the cut granules can be prevented and foam granules having a desired bulk expansion ratio can be obtained.

In addition, since the cut granules are cooled immediately after cutting the extruded foam, an increase in crystallinity of the foam granules is suppressed. Therefore, the foam granules show excellent secondary foamability and heat-sealability, and the resulting foam granule-molded product has excellent mechanical strength. Furthermore, by increasing the crystallinity of the foam granule-molded product formed of the polyester resin during in-mold foam molding, the heat-dimensional stability can be further enhanced.

The foam granules cooled by the cooling liquid 342 flow into the discharge pipe 341*f* through the discharge outlet 341*e* together with the cooling liquid 342, and are discharged outside the cooling drum 341. The discharged foam granules are separated from the cooling liquid 342 and dried if necessary. As a method for separating the foam granules and the cooling liquid 342, for example, a conventionally known solid-liquid separation method such as passing through a sieve can be used.

(Thermoplastic Resin Foam Granule-Molded Product)

The thermoplastic resin foam granule-molded product (foam granule-molded product) of the present embodiment is obtained by foaming the foam granules and fusing them together. Examples of foam granule-molded products include parts of transport machinery such as automobiles, aircraft, railroad vehicles, and ships, and cushioning materials and housings for electric appliances. Examples of automobile parts include parts used in the vicinity of engines, exterior materials, heat insulating materials, and the like. Further examples of foam granule-molded products include food packaging containers such as fish boxes and vegetable boxes, cushioning materials used for industrial products such as electric appliances and automobiles, packing materials, structural members, heat insulating materials, and the like.

The size of the foam granule-molded product is not particularly limited, and is appropriately set in consideration of application.

The foam granule-molded product shows a single glass transition temperature Tg. When the polyester resin and the polyimide resin are compatible with each other, a single glass transition temperature Tg is shown. Since the foam granule-molded product has a single glass transition temperature Tg, the glass transition temperature Tg is higher than the glass transition temperature Tg1 of the polyester resin, and the heat resistance of the foam granule-molded product increases.

With respect to the glass transition temperature Tg of the foam granule-molded product, the same applies as for the glass transition temperature Tg of the resin foam-molded product such as the container 100.

The heat absorption-heat generation difference of the foam granule-molded product is preferably 3 to 35 J/g, more preferably 10 to 30 J/g, even more preferably 15 to 28 J/g. When the heat absorption-heat generation difference is not less than the lower limit value described above, the crystallinity increases, and the heat-dimensional stability of the foam granule-molded product are further enhanced. When the heat absorption-heat generation difference is not more than the upper limit value described above, excessive increase in crystallinity would not occur, and the impact resistance of the foam granule-molded product can be improved.

The heat absorption-heat generation difference is the difference between the heat absorption and the heat generation, determined by heat flux differential scanning calorimetry performed with a heating rate of 10° C./min.

In the foam granule-molded product, the temperature at which the loss tangent tan δ in solid viscoelasticity measurement at a heating rate of 5° C./min and a frequency of 1 Hz is maximized is preferably 120 to 230° C., more preferably 130 to 225° C., even more preferably 150 to 220° C. When the temperature at which the loss tangent tan δ is maximized is not lower than the lower limit value described above, the softening temperature of the foam granule-molded product increases, and the heat resistance of the foam granule-molded product can be further enhanced. When the temperature at which the loss tangent tan δ is maximized is not higher than the upper limit value described above, the softening temperature of the foam granule-molded product does not become excessively high, and the moldability can be further enhanced.

The resin foam-molded product (formed from the foam sheet) and the foam granule-molded product (hereinafter collectively referred to simply as the "molded product") may have an open cell ratio of, for example, preferably 20% or less, more preferably 18% or less, even more preferably 16% or less. When the open cell ratio of the molded product is not more than the upper limit value described above, the impact resistance of the molded product can be further enhanced. The open cell ratio of the molded product is determined by the method described in JIS K7138:2006 "Rigid Foamed Plastics—Determination of Open and Closed Cell Ratios".

The apparent density of the molded product is, for example, preferably 0.027 to 0.675 $g/cm^3$, more preferably 0.045 to 0.45 $g/cm^3$, even more preferably 0.0675 to 0.27 $g/cm^3$. When the apparent density of the molded product is not less than the lower limit value described above, the impact resistance of the molded article can be further enhanced. When the apparent density of the molded product is not more than the upper limit value described above, the molded product can be made lighter.

The expansion ratio of the molded article is, for example, preferably 2 to 50 times, more preferably 3 to 30 times, even more preferably 5 to 20 times. When the expansion ratio of the molded product is not less than the lower limit value described above, the impact resistance of the molded article can be further enhanced. When the expansion ratio of the molded product is not more than the upper limit value described above, the mechanical strength of the molded product can be further enhanced.

The average cell diameter of the molded product is, for example, preferably 5 to 500 μm, more preferably 10 to 400 μm, even more preferably 20 to 300 μm. When the average cell diameter of the molded product is not less than the lower limit value described above, the impact resistance of the molded article can be further enhanced. When the average cell diameter of the molded product is not more than the upper limit value described above, the surface smoothness of the molded product can be further enhanced.

The average cell diameter of the molded product can be measured according to the method described in ASTM D2842-69.

<Production Method>

The foam granule-molded product using foam granules can be produced by a conventionally known production method.

Examples of the method for producing the foam granule-molded product include the following methods.

1) A method in which foam granules (bulk expansion ratio: 2 to 50 times) are filled into a mold, and the mold is heated to cause secondary expansion of the foam granules to form secondary foam granules and to fuse them together, thereby performing in-mold foam molding to form a foam granule-molded product (expansion ratio: 2 to 50 times) (heat molding step).

2) A method in which foam granules are heated to form preliminary foamed granules that are foamed to a predetermined bulk expansion ratio (bulk expansion ratio: 2 to 50 times) (preliminary foaming step), and the preliminary foamed granules are filled into a mold, which is then heated to cause secondary expansion of the preliminary foamed granules to form secondary foam granules and to fuse them together, thereby performing in-mold foam molding to form a foam granule-molded product (expansion ratio: 2 to 50 times) (heat molding step).

The method of causing secondary foaming may be, for example, a method that heats the inside of a mold cavity with steam.

The temperature for secondary foaming is, for example, preferably 100 to 180° C.

The time for secondary foaming (that is, duration of supplying steam to the mold) is preferably 5 to 120 seconds.

In the secondary foaming, steam may be supplied into the cavity from the female mold side or may be supplied into the cavity from the male mold side, or these may be performed alternately.

Further, the foam granules may be impregnated with an inert gas or air (hereinafter referred to as “inert gas or the like”) to improve the secondary foamability of the foam granules (internal pressure imparting step). Examples of inert gases include carbon dioxide, nitrogen, helium, and argon.

The method for impregnating the foam granules with an inert gas or the like may be, for example, a method in which the foam granules are placed in an atmosphere of an inert gas or the like, which has a pressure higher than normal pressure, to thereby impregnate the foam granules with the inert gas or the like. The foam granules may be impregnated with the inert gas or the like before being filled into the mold, but may also be impregnated by placing the foam granules already filled into the mold in an atmosphere of the inert gas or the like together with the mold. When the inert gas is nitrogen, the foam granules may be left in a nitrogen atmosphere at a gauge pressure (based on atmospheric pressure) of 0.1 to 2 MPa over 20 minutes to 24 hours.

After the heat molding step, the foam granule-molded product in the mold may be further heated to increase the crystallinity of the thermoplastic resin (heat retention step).

Fourth Embodiment of Foam

The fourth embodiment is a modification of the first embodiment.

The fourth embodiment of the present invention is described below. The foam of the present embodiment is a laminated foam sheet.

Figure 8:
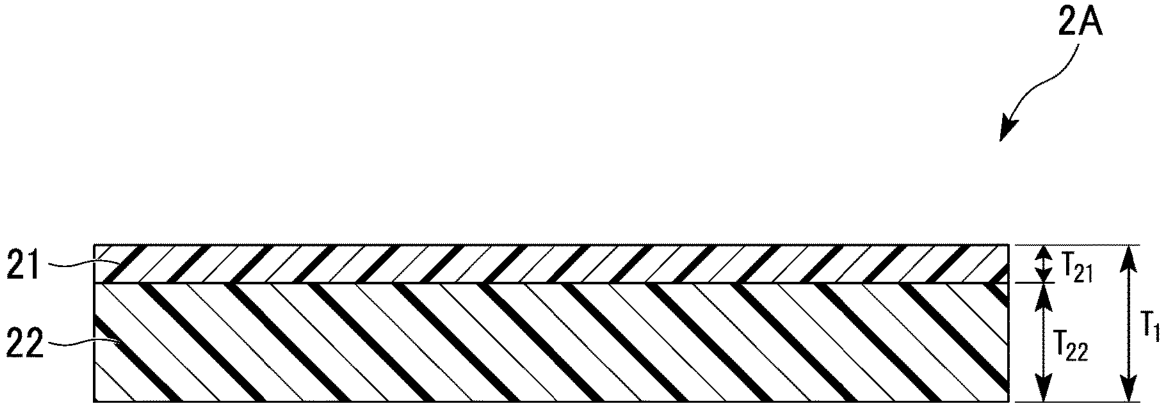
FIG. 8 is a cross-sectional view showing an example of the thermoplastic resin foam according to the fourth embodiment.

The laminated foam sheet 2A in FIG. 8 is used as a raw material sheet for a resin foam-molded product, a raw material sheet for folding boxes, a flat cushioning material, or the like. Examples of resin foam-molded products include containers such as thermoformed products, air pressure-formed products, and deep draw-molded products.

FIG. 8 is a cross-sectional view of the laminated foam sheet 2A of the present embodiment. The laminated foam sheet 2A has a foam layer 22 and a non-foam layer 21 provided on one side of the foam layer 22.

The thickness T1 of the laminated foam sheet 2A can be set in consideration of application. For example, when the laminated foam sheet 2A is for container molding, the thickness T1 is preferably 0.3 to 5.5 mm, more preferably 0.4 to 3.3 mm, even more preferably 0.5 to 2.7 mm. When the thickness T1 is not less than the lower limit value described above, the impact resistance and rigidity of the container can be enhanced. When the thickness T1 is not more than the upper limit value described above, the moldability of the laminated foam sheet 2A can be enhanced.

The thickness T22 of the foam layer 22 is also the same as the thickness T of the foam sheet 2.

With respect to the foam layer 22, the same applies as for the foam layer 22 according to the first embodiment.

The thickness T21 of the non-foam layer 21 is, for example, preferably 5 to 500 μm, more preferably 10 to 300 μm, even more preferably 15 to 200 μm. When the thickness T21 is not less than the lower limit value described above, the impact resistance and rigidity of the container can be enhanced. When the thickness T21 is not more than the upper limit value described above, the moldability of the laminated foam sheet 2A can be enhanced.

The non-foam layer may be a non-foam film having a thickness of less than 250 μm or a non-foam sheet having a thickness of 250 μm or more. Hereinafter, a non-foam film and a non-foam sheet may also be collectively referred to as a “non-foam film/sheet”.

The non-foam layer 21 is a layer which is composed of a resin containing a thermoplastic resin as a main component and is substantially free of cells. Further, the non-foam layer 21 is a layer which is substantially free of a blowing agent. Although the non-foam layer 21 is a layer substantially free of cells, the non-foam layer 21 may contain a slight amount of a blowing agent when the non-foam layer 21 is formed by a co-extrusion method or the like.

<Thermoplastic Resin>

Examples of thermoplastic resins forming the non-foam layer 21 include polyester resins, polyimide resins, polyolefin resins, polystyrene resins, and polyamide resins. One of these resins may be used alone, or two or more thereof may be used in combination.

The resin forming the non-foam layer 21 may be the same as or different from the resin forming the foam layer 22.

Examples of polyester resins include aromatic polyester resins and aliphatic polyester resins.

Examples of aromatic polyester resins include polyethylene terephthalate (PET), glycol-modified polyethylene terephthalate (copolymer of terephthalic acid, ethylene glycol and cyclohexanedimethanol) (PET-G), polycyclohexylene dimethylene terephthalate (PCT), glycol-modified polycyclohexylene dimethylene terephthalate (PCT-G), polybutylene terephthalate (PBT), polyethylene naphthalate (PEN), polytrimethylene terephthalate (PTT), polyethylene furanoate (PEF), polybutylene naphthalate (PBN), polyarylate (PAR), and the like.

Examples of aliphatic polyester resins include polycaprolactone (PCL), polybutylene succinate (PBS), polyethylene succinate (PES), polyglycolic acid (PGA), polylactic acid (PLA), polyhydroxybutyrate (PHB), polyethylene adipate (PEA), polybutylene succinate adipate (PBSA), and the like. As the polyester resin, a plant-derived polyethylene terephthalate (bio-PET) or a plant-derived polyethylene furanoate (bio-PEF) may be used.

One of these polyester resins may be used alone, or two or more thereof may be used in combination.

Preferred examples of polyester resins include polyethylene terephthalate (PET) and glycol-modified polyethylene terephthalate (PET-G).

Examples of polyimide resins include polyetherimides described in U.S. Pat. No. 4,141,927, Japanese Patent No. 2622678, Japanese Patent No. 2606912, Japanese Patent No. 2606914, Japanese Patent No. 2596565, Japanese Patent No.

2596566, Japanese Patent No. 2598478, etc., and polymers described in Japanese Patent No. 2598536, Japanese Patent No. 2599171, Japanese Patent Application Unexamined Publication No. Hei 9-48852, Japanese Patent No. 2565556, Japanese Patent No. 2564636, Japanese Patent No. 2564637, Japanese Patent No. 2563548, Japanese Patent No. 2563547, Japanese Patent No. 2558341, Japanese Patent No. 2558339, and Japanese Patent No. 2834580.

As long as the effects of the present invention are not impaired, the main chain of the polyimide resin may contain structural units other than cyclic imide. Examples of structural units other than cyclic imides include aromatic, aliphatic, alicyclic and alicyclic ester units, and oxycarbonyl units.

One of these polyimide resins may be used alone, or two or more thereof may be used in combination. Preferred examples of polyimide resins include polyetherimide resins.

Examples of polyolefin resins include polyethylene resins and polypropylene resins.

Examples of polyethylene resins include a high-density polyethylene resin (PE-HD) produced by a catalyst method (medium-low pressure polymerization method) with almost no branching in its molecular structure and a high density of 942 $kg/m^3$ or more; a linear low-density polyethylene resin (PE-LLD) produced by introducing a comonomer to achieve a density of 910 $kg/m^3$ or more and 925 $kg/m^3$ or less; a medium-density polyethylene resin (PE-MD) produced so as to have a density falling between the densities of the linear low-density polyethylene resin (PE-LLD) and the high-density polyethylene resin (PE-HD); a low-density polyethylene resin (PE-LD) produced by high-pressure polymerization method so as to have long-chain branches in its molecular structure; and a very low-density polyethylene resin (PE-VLD). A plant-derived polyethylene (bio-PET) may be used as the polyethylene resin.

One of these polyethylene resins may be used alone, or two or more thereof may be used in combination.

Examples of polypropylene resins include block polypropylene (block-PP), homopolypropylene (homo-PP), and high melt-strength polypropylene (HMS-PP). The block-PP generally has polyethylene dispersed in a homo-PP and an EPR phase (ethylene-propylene-rubber phase) surrounding the polyethylene. Such a block-PP is produced by polymerization of propylene gas in the former stage to obtain a homo-PP, followed by polymerization with an EPR in the presence of ethylene gas in the subsequent stage.

A plant-derived polypropylene (bio-PP) may be used as the polypropylene resin.

One of these polypropylene resins may be used alone, or two or more thereof may be used in combination.

Examples of polystyrene resins include homopolymers or copolymers of styrene monomers such as styrene, α-methylstyrene, vinyltoluene, chlorostyrene, ethylstyrene, propylstyrene, dimethylstyrene, and bromostyrene; copolymers of styrene monomers as a main component with vinyl monomers polymerizable therewith; and a so-called high-impact polystyrene which is a copolymer of styrene monomers with a rubber component such as butadiene, or is a mixture or polymer of a homopolymer of styrene monomers or copolymers thereof, or a copolymer of styrene monomers and vinyl monomers, with a diene rubbery polymer.

Examples of vinyl monomers polymerizable with styrene monomers include alkyl (meth)acrylates such as methyl (meth)acrylate, ethyl (meth)acrylate, butyl (meth)acrylate and cetyl (meth)acrylate; and bifunctional monomers such as (meth)acrylonitrile, dimethyl maleate, dimethyl fumarate, diethyl fumarate, ethyl fumarate, divinylbenzene, and alkylene glycol dimethacrylate. With respect to these vinyl monomers, a single type thereof may be used individually or two or more types thereof may be used in combination.

Examples of diene rubbery polymers include polybutadiene, styrene-butadiene copolymers, and ethylene-propylene-nonconjugated diene ternary copolymers.

A plant-derived polystyrene (bio-PS) may be used as the polystyrene resin.

One of these polystyrene resins may be used alone, or two or more thereof may be used in combination.

Examples of polyamide resins include nylon 4, nylon 6, nylon 11, nylon 12, and nylon 66.

One of these polyamide resins may be used alone, or two or more thereof may be used in combination.

Preferred examples of polyamide resins include nylon 4 and nylon 6.

Examples of resins other than polyester resins, polyimide resins, polyolefin resins, polystyrene resins and polyamide resins (other resins) include ethylene vinyl alcohol (EVOH), polyphenylene ether (PPE), polycarbonate (PC), polyphenylsulfone (PPSU), polysulfone (PSU), and polyethersulfone (PESU).

One of these other resins may be used alone, or two or more thereof may be used in combination.

<Optional Components>

The non-foam layer 21 may contain optional components (non-foam layer-optional components) other than the resins described above.

Examples of non-foam layer-optional components include ultraviolet absorbers, antioxidants, colorants, lubricants, flame retardants, antistatic agents, and the like. One of these non-foam layer-optional components may be used alone, or two or more thereof may be used in combination.

<Production Method>

The method for producing the laminated foam sheet 2A includes a step of forming the foam layer 22 (foam layer forming step) and a step of providing the non-foam layer 21 on one surface of the foam layer 22 (lamination step).

For example, the laminated foam sheet 2A can be produced by the following methods.

(1) A method in which a foam sheet to serve as the foam layer 22 and a non-foam film/sheet to serve as the non-foam layer 21 are produced respectively, the non-foam film/sheet and the foam sheet are laminated in this order, and the resulting is subjected to thermocompression bonding (thermocompression bonding method).

(2) A method in which a non-foam film/sheet and a foam sheet are laminated in this order, and the layers are bonded together with an adhesive (lamination method).

(3) A method in which a resin as a raw material of a non-foam layer is extruded onto the surface of a foam sheet with a T-die (T-die method).

(4) A method in which a laminate including the foam layer 22 and the non-foam layer 21 provided thereon is obtained by co-extrusion (co-extrusion method). In the co-extrusion method, the foam layer forming step and the lamination step are performed in one step.

In the present embodiment, the non-foam layer is provided only on one side of the foam layer, but the present invention is not limited to this example, and the non-foam layer may be provided on both sides of the foam layer.

Fifth Embodiment of Foam

The fifth embodiment is a modification of the first embodiment.

The fifth embodiment of the present invention is described below. The foam of the present embodiment is a foam sheet consisting only of a foam layer. However, the foam sheet in the present embodiment has two or more adjacent foam layers. Further, all of the foam layers in the present embodiment are foams of the present invention. That is, the foam sheet of the present embodiment has a first foam layer and a second foam layer provided on at least one surface of the first foam layer.

The foam sheet of the present embodiment is used as a raw material sheet for a resin foam-molded product, a raw material sheet for folding boxes, a flat cushioning material, or the like. Examples of resin foam-molded products include containers such as thermoformed products, air pressure-formed products, and deep draw-molded products.

The thickness of the foam sheet of the present embodiment is set in consideration of the application of the foam sheet, etc. For example, when the foam sheet is for container molding, the thickness is preferably 0.3 to 5.0 mm, more preferably 0.4 to 3.0 mm, even more preferably 0.5 to 2.5 mm. When the thickness is not less than the lower limit value described above, the impact resistance and rigidity of the container can be enhanced. When the thickness is not more than the upper limit value described above, the moldability of the foam sheet 2 can be enhanced.

With respect to each of the foam layers in the foam sheet of the present embodiment, the same applies as for the foam layer in the first embodiment.

The number of foam layers in the foam sheet of the present embodiment is not particularly limited but is, for example, preferably 2 to 4, more preferably 2 to 3.

The densities of the foam layers in the foam sheet of the present embodiment may be the same or different from each other.

The thicknesses of the foam layers in the foam sheet of the present embodiment may be the same or different from each other.

The basis weights of the foam layers in the foam sheet of the present embodiment may be the same or different from each other.

The closed cell ratios of the foam layers in the foam sheet of the present embodiment may be the same or different from each other.

The compositions of the foam layers in the foam sheet of the present embodiment may be the same or different from each other. Therefore, the proportions of the polyester resin and the polyimide resin in the foam layers may be the same or different from each other.

<Production Method>

The foam sheet production method of the present embodiment is described below, taking as an example a foam sheet composed of two foam layers.

The foam sheet production method according to the present embodiment includes a step of forming a first foam layer (first foam layer forming step), a step of forming a second foam layer (second foam layer forming step), and a step of providing the second foam layer on at least one surface of the first foam layer (lamination step).

The first foam layer forming step and the second foam layer forming step are the same as the method for producing the foam sheet 2 in the first embodiment.

Examples of the lamination step include the following methods.

(1) A method in which a first foam sheet to serve as the first foam layer and a second foam sheet to serve as the second foam layer are produced separately, the first foam sheet and the second foam sheet are laminated in this order, and the resulting is subjected to thermocompression bonding (thermocompression bonding method).

(2) A method in which a first foam sheet and a second foam sheet are laminated in this order, and the layers are bonded together with an adhesive (lamination method).

(3) A method in which a laminate including the second foam layer provided on the first foam layer is obtained by co-extrusion (co-extrusion method). In the co-extrusion method, the first foam layer forming step, the second foam layer forming step and the lamination step are performed in one step.

The foam sheet of the present embodiment has only two or more foam layers, but the present invention is not limited to this example and, for example, the non-foam layer may be provided on one of both sides of the foam composed of two or more foam layers. Alternatively, the foam sheet of the present invention may be provided with the non-foam layer between the foam layers of the foam composed of two or more foam layers.

Sixth Embodiment of Foam

The sixth embodiment is a modification of the first embodiment.

The sixth embodiment of the present invention is described below. The foam of the present embodiment has a foam layer and a surface material provided on at least one surface of the foam layer. Examples of methods for laminating the foam layer and the surface material include a thermocompression bonding method, a lamination method, and a coextrusion method.

The foam sheet of the present embodiment is used as a raw material sheet for a resin foam-molded product, a raw material sheet for folding boxes, a flat cushioning material, or the like. Examples of resin foam-molded products include containers such as thermoformed products, pressure-molded products, and deep draw-formed products, parts of transport machinery such as automobiles, aircraft, railroad vehicles, and ships, and cushioning materials and housings for electric appliances. Examples of automobile parts include parts used in the vicinity of engines, interior materials, exterior materials, heat insulating materials, sound absorbing materials, and the like.

Examples of surface materials include fiber-reinforced plastics, cloths, papers, foam sheets (excluding the foam of the present invention), decorative films, and the like.

The fiber-reinforced plastics are products made by impregnating reinforcing fibers with a reinforcing synthetic resin. The impregnated reinforcing synthetic resin can bind and integrate the reinforcing fibers. The reinforcing synthetic resin with which the reinforcing fibers are impregnated may be either a thermoplastic resin or a thermosetting resin, but the thermosetting resin is preferred.

The thermosetting resins are not particularly limited, and examples thereof include epoxy resins, unsaturated polyester resins, phenol resins, melamine resins, polyurethane resins, silicone resins, maleimide resins, vinyl ester resins, cyanate ester resins, and resins obtained by prepolymerizing maleimide resin and cyanate ester resin. Among these, epoxy resins and vinyl ester resins are preferable in terms of excellent heat resistance, impact absorption and chemical resistance. The thermosetting resin may contain additives such as curing agents and curing accelerators. With respect to the thermosetting resin, a single type thereof may be used individually or two or more types thereof may be used in combination.

The thermoplastic resin is not particularly limited, and examples thereof includes olefin resins, polyester resins, thermoplastic epoxy resins, amide resins, thermoplastic polyurethane resins, sulfide resins, and acrylic resins. Among these, polyester resins and thermoplastic epoxy resins are preferable because they show excellent adhesiveness to the extruded foam sheet of a thermoplastic polyester resin or can provide excellent adhesiveness between the reinforcing fibers in the fiber-reinforced plastic layer. With respect to the thermoplastic resin, a single type thereof may be used individually or two or more types thereof may be used in combination.

Examples of reinforcing fibers in the fiber-reinforced plastic layer include inorganic fibers such as glass fibers, carbon fibers, silicon carbide fibers, alumina fibers, tyranno fibers, basalt fibers, and ceramic fibers; metal fibers such as stainless steel fibers, and steel fibers; organic fibers such as aramid fibers, polyethylene fibers, and polyparaphenylene benzoxadol (PBO) fibers; and boron fibers. With respect to the reinforcing fibers, a single type thereof may be used individually or two or more types thereof may be used in combination. As the reinforcing fibers, carbon fibers, glass fibers and aramid fibers are preferable, and carbon fibers are more preferable.

Examples of cloths include woven fabrics and non-woven fabrics. Examples of fibers that constitute woven fabrics and non-woven fabrics include natural fibers, chemical fibers, and the like. Examples of natural fibers include plant fibers such as cotton and hemp, and animal fibers such as silk and wool. Examples of chemical fibers include regenerated fibers, semi-synthetic fibers, and synthetic fibers. Examples of regenerated fibers include rayon, cupra, and polynosic. Examples of semi-synthetic fibers include acetate fibers, triacetate fibers, and promix fibers. Examples of synthetic fibers include acrylic fibers, polyester fibers, nylon fibers, and polyurethane fibers. One of these fibers may be used alone, or two or more of these may be used in combination.

Examples of papers include kraft papers, fine papers, glassine papers, Kent papers, parchment papers, synthetic papers, coated papers, and release papers. One of these papers may be used alone, or two or more of these may be used in combination.

Examples of the surface material of the foam sheet includes foam sheets other than the foam sheet of the present invention. Examples of resins forming the foam sheet other than the foam sheet of the present invention include polyester resins, polyimide resins, polyolefin resins, polystyrene resins, and polyamide resins. One of these resins may be used alone, or two or more thereof may be used in combination. Polyester resins and polyimide resins are preferable, and polyethylene terephthalate resins and polyetherimide resins are more preferable, since the foam sheet of these resins can be laminated with the foam sheet of the present invention by a thermocompression bonding method or a coextrusion method.

(Fiber-Reinforced Resin Composite)

The fiber-reinforced resin composite of the present embodiment has a sheet-form thermoplastic resin foam layer and fiber-reinforced resin layers positioned on one side or both sides of the thermoplastic resin foam layer.

As a preferred example of the present embodiment, a fiber-reinforced resin composite having fiber-reinforced resin layers positioned on both sides of a sheet-form thermoplastic resin foam layer is described below. The fiber-reinforced resin composite may have fiber-reinforced resin layers on both sides of the thermoplastic resin foam layer, or may have a fiber-reinforced resin layer on one side of the thermoplastic resin foam layer. The thermoplastic resin foam layer of the fiber-reinforced resin composite may be composed of a single foam layer, or may have two or more foam layers.

The thermoplastic resin foam layer includes a polyester resin and a polyimide resin.

The fiber-reinforced resin composite is excellent in heat resistance and mechanical strength, and can be widely used as component parts for transportation equipment. In addition, the fiber-reinforced resin can also be suitably used as construction materials, wind turbine blades, robot arms, housings for electric appliances, cushioning materials for helmets, agricultural boxes, transportation containers such as heat and cold insulation containers, rotor blades for industrial helicopters, and packing materials for parts.

Examples of transportation equipment component parts include structural members that form the bodies of transportation equipment such as automobiles, aircraft, railroad vehicles, and ships. Examples of structural members that form the body of an automobile include door panels, door inners, bumpers, fenders, fender supports, engine covers, roof panels, trunk lids, floor panels, center tunnels, crash boxes, cowls, and the like. For example, when used for a door panel that has conventionally been manufactured from a steel plate, the fiber-reinforced resin composite can provide a door panel having substantially the same rigidity as that made from a steel plate, while significantly reducing weight, so that the weight of automobiles can be reduced.

One embodiment of the fiber-reinforced resin composite is described below with reference to a drawing.

Figure 19:
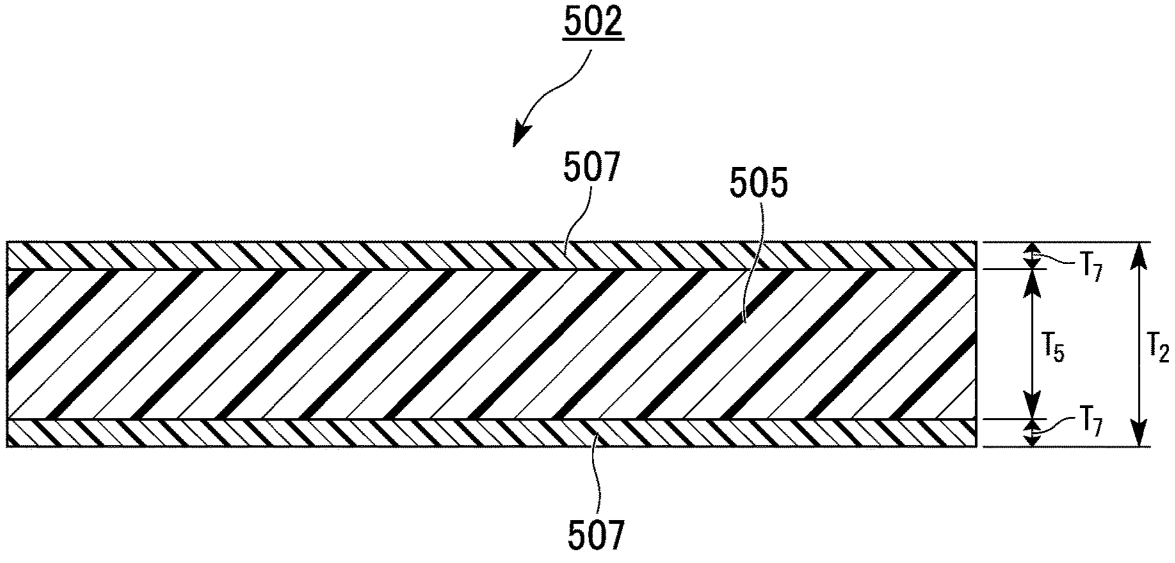
FIG. 19 is a cross-sectional view showing an example of the fiber-reinforced resin composite according to one embodiment of the present invention.

FIG. 19 is a cross-sectional view of the fiber-reinforced resin composite 502 of the present embodiment. The fiber-reinforced resin composite 502 has a sheet-form thermoplastic resin foam layer 505 and fiber-reinforced resin layers 507 positioned on both sides of the thermoplastic resin foam layer 505.

The thickness $T_2$ of the fiber-reinforced resin composite 502 can be set in consideration of the application. For example, when the fiber-reinforced resin composite 502 is for container molding, the thickness $T_2$ is preferably 0.3 to 5.0 mm, more preferably 0.4 to 3.0 mm, even more preferably 0.5 to 2.5 mm. When the thickness $T_2$ is not less than the lower limit value described above, the impact resistance and rigidity of the container can be enhanced. When the thickness $T_2$ is not more than the upper limit value described above, the moldability of the fiber-reinforced resin composite 502 can be enhanced.

The thickness $T_2$ can be measured using, for example, a dial thickness gauge.

<<Thermoplastic Resin Foam Layer>>

The thermoplastic resin foam layer (hereinafter also simply referred to as "foam layer") 505 is a sheet-form foam layer (foam sheet). The foam layer 505 is formed by foaming a thermoplastic resin composition. The thermoplastic resin composition is the same as the thermoplastic resin composition in the first embodiment. Also, the ranges of the amounts of the components contained in the foam layer 505 and optional components that may be contained in the foam layer 505 are the same as in the case of the foam sheet 2.

The foam layer 505 formed by foaming the thermoplastic resin composition has two or more cells in a matrix formed of the thermoplastic resin.

The thermoplastic resin of the foam layer 505 includes a polyester resin and a polyimide resin. The presence of both the polyester resin and the polyimide resin improves the heat resistance of the fiber-reinforced resin composite 502 of the present embodiment.

<Other Resins>

The foam layer 505 is substantially free of thermosetting resin. In this context, the expression "substantially free of" means that a thermosetting resin is not included at all or included in such an amount that the quality of the foam layer 505 is not affected. The amount of the thermosetting resin contained in the foam layer 505 is preferably 5 parts by mass or less, more preferably 2 parts by mass or less, even more preferably 1 part by mass or less, and most preferably 0 mass parts by mass, with respect to 100 parts by mass of the thermoplastic resin.

The crystallinity of the foam layer 505 is preferably 2 to 25%, more preferably 3 to 21%. When the crystallinity of the foam layer 505 is not less than the lower limit value described above, the heat resistance and the heat-dimensional stability can be further enhanced. When the crystallinity of the foam layer 505 is not more than the upper limit value described above, the moldability improves, and a fiber-reinforced resin composite 502 having an excellent appearance can be obtained.

The crystallinity of the foam layer 505 is determined by the method described in the Examples section.

With respect to the properties of the foam layer 505, such as the glass transition temperature Tg, the heat absorption-heat generation difference, and the slope r, the same applies as for the foam sheet 2. Regarding the thickness $T_5$ of the foam layer 505 as well, the same applies as for the thickness T of the foam sheet 2.

Further, regarding the properties of the foam layer 505, such as the open cell ratio, the basis weight, the apparent density, the expansion ratio, and the average cell diameter, the same applies as for the foam layer 22.

<<Fiber-Reinforced Resin Layer>>

The fiber-reinforced resin layer 507 is a skin material provided on both sides of the foam layer 505. The presence of the fiber-reinforced resin layer 507 allows the fiber-reinforced resin composite 502 to have further improved mechanical strength.

The fibers contained in the fiber-reinforced resin layer 507 are not particularly limited, and examples thereof include carbon fibers, glass fibers, aramid fibers, boron fibers, and metal fibers. As the fibers contained in the fiber-reinforced resin layer 507, carbon fibers, glass fibers, and aramid fibers are preferable, and carbon fibers are more preferable, in terms of excellent mechanical strength and heat resistance.

The form of the fiber-reinforced resin layer 507 is not particularly limited, and examples thereof include woven fabrics, knitted fabrics, non-woven fabrics, and face materials made by binding (stitching) fiber bundles (strands) in which fibers run in one direction with a synthetic resin thread such as a polyamide resin and a polyester resin, or a stitch thread such as a glass fiber thread. Regarding the weaving technique for the woven fabric, it may be plain weave, twill weave, satin weave or the like.

The fiber-reinforced resin layer 507 may be (1) a multi-layer face material obtained by laminating a plurality of woven fabrics, knitted fabrics, non-woven fabrics, or any combination thereof, or (2) a multi-layer face material obtained by laminating a plurality of face materials each obtained by binding (stitching) fiber bundles (strands) in which fibers run in one direction with a synthetic resin thread such as a polyamide resin and a polyester resin, or a stitch thread such as a glass fiber thread, so as to vary the fiber directions of the fiber bundles, and unifying (stitching) the laminated face materials together with a synthetic resin thread such as a polyamide resin and a polyester resin, or a stitch thread such as a glass fiber thread.

Examples of resins contained in the fiber-reinforced resin layer 507 include uncured thermosetting resins and thermoplastic resins. The thermosetting resins are not particularly limited, and examples thereof include epoxy resins, unsaturated polyester resins, phenolic resins, melamine resins, polyurethane resins, silicone resins, maleimide resins, vinyl ester resins, cyanate ester resins, and resins obtained by prepolymerizing maleimide resins with cyanate ester resins. As the thermosetting resin, epoxy resins and vinyl ester resins are preferable because these are excellent in heat resistance, elastic modulus and chemical resistance. The thermosetting resin may contain additives such as curing agents and curing accelerators. With respect to the thermosetting resin, a single type thereof may be used individually or two or more types thereof may be used in combination.

The thermoplastic resins are not particularly limited, and examples thereof include polyolefin resins such as polyethylene resins and polypropylene resins, acrylic resins, polyester resins, polyamide resins, and polycarbonate resins.

The amount of the resin contained in the fiber-reinforced resin layer 507 is preferably 20 to 70% by mass, more preferably 30 to 60% by mass, based on the total mass of the fiber-reinforced resin layer 507. When the resin content is not less than the lower limit value described above, the bonding between the fibers is further enhanced, and the mechanical strength of the resulting fiber-reinforced resin composite 502 is further enhanced. When the resin content is not more than the upper limit value described above, it is possible to prevent the resin from being excessively present between the fibers, so that the mechanical strength of the fiber-reinforced resin layer 507 is further enhanced, and the mechanical strength of the resulting fiber-reinforced resin composite 502 is further enhanced.

The method for impregnating the fiber-reinforced resin layer 507 with the resin is not particularly limited, and examples thereof includes (1) a method that immerses the fibers in the resin, and (2) a method that coats the fibers with the resin.

In the present embodiment, the materials of the fiber-reinforced resin layers 507 positioned on both sides of the foam layer 505 may be the same or different.

The thickness $T_7$ of the fiber-reinforced resin layer 507 is, for example, preferably 0.1 to 5 mm, more preferably 0.3 to 3 mm. When the thickness $T_7$ of the fiber-reinforced resin layer 507 is not less than the lower limit value described above, the mechanical strength of the fiber-reinforced resin composite 502 can be further increased. When the thickness $T_7$ of the fiber-reinforced resin layer 507 is not more than the upper limit value described above, the weight of the fiber-reinforced resin composite 502 can be further reduced.

In the present embodiment, the thicknesses $T_7$ of the fiber-reinforced resin layers 507 positioned on both sides of the foam layer 505 may be the same or different.

The basis weight of the fiber-reinforced resin layer 507 is, for example, preferably 50 to 4000 $g/m^2$, more preferably 100 to 1000 $g/m^2$. When the basis weight of the fiber-reinforced resin layer 507 is not less than the lower limit value described above, the mechanical strength of the fiber-reinforced resin composite 502 can be further increased. When the basis weight of the fiber-reinforced resin layer 507 is not more than the upper limit value described above, the weight of the fiber-reinforced resin composite 502 can be further reduced.

[Method for Producing Fiber-Reinforced Resin Composite]

The fiber-reinforced resin composite 502 is produced by a conventionally known production method. The fiber-reinforced resin composite 502 is produced by first producing a foam layer 505 and then providing a fiber-reinforced resin layer 507 on the surface of the foam layer 505.

For example, the method for producing the foam layer (foam sheet) 505 may be the same as the method for producing the foam sheet 2 described above.

The method for providing the fiber-reinforced resin layer 507 on the surface of the foam layer 505 is not particularly limited, and examples thereof include: (1) a method in which the fiber-reinforced resin layer 507 is laminated on and bonded to the surface of the foam layer 505 via an adhesive; (2) a method in which the fiber-reinforced resin layer 507 impregnated with a thermoplastic resin is laminated on the surface of the foam layer 505, and the fiber-reinforced resin layer 507 is bonded to the surface of the foam layer 505 using the thermoplastic resin as a binder; (3) a method in which the fiber-reinforced resin layer 507 impregnated with an uncured thermosetting resin is laminated on the surface of the foam layer 505, and the fiber-reinforced resin layer 507 is bonded to the foam layer 505 using a cured product of the thermosetting resin as a binder; and (4) a method in which the fiber-reinforced resin layer 507 softened by heating is laminated on the surface of the foam layer 505, and the fiber-reinforced resin layer 507 is pressed against the surface of the foam layer 505 to bond the fiber-reinforced resin layer 507 to the foam layer 505. In the method (4), it is also possible to deform the fiber-reinforced resin layer 507 to match the surface of the foam layer 505. In this context, since the foam layer 505 of the present embodiment has excellent load resistance in a high-temperature environment, the method (4) can also be suitably used.

By these methods, the fiber-reinforced resin layer 507 is integrally provided on the surface of the foam layer 505.

Examples of methods for bonding the fiber-reinforced resin layer 507 to the surface of the foam layer 505 include an autoclave method, a hand lay-up method, a spray-up method, a PCM (Prepreg Compression Molding) method, an RTM (Resin Transfer Molding) method, VaRTM (Vacuum Assisted Resin Transfer Molding) method, and the like.

Hereinbelow, the method for bonding the fiber-reinforced resin layer 507 to the surface of the foam layer 505 (hereinafter also referred to as "composite-forming") is described more specifically with reference to FIG. 20.

Figure 20:
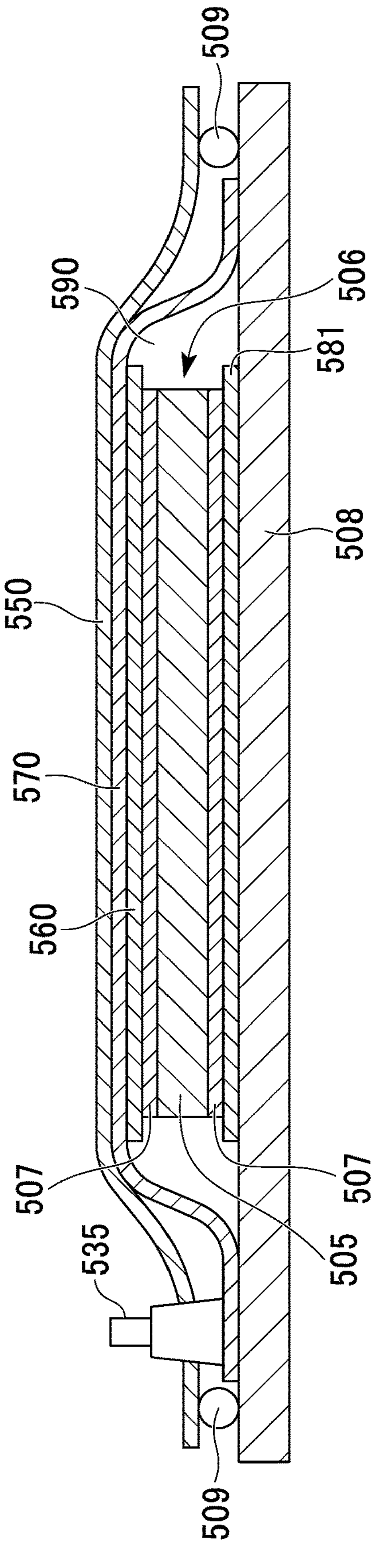
FIG. 20 is a schematic cross-sectional view showing procedure for producing the fiber-reinforced resin composite according to one embodiment of the present invention.
Figure 21:
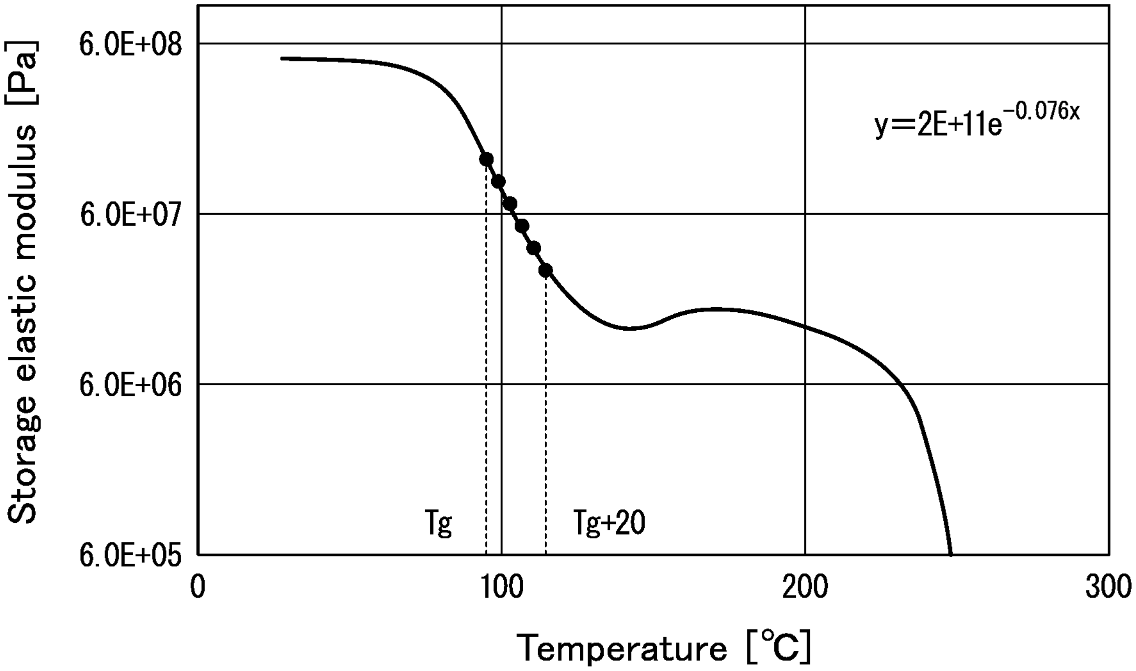
FIG. 21 is a graph showing the measurement results for the storage elastic modulus E' of the thermoplastic resin foam layer before composite formation, which was used in the production of the fiber-reinforced resin composite of Example 10C.
Figure 22:
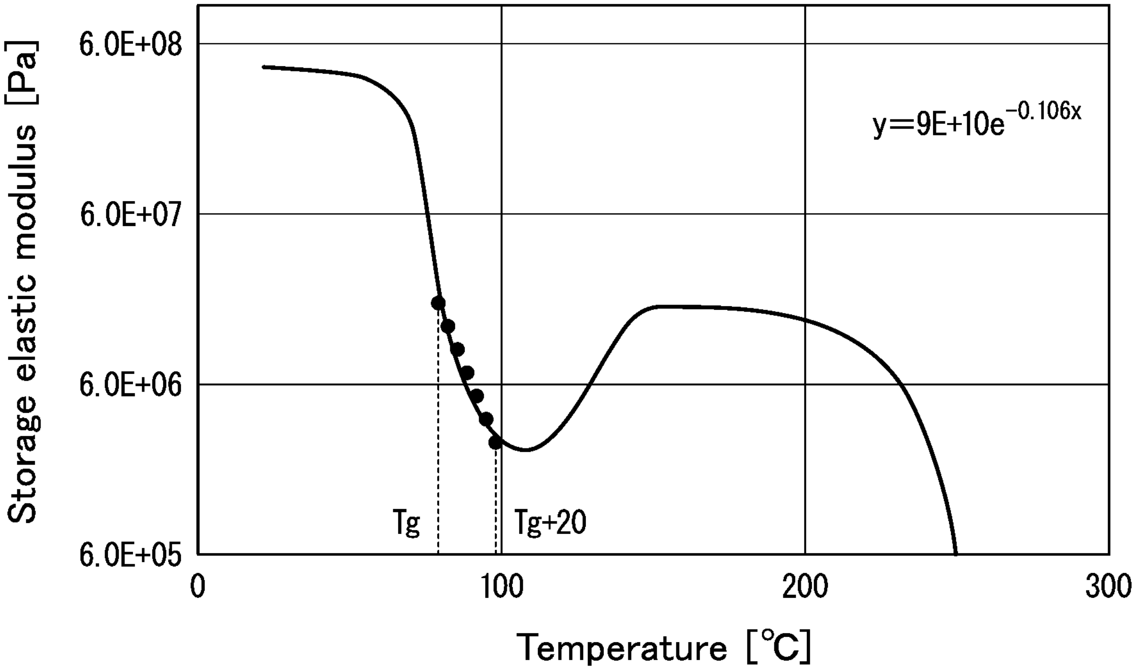
FIG. 22 is a graph showing the measurement results for the storage elastic modulus E' of the thermoplastic resin foam layer before composite formation, which was used in the production of the fiber-reinforced resin composite of Comparative Example 1C.
Figure 23:
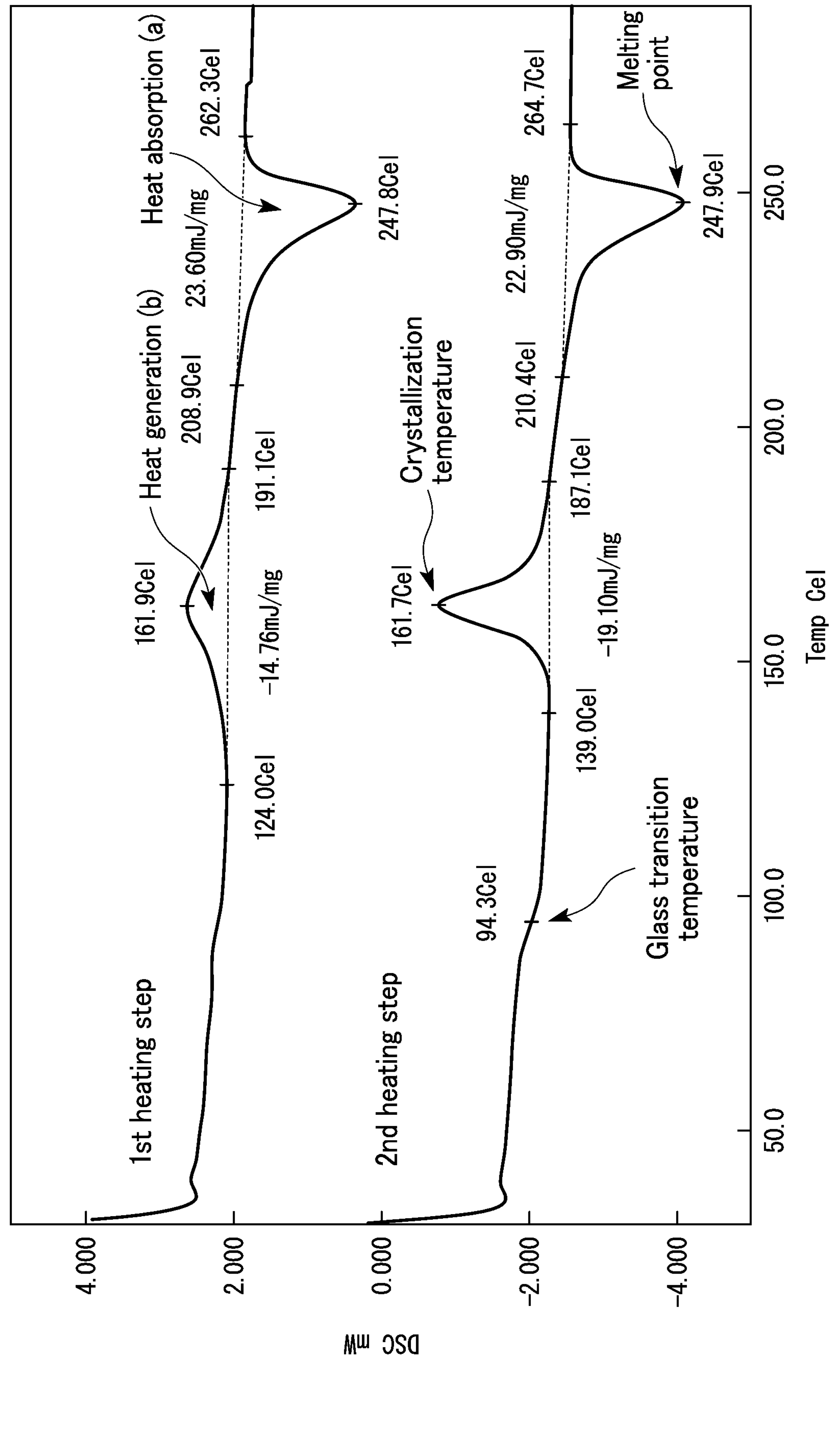
FIG. 23 is a DSC curve of the thermoplastic resin foam layer before composite formation, which was used in the production of the fiber-reinforced resin composite of Example 10C.

As shown in FIG. 20, a laminate 506 is formed by laminating the fiber-reinforced resin layer 507 on the surface of the foam layer 505.

Further, a breather cloth 570 is laminated on the fiber-reinforced resin layer 507 of the laminate 506 through a release film 560. In FIG. 20, the breather cloth 570 laminated on the upper surface of the laminate 506 is laminated on the fiber-reinforced resin layer 507 of the laminate 506 via the release film 560 so as to cover the side surfaces of the laminate 506 as well. The breather cloth 570 is preferably laminated on the upper surface of the laminate 506 so as to cover both side surfaces of the laminate 506, and more preferably laminated so as to cover the entire laminate 506. By laminating the breather cloths 570 in this manner, the extra thermosetting resin in the fiber-reinforced material 507 laminated on both sides of the foam layer 505 can be absorbed and removed by the single breather cloth 570. FIG. 20 shows an example where the breather cloth 570 is laminated only on one of the fiber-reinforced resin layers 507 through the release film 560; however, the breather cloth 570 may be laminated on both of the fiber-reinforced resin layers 507 through the release film 560. Also, the breather cloth 570 does not necessarily have to cover the side surfaces of the laminate 506.

The release film 560 is configured to be easily removable from the fiber-reinforced resin layer 507. The release film 560 is composed of a synthetic resin film. The release film 560 preferably has through-holes penetrating between the front and back surfaces thereof, because the excess thermosetting resin impregnated in the fiber-reinforced resin layer 507 can be smoothly absorbed by the breather cloth 570.

If the release film 560 does not have through-holes, the excess thermosetting resin impregnated in the fiber-reinforced resin layer 507 is absorbed by the breather cloth 570 through the outside of the release film 560.

When the release film 560 has a large number of through-holes penetrating between the front and back surfaces thereof, the excess thermosetting resin impregnated in the fiber-reinforced resin layer 507 is allowed to be absorbed by the breather cloth 570 through the through-holes of the release film 560. Examples of the synthetic resin forming the release film 560 include fluoro resins such as tetrafluoroethylene-ethylene copolymer (tetrafluoroethylene-ethylene copolymer).

The breather cloth 570 is used to absorb excess thermosetting resin impregnated in the fiber-reinforced resin layer 507. The breather cloth 570 may be any material as long as it would not be deformed or denatured when the laminate 506 is heated or pressurized, and examples thereof include nonwoven fabric. Examples of nonwoven fabrics include nonwoven fabrics composed of amide resin fibers such as nylon fibers and polyester resin fibers, and glass cloth.

The laminate 506 is then placed on mold 508, and a bagging film 550 is placed over the laminate 506 to seal the laminate 506 with the bagging film 550. The operation of laminating the release film 560 and the breather cloth 570 onto the laminate 506 may be performed on the mold 508 or before placing the laminate 506 on the mold 508. The bagging film 550 is a film for sealing the laminate 506 and evacuating the entire laminate 506. Examples of synthetic resins forming the bagging film 550 include amide resins such as nylon. A sealing material 509 is interposed between the entire periphery of the bagging film 550 and the mold 508 which face each other, to ensure airtightness. On the mold 508 in the bagging film 550, the fiber-reinforced resin layers 507, 507 impregnated with uncured thermosetting resin may be laminated on the surfaces of the foam layer 505 to form the laminate 506. A release treatment 581 is implemented on the surface of the mold 508 on which the laminate 506 is placed so that the fiber-reinforced resin layer of the resulting fiber-reinforced resin composite can be easily removed.

FIG. 20 explains an example where the laminate 506 is placed on the mold 508 and the bagging film 550 is placed over the laminate 506 to seal the laminate 506 with the bagging film 550; however, the bagging film 550 may be formed in a bag-shape to accommodate the laminate 506 in the bagging film 550 to seal the laminate 506 with the bagging film 550.

Thereafter, the space 590 sealed with the bagging film 550 is evacuated to reduce the pressure in the space 590. The degree of vacuum in the space 590 is preferably 0.08 to 0.14 MPa, more preferably 0.10 to 0.12 MPa. When the degree of vacuum in the space 590 is not less than the lower limit value described above, the air present in the fiber-reinforced resin layer 507 can be sufficiently discharged, the generation of voids in the fiber-reinforced resin layer 507 can be suppressed, and a decrease in the mechanical strength of the fiber-reinforced resin composite 502 can be suppressed. When the degree of vacuum in the space 590 is not more than the upper limit value described above, it is possible to prevent the thermosetting resin impregnated into the fiber-reinforced resin layer 507 from being sucked away, and to prevent the decrease in the mechanical strength of the fiber-reinforced resin layer 507. As a result, a decrease in the mechanical strength of the fiber-reinforced resin composite 502 can be suppressed.

Then, after completion or simultaneously with initiation of the pressure reduction of the space 590 sealed with the bagging film 550, the laminate 506 in the space 590 is heated to soften the thermosetting resin in the fiber-reinforced resin layer 507. After the thermosetting resin is softened, the laminate 506 is pressurized and the heating is continued. It is preferable that the pressure-reduced state in the space 590 is maintained during the heating and pressurization of the laminate 506.

The heating temperature for heating the laminate 506 is, for example, preferably 70 to 110° C., more preferably 80 to 100° C. When the heating temperature is not lower than the lower limit value described above, the thermosetting resin in the fiber-reinforced resin layer 507 can be sufficiently softened. When the heating temperature is not higher than the upper limit value described above, deterioration of the laminate 506 can be suppressed.

The degree of pressurization (applied pressure) of the laminate 506 is preferably 0.05 to 1.5 MPa, more preferably 0.1 to 1.0 MPa. When the applied pressure is not less than the lower limit value described above, the air in the fiber-reinforced resin layer 507 can be sufficiently discharged, the generation of voids in the fiber-reinforced resin layer 507 can be suppressed, and the decrease in mechanical strength of the fiber-reinforced resin composite 502 can be suppressed. Further, when the applied pressure is not less than the lower limit value described above, the thermosetting resin in the fiber-reinforced resin layer 507 can be well blended with the entire fiber-reinforced resin layer 507, the decrease in mechanical strength of the fiber-reinforced resin layer 507 can be suppressed, and the decrease in mechanical strength of the fiber-reinforced resin composite 502 can be suppressed. When the applied pressure is not more than the upper limit value described above, the deformation of the foam layer 505 can be suppressed.

By pressurizing the laminate 506, the air in the fiber-reinforced resin layer 507 can be removed with higher certainty, and the generation of voids in the fiber-reinforced resin layer 507 can be prevented. In addition, by pressurizing the laminate 506, the adhesion between the fibers is improved, and what is more, the fiber-reinforced resin layer 507 is pressed against the surface of the foam layer 505 while deforming the fiber-reinforced resin layer 507 to match the surface of the foam layer 505, so as to enable the fiber-reinforced resin layer 507 to be laminated on the surface of the foam layer 505 with the fiber-reinforced resin layer 507 adhering to the entire surface of the foam layer 505.

In particular, even when the surface of the foam layer 505 has corners or irregularities, the fiber-reinforced resin layer 507 is pressed against the surface of the foam layer 505 while deforming the fiber-reinforced resin layer 507 to match the surface of the foam layer 505, so as to enable the fiber-reinforced resin layer 507 to be laminated on the surface of the foam layer 505 with the fiber-reinforced resin layer 507 adhering to the entire surface of the foam layer 505. Furthermore, when the fiber-reinforcing material 507 is laminated on the surface of the foam layer 505 with surface-to-surface adhesion therebetween, the air at the interface between the fiber-reinforced resin layer 507 and the surface of the foam layer 505 is almost completely removed, so that the fiber-reinforced resin layer 507 is in good contact with the surface of the foam layer 505.

In addition, by pressurizing the laminate 506, the thermosetting resin impregnated in the fiber-reinforced resin layer 507 is allowed to spread over the entire fibers, so that the fibers can be surely bonded to each other with the minimum necessary amount of the thermosetting resin. Thus, since the fibers can be bonded to each other with the minimum necessary amount of the thermosetting resin, no excess thermosetting resin is left between the fibers, and the fibers are allowed to be highly oriented, so that the mechanical strength of the fiber-reinforced resin layer 507 can be improved, and the appearance of the fiber-reinforced resin layer 507 also improves.

Further, when the fiber-reinforced resin layer 507 is a multi-layered face material, the face materials that are laminated on each other can be firmly integrated by pressurization, and the mechanical strength of the resulting fiber-reinforced resin composite 502 can be enhanced.

On the other hand, when the laminate 506 is pressurized, the excess thermosetting resin impregnated in the fiber-reinforced resin layer 507 may came out on the surface of the fiber-reinforced resin layer 507. In such a case, the excess thermosetting resin is absorbed by the breather cloth 570 through the outside of the release film 560 or through the through-holes formed in the release film 560. Therefore, there is no excess thermosetting resin on the surface of the fiber-reinforced resin layer 507 of the resulting fiber-reinforced resin composite 502 which, therefore, has an excellent appearance. When the breather cloth 570 covers the side surfaces of the laminate 506, the space 590 sealed with the bagging film 550 is evacuated from the laminate 506 in the direction of the breather cloth 570 covering the side surfaces of the laminate 506, so that the excess thermosetting resin in the fiber-reinforced resin layers 507, 507 laminated on both sides of the foam layer 505 can be surely absorbed and removed by the breather cloth 570.

Heating of the laminate 506 is continued while the laminate 506 is pressurized as described above, and this heating cures the thermosetting resin impregnated in the fiber-reinforced resin layer 507 of the laminate 506. After the thermosetting resin is softened, the heating temperature for the laminate 506 may or may not be changed, but it is preferable to raise the heating temperature for the laminate 506 in order to accelerate the curing of the thermosetting resin.

When the thermosetting resin is cured, the fibers of the fiber-reinforced resin layer 507 are bound and fixed together, and at the same time, the fiber-reinforced resin layer 507 deformed to match the surface of the foam layer 505 is integrally laminated on the surface of the foam layer 505 by the thermosetting resin, thereby providing the fiber-reinforced resin composite 502.

Then, after cooling the fiber-reinforced resin composite 502 and releasing the pressure applied to the fiber-reinforced resin composite 502, the back valve 535 is opened to cancel the pressure reduction in the space 590, and then the space 590 is opened to allow the fiber-reinforced resin composite 502 to be taken out.

As shown in FIG. 19, in the obtained fiber-reinforced resin composite 502, the fibers are bonded together by the cured thermosetting resin, and the solidified fiber-reinforced resin layer 507 is integrally laminated on the surface of the foam layer 505 with surface-to-surface adhesion therebetween.

[Thermoplastic Resin Foam Sheet for Fiber-Reinforced Resin Composite]

The thermoplastic resin foam sheet for a fiber-reinforced resin composite of the present invention is used for forming a thermoplastic resin foam layer in a fiber-reinforced resin composite including a thermoplastic resin foam layer in the form of a sheet, and a fiber-reinforced resin layer provided on one side or both sides of the thermoplastic resin foam layer.

The thermoplastic resin foam layer contains a polyester resin and a polyimide resin, and has a single glass transition temperature Tg.

Examples of thermoplastic resin foam sheets for a fiber-reinforced resin composite include foam sheets composed only of the thermoplastic resin foam layers described above.

With respect to the thermoplastic resin and optional components in the thermoplastic resin foam sheet for the fiber-reinforced resin composite, the same applies as for the foam layer 505 described above. Further, with respect to the physical properties such as glass transition temperature Tg, heat absorption-heat generation difference, crystallinity, slope r, open cell ratio, basis weight, apparent density, expansion ratio, average cell diameter, etc. of thermoplastic resin foam sheet for a fiber reinforced resin composite, the same applies as for the foam layer 505 described above.

The physical properties of the thermoplastic resin foam sheet for a fiber-reinforced resin composite can be determined in the same manners as for the foam layer 505 described above.

[Method for Producing Thermoplastic Resin Foam Sheet for Fiber-Reinforced Resin Composite]

The thermoplastic resin foam sheet for a fiber-reinforced resin composite can be produced by the same method as for the foam layer 505 described above.

In the thermoplastic resin foam sheet for a fiber-reinforced resin composite of the present embodiment, the polyester resin and the polyimide resin are compatibilized with each other, and the thermoplastic resin shows a single glass transition temperature Tg. Therefore, the glass transition temperature Tg becomes higher than the glass transition temperature Tg1 of the polyester resin, and the heat resistance increases.

Therefore, the thermoplastic resin foam sheet of the present invention is suitable as a foam sheet for the fiber-reinforced resin composite described above.

In the foam layer 505 in the present embodiment, the polyester resin and the polyimide resin are compatibilized with each other, and the thermoplastic resin shows a single glass transition temperature Tg. Therefore, the glass transition temperature Tg becomes higher than the glass transition temperature Tg1 of the polyester resin, and the heat resistance increases. Therefore, the fiber-reinforced resin composite 502 in which the fiber-reinforced resin layer 507 is laminated on the surface of the foam layer 505 has excellent heat resistance.

In addition, since the fiber-reinforced resin composite 502 of the present embodiment shows excellent heat resistance without requiring a heat set step, the productivity of a molded product of the fiber-reinforced resin composite can be improved. The fiber-reinforced resin composite 502 of the present embodiment shows excellent heat resistance even when the crystallinity is less than 20%.

Furthermore, when the fiber-reinforced resin composite 502 of the present embodiment is produced by a method involving the heat set step, the crystallinity is increased and the heat-dimensional stability is further enhanced.

Seventh Embodiment of Foam

The seventh embodiment is a modification of the sixth embodiment.

The seventh embodiment of the present invention is described below.

The foam resin composite of the present embodiment includes the foam granule-molded product of the present invention and a fiber-reinforced resin layer (skin material) provided on at least part of the surface of the foam granule-molded product.

The foam resin composite is excellent in heat resistance and mechanical strength, and can be used for the same applications as those listed for the fiber-reinforced resin composite, and can achieve the same effects.

One embodiment of the foamed resin composite is described below with reference to a drawing.

Figure 15:
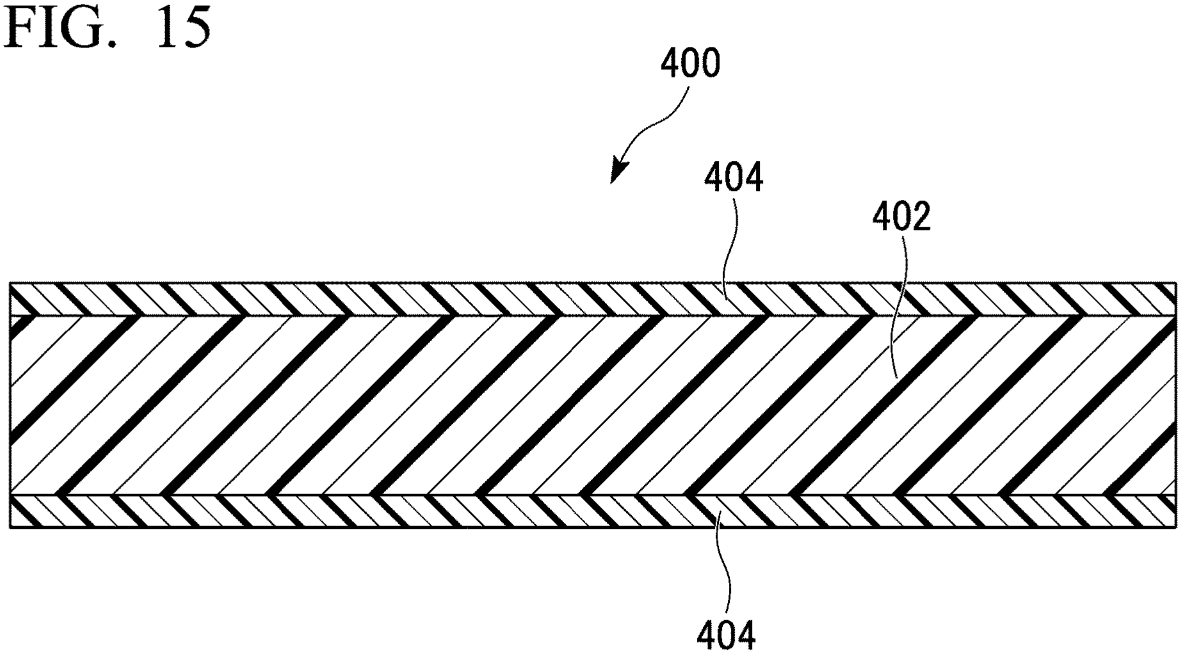
FIG. 15 is a cross-sectional view of the foamed resin composite according to one embodiment of the present invention.

For example, the foamed resin composite 400 in FIG. 15 has a flat foam granule-molded product (thermoplastic resin foam layer) 402 and fiber-reinforced resin layers 404 provided on both sides of the foam granule-molded product 402.

The foam layer 402 is the foam granule-molded product of the present invention described above.

With respect to the fibers and resins forming the fiber-reinforced resin layer 404 and the amounts thereof, the same applies as for the fiber-reinforced resin layer 507.

The method for impregnating the fibers with the resin is not particularly limited, and examples thereof includes (1) a method that immerses the fibers in the resin, and (2) a method that coats the fibers with the resin.

With respect to other configurations and dimensions of the foam granule-molded product 402 and the effects achievable thereby, the same applies as for the foam layer 505.

<Production Method>

The method for providing the fiber-reinforced resin layer 104 on the surface of the foam granule-molded product 402 may be, for example, the same method as in the case of the production of the foam layer 505, except that the foam layer 505 is replaced with the foam granule-molded product 402, and the fiber-reinforced resin layer 507 is replaced with the fiber-reinforced resin layer 404.

The foam resin composite of the above embodiment has a flat foam granule-molded product, but the present invention is not limited to this example, and the shape of the foam granule-molded product can be appropriately chosen according to the application. That is, the shape of the foam resin composite can be appropriately chosen according to the application.

In the above embodiment, the fiber-reinforced resin layers are provided on both sides of the foam granule-molded product, but the present invention is not limited to this example, and the fiber-reinforced resin layer may be provided only on one side of the foam granule-molded product, or the fiber-reinforced resin layer may be provided only on part of the surface of the foam granule-molded product.

In the foam granules in the present embodiment, the polyester resin and the polyimide resin are compatibilized with each other, and the thermoplastic resin shows a single glass transition temperature Tg. Therefore, the glass transition temperature Tg becomes higher than the glass transition temperature Tg1 of the polyester resin, and the heat resistance increases. As a result, a foam granule-molded product obtained by heat-molding the foam granules shows excellent heat resistance.

In addition, since the foam granules in the present embodiment shows excellent heat resistance without requiring a heat retention step, the productivity of the foam granule-molded product can be improved. The foam granule-molded product of the present embodiment shows excellent heat resistance even when the crystallinity is less than 20%.

Furthermore, when the foam granule-molded product of the present embodiment is produced by a method involving the heat retention step, the crystallinity is increased and the heat-dimensional stability is further enhanced.

EXAMPLES

Hereinbelow, the present invention is described by way of Examples which, however, should not be construed as limiting the present invention.

(Raw Materials Used)

<Polyester Resin>

PET (A): trade name "CH-611" manufactured by Far Eastern New Century, glass transition temperature Tg: 78° C., melting point: 251° C., IV value: 1.04, biomass degree: 0%

PET (B): trade name "RAMAPET NIB" manufactured by Indorama Corporation, glass transition temperature Tg: 78° C., melting point: 247° C., IV value: 0.80, biomass degree: 30%

PET (C): trade name "CH-653" manufactured by Far Eastern New Century, glass transition temperature Tg: 79° C., melting point: 248° C., IV value: 1.01, biomass degree: 27 to 30%

PET (D): trade name "CB-603RJ" manufactured by Far Eastern Ishizuka Green PET Corporation, glass transition temperature Tg: 79° C., melting point: 248° C., IV value: 0.80, biomass degree: 0%, recycled PET from PET bottle <Polyimde Resin>

PEI (A): Polyetherimide, trade name "Ultem 1000", manufactured by SABIC Innovative Plastics, glass transition temperature Tg: 217° C., MFR: 9 g/10 min PEI (B): Polyetherimide, trade name "Ultem 1010", manufactured by SABIC Innovative Plastics, glass transition temperature Tg: 217° C., MFR: 17.8 g/10 min PEI (C): Polyetherimide, trade name "Ultem MD130", manufactured by SABIC Innovative Plastics, glass transition temperature Tg: 217° C., MFR: 9 g/10 min Recovered pellets: Pellets obtained by remelting resin flakes obtained by pulverizing any of the foam sheets obtained in Examples 9A and 7C and the foam granules obtained in Example 3B with a twin-screw extruder, and extruding the resulting into a strand from a nozzle die, which was then cooled and pelletized.

<Amorphous Polyester Resin>

PCT (G): Trade name "Traitan TX-1001" manufactured by Eastman Chemical Company, aromatic dicarboxylic acid component=terephthalic acid, diol components=1, 4-cyclohexanedimethanol and 2,2,4,4-tetramethyl-1,3-cyclobutanediol, glass transition temperature Tg: 107° C., IV value: 0.72.

<Talc Masterbatch>

Talc MB: Masterbatch formed of PET=72% by mass and talc=28% by mass

<Crosslinking Agent>

PMDA: Pyromellitic anhydride

<Fiber-Reinforced Resin Layer>

(A): Fiber-reinforced resin layer (A), a fiber-reinforced material formed by incorporating 50% by mass of an uncured epoxy resin as a thermosetting resin in a fiber-reinforcing substrate formed from a twill fabric composed of carbon fibers (trade name "TR3110-392IMP" manufactured by Mitsubishi Chemical Corporation, thickness 0.25 mm, basis weight 200 g/m$^2$)

(B): Fiber-reinforced resin layer (B), glass fiber (trade name "GH2030-392GM" manufactured by Mitsubishi Chemical Corporation, thickness 0.19 mm, basis weight 203 g/m$^2$)

(Evaluation Method)

<Thickness>

Excluding 20 mm at both ends in the width direction (TD direction) of the foam sheet, the thickness was measured at 9 points at equal intervals in the width direction using a dial thickness gauge SM-112 (manufactured by Teclock Co., Ltd.), and the arithmetic mean value of the measurements was taken as the thickness.

<Basis Weight>

Leaving 20 mm at both ends in the width direction (TD direction) of the foam sheet, six pieces of 10 cm×10 cm were cut out from the foam sheet at equal intervals in the width direction, and the mass (g) of each piece was measured with accuracy to the nearest 0.001 g. The value obtained by converting the average value of the masses (g) of the pieces into the mass per 1 m$^2$ was taken as the basis weight of the foam sheet (g/m$^2$).

<Density>

<<In the Case of Foam Sheet>>

The density was calculated by the following formula (s1) from the basis weight and thickness of the foam sheet.

$$\text{Apparent density (g/cm}^3\text{)}=\text{basis weight (g/m}^2\text{)/thickness (mm)}/1000 \quad \text{(s1)}$$

<<In the Case of Rod-Shaped Foam>>

The rod-shaped foam was cut into a predetermined length, and the length of the cut rod-shaped foam was measured. The diameter of the rod-shaped foam was measured at 5 or more points equally spaced in the length direction, and the arithmetic mean value of the measurements was taken as the diameter. Then, the mass of the cut rod-shaped foam was measured. The density was calculated by the following formula (s2) from the length, diameter and mass of the rod-shaped foam.

$$\text{Apparent density (g/cm}^3\text{)}=\text{mass (g)/(length (cm)}\times(\text{diameter (cm)}/2)^2)\times 3.14 \quad \text{(s2)}$$

<<Bulk Density of Foam Granules>>

The bulk density of the foam granules was measured in accordance with JIS K6911:1995 "General Test Methods for Thermosetting Plastics". The measurement was performed using an apparent density measuring instrument conforming to JIS K6911, and the bulk density of the foam granules was obtained by the following formula (s3).

$$\text{Bulk density of foam granules (kg/m}^3\text{)}=[\text{mass of graduated cylinder containing foam granules (kg)}-\text{mass of graduated cylinder (kg)}]/[\text{capacity of graduated cylinder (m}^3\text{)}] \quad \text{(s3)}$$

<<Density of Foam Granule-Molded Product>>

The density of the foam granule-molded product was measured by the method prescribed in JIS K7222: 1999 "Cellular plastics and rubbers—Determination of apparent (bulk) density". A foam granule-molded product of 100 cm$^3$ or more was cut without changing the original cell structure of the material, and the mass thereof was measured. The density was calculated by the following formula (s4).

$$\text{Density (g/cm}^3\text{)} = \text{mass of foam granule-molded product (g)/volume of foam granule-molded product (cm}^3\text{)} \quad \text{(s4)}$$

<Expansion Ratio or Bulk Expansion Ratio>

The expansion ratio of the foam or the foam granule-molded product (bulk expansion ratio for foam granules) was obtained by determining the density of the thermoplastic resin from the blending ratio in each example, and dividing the density by the apparent density of the foam or the foam granule-molded product (bulk density for foam granules) for which the density of the thermoplastic resin was determined, thereby obtaining the expansion ratio (bulk expansion ratio for foam granules). The density values for the respective resins used in this evaluation were as follows.

PET: 1.35 g/cm$^3$

PEI: 1.28 g/cm$^3$

PCT: 1.18 g/cm$^3$

<Open Cell Ratio of Foam Sheet>

Two or more sheet samples of 25 mm×25 mm were cut out from the foam sheet, and the cut samples were stacked so as not to leave a space to obtain a test piece with a thickness of 25 mm. The outer dimensions of the obtained test piece were measured with accuracy to the nearest 1/100 mm using a vernier caliper "Digimatic Caliper" manufactured by Mitutoyo Corporation, and the apparent volume (V1: cm$^3$) was determined. Next, the volume (V2: cm$^3$) of the test piece was determined by the 1-1/2-1 atmospheric pressure method using an air comparison type pycnometer "Type 1000" manufactured by Tokyo Science Co., Ltd. The open cell ratio (%) was calculated by the following formula (s5), and an average value of the open cell ratios of the five test pieces was obtained. The test piece was conditioned in advance under a standard atmosphere of JIS K 7100: 1999, "23/50" (temperature 23±2° C., relative humidity 50±5%), class 2, for 24 hours or more, and then, the measurement was performed under the same standard atmosphere. The air comparison type pycnometer was corrected with standard balls (large 28.96 cm$^3$, small 8.58 cm$^3$).

$$\text{Open cell ratio (\%)} = (V1 - V2)/V1 \times 100 \quad \text{(s5)}$$

(V1: Apparent volume measured with the vernier caliper, V2: Volume measured with the air comparison type pycnometer)

<Open Cell Ratio of Foam Granules>

The open cell ratio of the foam granules was measured by the following method. First, a sample cup for a volumetric air comparison type pycnometer was prepared, and the total mass A (g) of the foam granules necessary for filling about 80% of the sample cup was measured. Next, the volume B (cm$^3$) of the whole foam granules was measured by the 1-1/2-1 atmospheric pressure method using the pycnometer. For the measurement, the "volumetric air comparison type pycnometer 1000" manufactured by Tokyo Science Co., Ltd. was used.

A wire mesh container was prepared, which was then immersed in water, and the mass C (g) of the wire mesh container immersed in water was measured. All the foam granules were placed in the wire mesh container, which was then immersed in water, and the mass D (g) of the combination of the wire mesh container immersed in water and the whole foam granules placed in the wire mesh container was measured. For the mass measurement of the foam granules and the wire mesh container, the "electronic balance HB3000" (minimum scale 0.01 g) manufactured by Yamato Scale Co., Ltd. was used.

Then, the apparent volume E (cm$^3$) of the foam granules was calculated based on the following formula, and from this apparent volume E and the volume B (cm$^3$), the open cell ratio of the foam granules was calculated by the following formula (s6). For this measurement, the volume of 1 g of water was assumed to be 1 cm$^3$. Further, for this measurement, the foam granules were stored in advance for 16 hours under an environment of JIS K7100-1999, 23/50, grade 2, and then the measurement was performed under the same environment.

$$\text{Open cell ratio (\%)} = 100 \times (EB)/E \quad \text{(s6)}$$

$$(E = A + (CD))$$

<Melting Point, Crystallization Temperature, Glass Transition Temperature>

The melting point, crystallization temperature and glass transition temperature were measured by the methods prescribed in JIS K7121:1987 and JIS K7121:2012. However, the sampling method and temperature conditions were as follows.

In the case of a foam or a resin foam-molded product, foam granules or a foam granule-molded product, a fiber-reinforced resin composite and a foamed resin composite, 0.5±0.5 mg of a sample cut out from the foam layer was placed on the bottom of an aluminum measurement container without leaving gaps, and then the container was closed with an aluminum lid. Then, differential scanning calorimetry was performed using a differential scanning calorimeter "DSC7000X, AS-3" manufactured by Hitachi High-Tech Science Corporation. Under a nitrogen gas flow rate of 20 mL/min, the DSC curve was obtained by subjecting the sample to heating and cooling, following the steps 1 to 4 below.

(Step 1) Holding the sample at 30° C. for 2 minutes.

(Step 2) Raising the temperature from 30° C. to 300° C. at a rate of 10° C./min (first heating process) and holding the heated sample for 10 minutes.

(Step 3) Taking out the sample quickly and leaving the sample to cool in an environment of 25±10° C.

Figure 11:
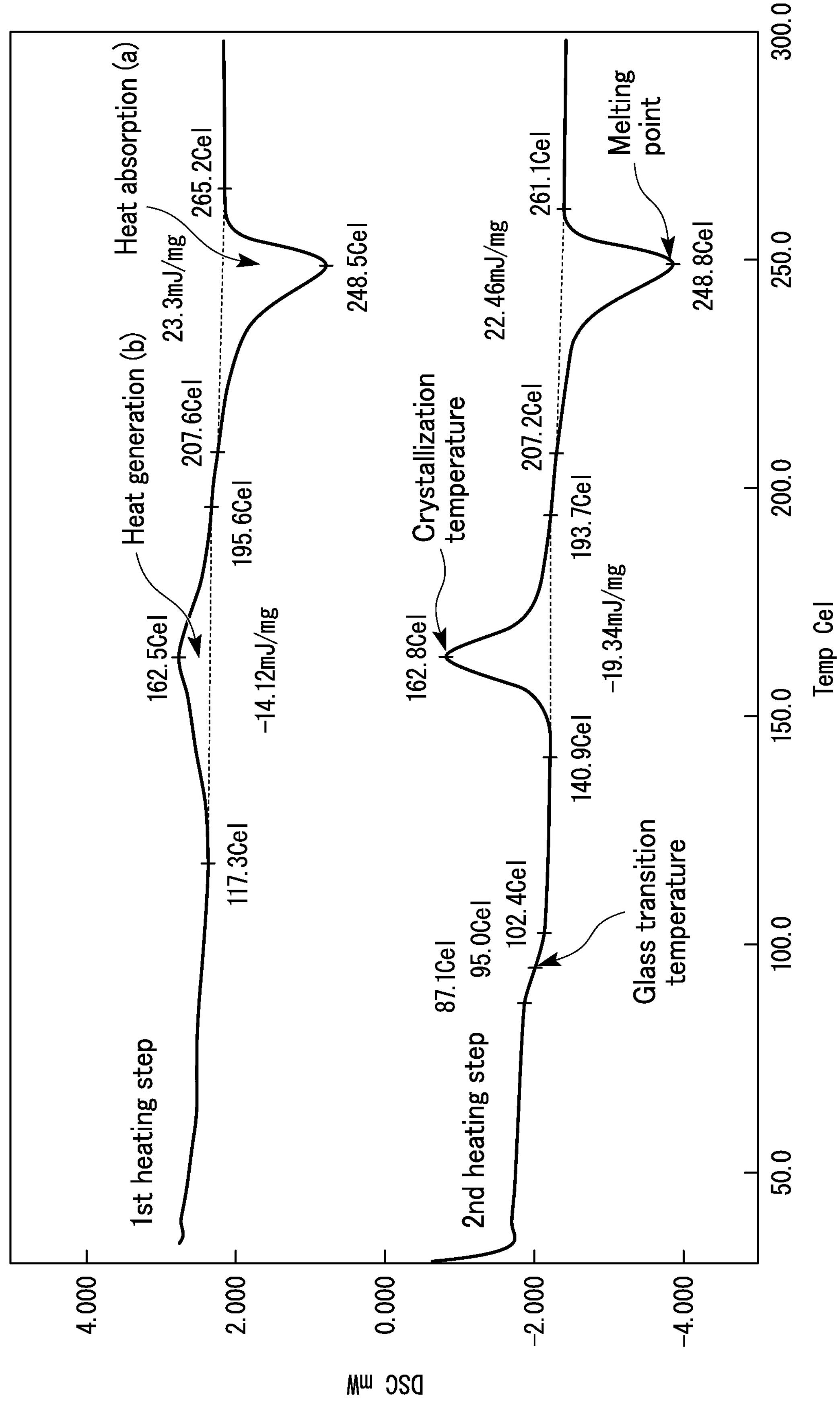
FIG. 11 is a DSC curve in Example 12A.
Figure 16:
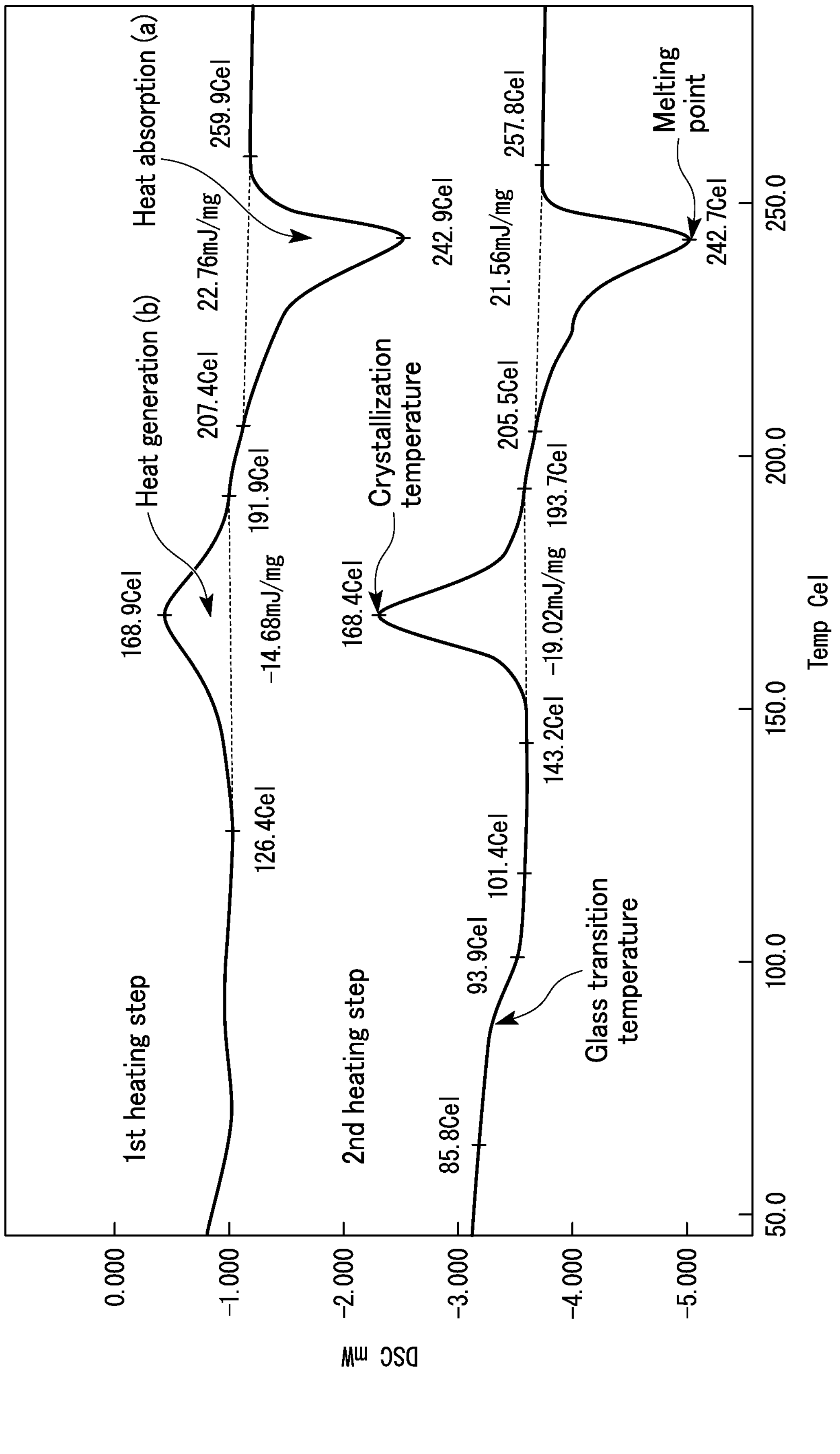
FIG. 16 is a DSC curve of the foam granules of Example 3B.

(Step 4) Raising the temperature from 30° C. to 300° C. at a rate of 10° C./min (second heating process). Alumina was used as a reference substance. Using the analysis software attached to the device, the melting peak observed in the second heating process and the temperature at the top of the crystallization peak were read as shown in FIG. 11 (DSC curve of the foam sheet in Example 12A) and FIG. 16 (DSC curve of the foam granules in Example 3B) to determine the melting point and the crystallization temperature. As for the glass transition temperature Tg, the midpoint glass transition temperature was calculated from the DSC curve observed in the second heating process using the analysis software attached to the device. This midpoint glass transition temperature was obtained from the standard (9.3).

The glass transition temperature Tg is a glass transition temperature Tg on a lower temperature side than the crystallization peak seen in the second heating process in the heat flux differential scanning calorimetry chart (DSC curve) obtained at a heating rate of 10° C./min. However, when no crystallization peak was observed in the second heating process, the glass transition temperature Tg within the temperature range (30 to 300° C.) in the second heating process was used.

<Solid Viscoelasticity Measurement 1>

Figure 9:
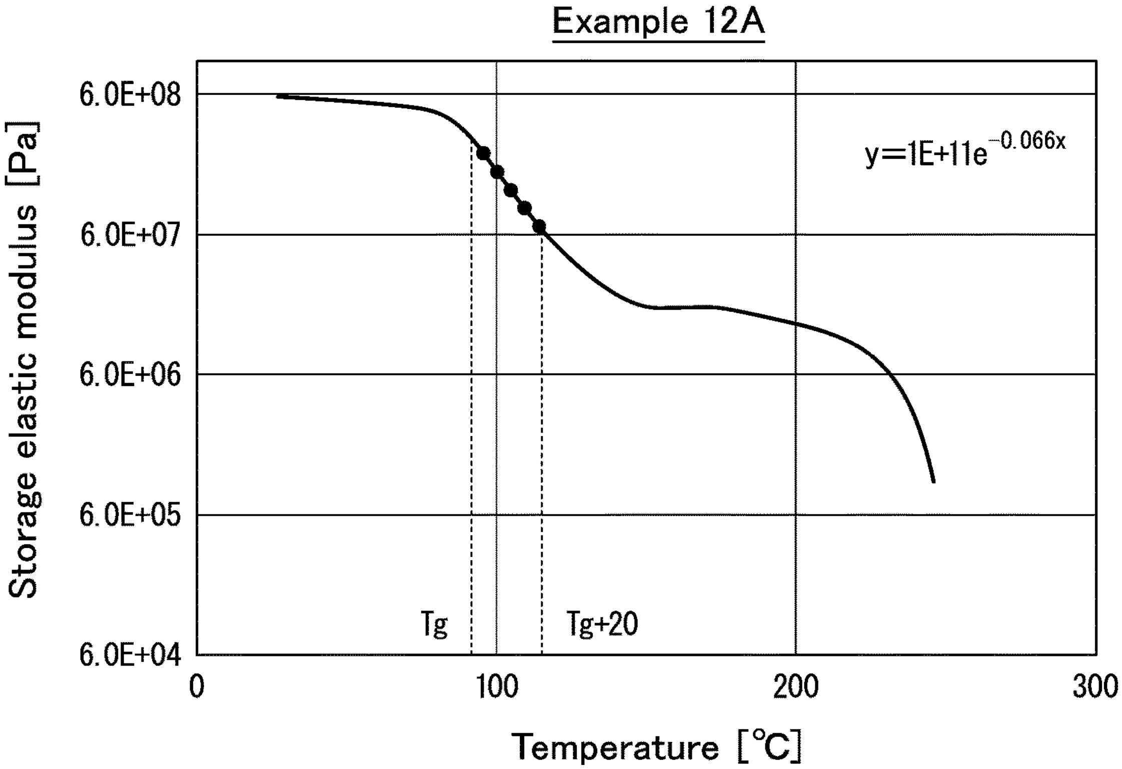
FIG. 9 is a graph showing measurement results for storage elastic modulus E' in Example 12A.
Figure 10:
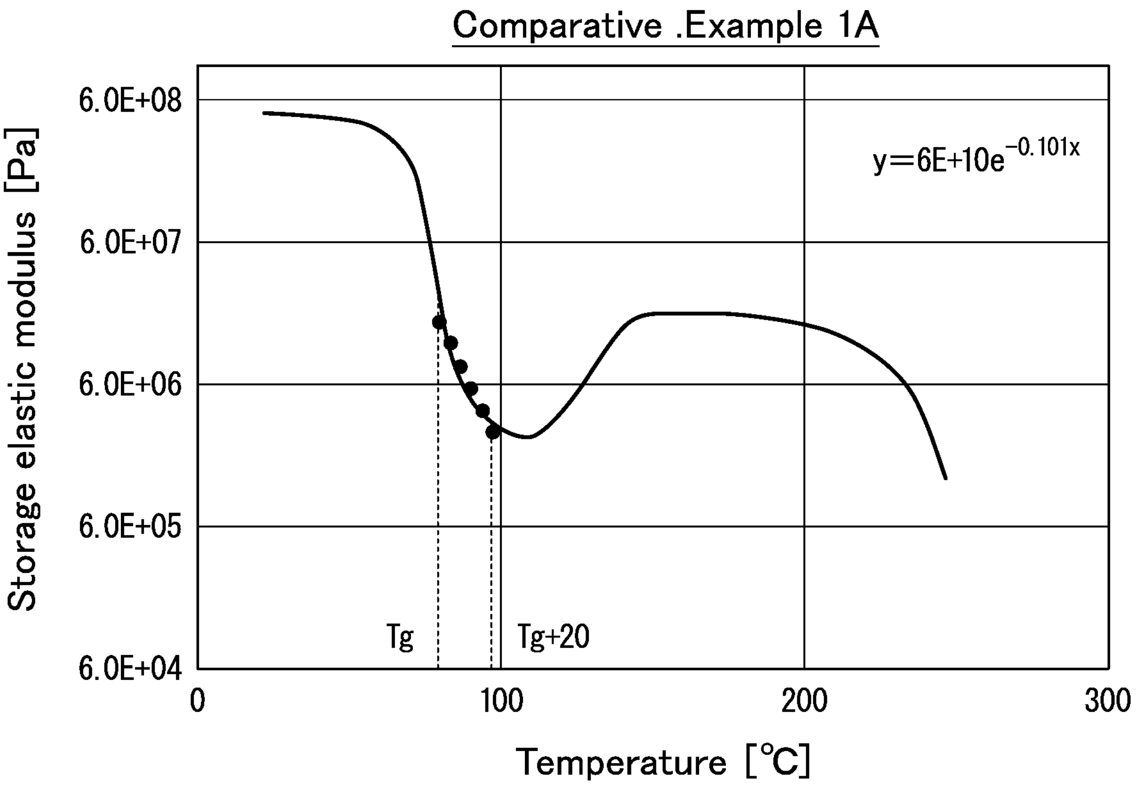
FIG. 10 is a graph showing measurement results for storage elastic modulus E' in Comparative Example 1A.

Solid viscoelasticity measurement of the foam or the resin foam-molded product (obtained from a foam sheet) was performed using an "EXSTRAR DMS6100" viscoelasticity spectrometer manufactured by SII Nanotechnology Inc. A sample having a length of about 40 mm, a width of about 10 mm, and a thickness of about 1 mm was cut out from the foam or the resin foam-molded product. The measurement conditions were as follows.—Mode: Tension control mode Atmosphere: Nitrogen atmosphere
Frequency: 1 Hz
Heating rate: 5° C./min
Measurement temperature: 30° C. to 300° C.
Chuck interval: 20 mm
Strain amplitude: 5 μm
Minimum tension: 100 mN
Tension gain: 1.5
Force amplitude initial value: 100 mN The analysis was implemented using an analysis software attached to the device. As shown in FIGS. 9 and 10, the slope r was calculated from the exponential approximation using the value of the storage elastic modulus E' between the glass transition temperature Tg and the glass transition temperature Tg+20° C. FIG. 9 shows the measurement results in Example 12A described later, and FIG. 10 shows the measurement results in Comparative Example 1A described later. Further, the glass transition temperature Tg used was a value obtained from the DSC curve.

For measuring the dimensions of the test piece, "DIGIMATIC" CD-15 type manufactured by Mitutoyo Corporation was used.

<Solid Viscoelasticity Measurement 2>

Solid viscoelasticity measurement of the foam granule-molded product was performed using an "EXSTRAR DMS6100" viscoelasticity spectrometer manufactured by SII Nanotechnology Inc. The surface skin layer was removed from the foam granule-molded product, and a cylindrical sample with a diameter of about 10 mm and a thickness of about 2 mm was cut out from the foam granule-molded product. The measurement conditions were as follows.

Mode: Compression control mode
Atmosphere: Nitrogen atmosphere
Frequency: 1 Hz
Heating rate: 5° C./min
Measurement temperature: 30° C. to 300° C.
Strain amplitude: 5 μm
Minimum compression: 100 mN
Tension gain: 1.5
Force amplitude initial value: 100 mN The analysis was implemented using an analysis software attached to the device. The temperature at which the loss tangent tan δ is maximized is the value read as the temperature at which the measured loss tangent tan δ is maximized in the temperature range of 50 to 240° C.

For measuring the dimensions of the test piece, "DIGIMATIC" CD-15 type manufactured by Mitutoyo Corporation was used.

<Heat Absorption (a), Heat Generation (b), Crystallinity>

The heat absorption (a) (heat of fusion) and the heat generation (b) (heat of crystallization) were measured by the method described in JIS K7121:1987 and JIS K7121:2012. However, the sampling method and temperature conditions were as follows. In the case of a foam or a resin foam-molded product, foam granules or a foam granule-molded product, a fiber-reinforced resin composite and a foamed resin composite, 0.5±0.5 mg of a sample cut out from the foam layer was placed on the bottom of an aluminum measurement container without leaving gaps, and then the container was closed with an aluminum lid. Then, differential scanning calorimetry was performed using a differential scanning calorimeter "DSC7000X, AS-3" manufactured by Hitachi High-Tech Science Corporation. Under a nitrogen gas flow rate of 20 mL/min, the DSC curve was obtained by subjecting the sample to heating and cooling, following the steps 1 to 2 below.

(Step 1) Holding the sample at 30° C. for 2 minutes.

(Step 2) Raising the temperature from 30° C. to 300° C. at a rate of 10° C./min (first heating process). For this procedure, alumina was used as a reference substance. The heat absorption (a) and the heat generation (b) were calculated using analysis software attached to the apparatus. Specifically, as shown in FIG. 11 (DSC curve of the foam sheet in Example 12A) and FIG. 16 (DSC curve of the foam granules in Example 3B), the heat absorption (a) was calculated from the area surrounded by the straight line connecting the point where the DSC curve starts to diverge from the base line on the lower temperature side and the point where the DSC curve returns to the baseline on the higher temperature side. The heat generation (b) was calculated from the area surrounded by the straight line connecting the point where the DSC curve starts to diverge from the base line on the lower temperature side and the point where the DSC curve returns on the higher temperature side.

The crystallinity is determined by the following method. First, the difference between the heat absorption (a) and the heat generation (b) is obtained. The crystallinity is a ratio obtained by dividing this difference by the theoretical heat of fusion, 140.1 J/g, of the polyethylene terephthalate perfect crystal.

That is, the crystallinity is obtained from the following formula (s7).

$$\text{Crystallinity (\%)}=(\text{heat absorption (a) (J/g)}-\text{heat generation (b) (J/g)})/140.1(\text{J/g})\times 100 \quad (s7)$$

<Heat Resistance of Foam (Hot Tensile Test)>

The tensile elastic modulus in the hot tensile test was measured according to JIS K7127:1999. Specifically, the tensile elastic modulus was measured using a universal testing machine "Autograph AG-Xplus 100 kN" manufactured by Shimadzu Corporation and a universal testing machine data processing software "TRAPEZIUM X" produced by Shimadzu Corporation. A dumbbell-shaped type 5 test piece was cut out such that its length direction matched the extrusion direction (MD). The test speed was set to 200 mm/min, and the gripper interval was set to 80 mm. The test piece was used for the test after being conditioned for 24 hours or longer in a standard atmosphere of JIS K7100:1999, "23/50", class 2.

The measurements were performed under the standard atmosphere (23° C.) and at 80° C. The measurement at 80° C. was performed after the test piece was clamped in a jig installed in a "TCR2A type" constant temperature bath manufactured by Shimadzu Corporation and held for 1 minute. For each of the measurements at the respective ambient temperatures described above, the number of test pieces was 5, and the arithmetic mean of the measured tensile elastic modulus values for the test pieces was taken as the value of the tensile elastic modulus. The tensile elastic modulus was calculated by setting a region where the slope within the tensile proportional limit is maximized and implementing the universal testing machine data processing.

With the tensile elastic modulus (E80) at 80° C. and the tensile elastic modulus (E23) under the standard atmosphere (23° C.), the retention rate was calculated by the following formula (s8).

$$\text{Retention rate (\%)}=(E80)/(E23)\times 100 \quad (s8)$$

<<Evaluation Criteria>>

◎: The retention rate is 50% or more.

○: The retention rate is 40% or more and less than 50%.

Δ: The retention rate is 25% or more and less than 40%.

x: The retention rate is less than 25%.

<Heat-Dimensional Change Ratio (Evaluation of Heat-Dimensional Stability) 1>

From the foam sheet of each example, 5 square-shaped test pieces of about 10 cm×10 cm were cut out so that each side thereof was parallel to the extrusion direction (MD direction) or the width direction (TD direction) of the foam sheet.

Next, on the foam sheet of each test piece, two straight lines were drawn in a cross shape connecting the central portions of the sides facing each other. The lengths of the straight lines in each direction before heating are defined as MD1 and TD1. Then, each test piece was placed on a flat table in an oven without humidity control, which was set at a predetermined temperature, heated for 150 seconds, taken out from the oven and left to cool at room temperature for 30 minutes. Then, the length of the straight line drawn in each direction before heating was measured, and the arithmetic mean value of the measured lengths of each test piece was taken as the length after heating. From the obtained lengths MD2 and TD2 after heating and the lengths MD1 and TD1 before heating, the ratio (MD ratio=MD2/MD1) between the length (MD1) before heating and the length (MD2) after heating, each in the extrusion direction, and the ratio (TD ratio=TD2/TD1) between the length (TD1) before heating and the length (TD2) after heating, each in the width direction, were calculated.

<<Evaluation Criteria>>

◎: With the temperature set to 140° C., the smaller one of the MD ratio and the TD ratio is 0.97 or more.

○: With the temperature set to 140° C., the smaller one of the MD ratio and the TD ratio is less than 0.97, and with the temperature set to 120° C., the smaller one of the MD ratio and the TD ratio is 0.97 or more.

Δ: With the temperature set to 140° C., the smaller one of the MD ratio and the TD ratio is less than 0.97, and with the temperature set to 120° C., the smaller one of the MD ratio and the TD ratio is 0.95 or more and less than 0.97.

x: With the temperature set to 140° C., the smaller one of the MD ratio and the TD ratio is less than 0.97, and with the temperature set to 120° C., the smaller one of the MD ratio and the TD ratio is less than 0.95.

<Impact Strength of Foam Sheet (Falling Weight Impact Test)>

The total energy absorption in the falling weight impact test was measured according to ASTM D-3763-15. That is, the total energy absorption was measured using a falling weight impact tester "CEAST9350" and a measurement software "CEAST VIEW", each produced by CEAST. The test piece size was 100 mm in length×100 mm in width. The number of test pieces was at least 5, and the basis weight of each test piece was within the range of ±5% of the value of the basis weight of the foam sheet described in the tables for the Examples and the Comparative Examples. The test conditions were as follows.

<<Test Conditions>>

Test speed: 1.76 msec

Falling weight load: 1.9265 kg

Support span for test piece: φ76 mm

Tup used: 4.5 kN instrumented tup (tip φ 12.7 mm, hemispherical)

The test piece for the test temperature of 23° C. was conditioned for 16 hours in an environment of Procedure A prescribed in ASTM D618-13 (23±2° C., relative humidity of 50±10%) and used for the measurement. The test piece for the test temperature of −30° C. was conditioned in a freezer at a temperature of −30±2° C. for 16 hours and used for measurement. The measurements were performed under the same temperature environments as for the conditioning. The total energy absorption by each test piece was calculated through automatic calculation of the integrated value of the graph obtained by the measurement using the measurement software described above. The average value of the total energy absorptions by the test pieces at each test temperature (23° C. or −30° C.) was taken as the total energy absorption by the foam sheet.

<<Evaluation Criteria for Measurement Temperature of 23° C.>>

◎: The total energy absorption at a test temperature of 23° C. is 0.50 J or more.

○: The total energy absorption at a test temperature of 23° C. is 0.20 J or more and less than 0.50 J.

Δ: The total energy absorption at a test temperature of 23° C. is 0.10 J or more and less than 0.20 J.

x: The total energy absorption at a test temperature of 23° C. is less than 0.10 J.

<<Evaluation Criteria for Measurement Temperature of −30° C.>>

◎: The total energy absorption at a test temperature of −30° C. is 0.30 J or more.

○: The total energy absorption at a test temperature of −30° C. is 0.10 J or more and less than 0.30 J.

Δ: The total energy absorption at a test temperature of −30° C. is 0.05 J or more and less than 0.10 J.

x: The total energy absorption at a test temperature of −30° C. is less than 0.05 J.

<<Comprehensive Evaluation of Foam Sheet>>

◎: Evaluations of all the items are "◎" or "○".

○: None of the items is evaluated as "x", and one of the items is evaluated as "Δ".

Δ: None of the items is evaluated as "x", and two or more items are evaluated as "Δ".

x: Evaluation of any one or more of the items is "x".

<Heat Resistance of Container>

100 g of salad oil was put into the resin foam-molded product (container) of each example, and heated for 60 seconds at an output of 1600 W in a commercial microwave oven (microwave oven: Model NE1901S manufactured by Panasonic Corporation). This was immediately followed by lifting the molded product with the salad oil contained therein, and the degree of deformation of the molded product was visually evaluated according to the following evaluation criteria.

<<Evaluation Criteria>>

◎: The molded product is not deformed, and can be lifted with one hand.

○: The molded product is slightly deformed, but can be lifted with one hand.

Δ: The molded product is greatly damaged, but can be lifted with one hand.

x: The molded product is very severely deformed, and cannot be lifted with one hand.

<Moldability>

The appearance of the resin foam-molded product was visually observed and evaluated according to the following evaluation criteria.

<<Evaluation Criteria>>

◎: The shape of molded product follows the mold, with sharp contours including even fine bumps and dips, and the appearance is excellent.

○: The shape of molded product follows the mold, but contours of fine bumps and dips are slightly indistinct.

Δ: The shape of molded product is slightly deviated from the shape of the mold, the contours of fine bumps and dips are indistinct, and the appearance is poor.

x: The shape of molded product is significantly deviated from the shape of the mold, or cracks or holes are observed in the molded product.

<Heat-Dimensional Stability of Container (Heat Deformation Ratio) 1>

For the resin foam-molded product (container), the dimensions in the longitudinal direction, the transverse direction and the height direction in plan view were calculated. The container dimension in the longitudinal direction before heating was, for example, defined to be the dimension in the direction in which the distance from one point on the contour line of the container in plan view to the contour line on the opposite side through the center of the contour shape is maximized (distance between contour lines of the container). The dimension of the container in the transverse direction before heating was, for example, defined to be the dimension in the direction in which the distance from one point on the contour line of the container in plan view to the contour line on the opposite side through the center of the contour shape is minimized (distance between container contour lines). The dimension of the container in the height direction before heating was defined to be the distance from the base surface to the bottom of the container when the molded product was placed on a horizontal table with its bottom facing upward.

The container was then placed on a flat table in an oven without humidity control, heated at 140° C. for 150 seconds, taken out from the oven and left under standard conditions (25° C., 1 atm) for 1 hour. Thereafter, the dimensions at the same positions as mentioned above were taken as the dimensions after heating, and the heat-dimensional change ratio was calculated by the following equations (t1) to (t3). The calculated heat-dimensional change ratio was evaluated according to the following evaluation criteria.

$$SL=|(L1-L0)|/L0\times 100 \quad (t1)$$

[SL: Heat-dimensional change ratio (%) in longitudinal direction, L1: Longitudinal dimension (mm) after heating, L0: Longitudinal dimension before heating]

$$SS=|(L3-L2)|/L2\times 100 \quad (t2)$$

[SS: Heat-dimensional change ratio (%) in transverse direction, L3: Transverse dimension (mm) after heating, L2: Transverse dimension before heating]

$$ST=|(L5-L4)|/L4\times 100 \quad (t3)$$

[ST: Heat-dimensional change ratio (%) in height direction, L5: Height dimension (mm) after heating, L4: Height dimension before heating]

<<Evaluation Criteria>>

The total heat-dimensional deformation ratio for the directions (SL+SS+ST) was evaluated according to the following criteria.

◎: The total heat deformation ratio is less than 20%.

○: The total heat deformation ratio is 20% or more and less than 30%.

Δ: The total heat deformation ratio is 30% or more and less than 50%.

x: The total heat deformation ratio is 50% or more.

<Comprehensive Evaluation of Container>

◎: Evaluations of all the items are "◎".

○: Evaluations of all the items are "◎" or "○", and one or more items are evaluated as "○".

Δ: None of the items is evaluated as "x", and one or more items are evaluated as "Δ".

x: Evaluation of any one or more of the items is "x".

<Heat-Dimensional Change Ratio (Evaluation of Heat-Dimensional Stability) 2>

The heat-dimensional change ratio of the foam granule-molded product was measured by Method B described in JIS K6767: 1999 "Foamed plastics—Polyethylene—Test method". A test piece having a square planar shape of 150 mm×150 mm in size and the same thickness as the foam granule-molded product was cut out from the foam granule-molded product. Three 100 mm straight lines parallel to each other were drawn at 50 mm intervals in two mutually perpendicular directions on the central portion of the test piece. The lengths of three straight lines for each of the two mutually perpendicular directions were measured, and the arithmetic average value L0 thereof was taken as the initial dimension. Then, the test piece was left for 168 hours in a hot air circulating dryer set at 100° C. and 120° C., respectively, and a heating test was performed. After the heating test, the test piece was taken out and left to stand at 25° C. for 1 hour. Then, the lengths of three straight lines drawn on the surface of the test piece were measured for each of the two mutually perpendicular directions, and the arithmetic average value L1 thereof was taken as the dimension after heating. The heat-dimensional change ratio was calculated by the following formula (s9).

$$\text{Heat-dimensional change ratio (\%)}=100\times|(L1-L0)|/L0 \quad (s9)$$

From the results of measuring the heat-dimensional change ratio of the foam granule-molded product at the respective set temperatures, evaluation was made according to the following criteria.

<<Evaluation Criteria>>

◎: The heat-dimensional change ratio is less than 1.0%.

○: The heat-dimensional change ratio is 1.0% or more and less than 1.5%.

Δ: The heat-dimensional change ratio is 1.5% or more and less than 2.0%.

x: The heat-dimensional change ratio is 2.0% or more.

<Flexural Modulus (Heat Resistance)>

The flexural modulus of the foam granule-molded product in the flexural test was measured according to the method described in JIS K7221-1:2006. The flexural modulus was measured using a universal testing machine "Autograph AG-Xplus 100 kN" manufactured by Shimadzu Corporation and a universal testing machine data processing software "TRAPEZIUM X" produced by Shimadzu Corporation. A test piece having a width of 25 mm, a length of 130 mm, and a thickness of 20 mm was cut out from the foam granule-molded product. The test speed was 10 mm/min. The radius of the tip of the pressure wedge and the support base was 5R. The distance between fulcrums was 100 mm. The test piece was used for the measurement after being conditioned over 16 hours in a standard atmosphere of JIS K7100: 1999, "23/50", class 2.

The measurements were performed under the standard atmosphere and at 80° C. The measurement at 80° C. was performed after the test piece was conditioned for 24 hours in a constant temperature bath set at 80° C., taken out of the constant temperature bath, immediately placed in a jig installed in a "TCR2A type" constant temperature bath manufactured by Shimadzu Corporation, and held for 3 minutes. For each of the measurements at the respective ambient temperatures described above, the number of test pieces was 5.

The flexural modulus was calculated by setting a load region where the slope of the portion where the load-strain relationship becomes linear is maximized, and implementing the universal testing machine data processing. The arithmetic mean of the flexural modulus measurements for the test pieces was taken as the flexural modulus value.

With the flexural modulus (E80) at 80° C. and the flexural modulus (E23) in the standard atmosphere (23° C.), the retention rate was calculated by the following formula (s10).

$$\text{Retention rate (\%)} = (E80)/(E23) \times 100 \qquad \text{(s10)}$$

From the results of measuring the flexural modulus retention rate for the foam granule-molded product, evaluation was made according to the following criteria.

<<Evaluation Criteria>>

◎: The retention rate is 80% or more.

○: The retention rate is 75% or more and less than 80%.

Δ: The retention rate is 70% or more and less than 75%.

x: The retention rate is less than 70%.

<Appearance of Foam Granule-Molded Product>

The surface of the foam granule-molded product was visually observed and evaluated according to the following criteria.

<<Evaluation Criteria>>

◎: There are no gaps between the foam granules, the surface of the molded product is very smooth, and the external appearance of the molded product is very good.

○: There are very few gaps between the foam granules, the surface of the molded product is almost smooth, and the external appearance of the molded product is good.

Δ: There are few gaps between the foam granules, the surface of the molded product has small irregularities, and the external appearance of the molded product is slightly inferior.

x: There are many gaps between the foam granules, the surface of the molded product has large irregularities, and the external appearance of the molded product is significantly inferior.

<Comprehensive Evaluation of Foam Granule-Molded Product>

Based on the evaluation results of the heat-dimensional change rate, flexural modulus and appearance, the foam granule-molded products were categorized according to the following evaluation criteria.

<<Evaluation Criteria>>

◎: Evaluations of all the items are "◎".

○: Evaluations of all the items are "◎" or "○", and one or more items are evaluated as "○".

Δ: None of the items is evaluated as "x", and one or more items are evaluated as "Δ".

x: Evaluation of any one or more of the items is "x".

<High Temperature Flexural Test of Fiber-reinforced Composite: Elastic Modulus Change Ratio>

The flexural modulus of the fiber-reinforced composite was measured according to JIS K7017:1999. The flexural modulus was measured using a universal testing machine "Autograph AG-Xplus 100 kN" manufactured by Shimadzu Corporation and a universal testing machine data processing software "TRAPEZIUM X" produced by Shimadzu Corporation. The size of the test piece was 15 mm in width×100 mm in length, and the test piece was used for the measurement after being conditioned over 16 hours in a standard atmosphere of JIS K7100: 1999, "23/50" (temperature 23° C., relative humidity 50%), class 2. After being stored under the above conditions, the test piece was quickly set in a jig in a constant temperature bath attached to the device under respective specific temperature conditions, and the test was initiated after 3 minutes had passed. The test speed was 2.7 mm/min. The radius of the tip of the pressure wedge and the fulcrum was 5R, and the distance between the fulcrums was 80 mm. From the obtained graph, a load region with the maximum slope was set, and the apparent flexural modulus was determined by implementing the universal testing machine data processing.

The elastic modulus change ratio was calculated from the following formula (s4) as the ratio (%) of change from the apparent flexural modulus at room temperature (23° C.).

$$\text{Elastic modulus change ratio (\%)} = \text{Apparent flexural modulus at predetermined temperature (MPa)} / \text{Apparent flexural modulus at 23° C. (MPa)} \times 100 \qquad \text{(s4)}$$

Based on the elastic modulus change ratio, the heat resistance of the fiber-reinforced resin composite was evaluated according to the following evaluation criteria.

<<Evaluation Criteria>>

○: The elastic modulus change ratio at 80° C. is 90% or more, the elastic modulus change ratio at 100° C. is 60% or more, and the elastic modulus change ratio at 120° C. is 20% or more.

Δ: The elastic modulus change ratio at 80° C. is more than 80% and less than 90% and the elastic modulus change ratio at 120° C. is 20% or more; or the elastic modulus change ratio at 100° C. is more than 40% and less than 60% and the elastic modulus change ratio at 120° C. is 20% or more.

x: The elastic modulus change ratio at 80° C. is 80% or less, the elastic modulus change ratio at 100° C. is 40% or less, or the elastic modulus change ratio at 120° C. is less than 20%.

<Evaluation of Appearance>

The appearance of the fiber-reinforced resin composite of each example was visually observed, and the appearance was evaluated based on the following evaluation criteria. The dips on the surface of the fiber-reinforced resin layer of the fiber-reinforced resin composite were regarded as portions that had caved in due to non-uniform shrinkage of the foam sheet.

<<Evaluation Criteria>>

○: The surface of the fiber-reinforced resin layer of the fiber-reinforced resin composite has no dips, and the appearance is excellent.

Δ: A small number of dips were observed on the surface of the fiber-reinforced resin layer of the fiber-reinforced resin composite.

x: A large number of dips were observed on the surface of the fiber-reinforced resin layer of the fiber-reinforced resin composite, and the appearance was poor.

<<Comprehensive Evaluation of Fiber-Reinforced Resin Composite>>

Based on the evaluation results of the heat resistance and appearance of the fiber-reinforced resin composite, the fiber-reinforced resin composite was comprehensively evaluated according to the following evaluation criteria.

<<Evaluation Criteria>>

○: Evaluations of all the items are "○".

Δ: None of the items is evaluated as "x", and one or more items are evaluated as "Δ".

x: Evaluation of any one or more of the items is "x".

Examples 1A to 3A

According to the formulation shown in Table 2, PET, PEI, talc MB and a cross-linking agent were mixed in a mixer to obtain a composition.

A die with an opening diameter of 3 mm and a land length of 5 mm was set at the tip of a single screw extruder (opening diameter 40 mm, L/D=40). The extruder was set to a predetermined temperature and the composition was kneaded in the extruder to form a resin melt. A blowing agent (isobutane:n-butane=35:65 (mass ratio)) was injected from the middle of the extruder barrel and added to the resin melt, and the resulting was further kneaded to obtain a thermoplastic resin composition. The resin temperature during extrusion was set to 285° C., and the molten thermoplastic resin composition was extrusion-foamed through a die at a discharge rate of 7 kg/h to obtain a rod-shaped foam. Table 2 shows the physical properties of the obtained rod-shaped foam. (In Table 2, the alphabetical character "Δ" behind the numbers in the notation of the Example numbers 1A to 3A is omitted. In Table 3 et seq., the alphabetical character (A, B or C) behind the numbers is likewise omitted.)

As shown in Table 2, rod-shaped foams to which the present invention was applied were obtained.

Example 4A

According to the formulation shown in Table 3, PET, PEI, talc MB and a cross-linking agent were mixed in a mixer to obtain a composition.

A circular die having an annular slit with a diameter of 93 mm and a slit width of 0.6 mm was set at the tip of a single screw extruder (opening diameter 65 mm, L/D=34), and a cooling mandrel (diameter 206 mm, length 310 mm) was placed in front of the circular die as viewed in the extrusion direction. A cooling water was circulated through the cooling mandrel. The extruder was set to a predetermined temperature and the composition was kneaded in the extruder into a molten mixture. A blowing agent (isobutane: n-butane=35:65 (mass ratio)) was injected from the middle of the extruder barrel and added to the resin molten mixture, and the resulting was further kneaded to obtain a thermoplastic resin composition.

The resin temperature during extrusion was set to 300° C., and the molten thermoplastic resin composition was extrusion-foamed through the die slit of a circular die at a discharge rate of 30 kg/h to form a cylindrical foam. The diameter of this cylindrical foam was expanded by the cooling mandrel, and was taken up by a take-up machine disposed further downstream of the cooling mandrel. The foam was cooled by placing the outer peripheral surface of the cooling mandrel along the inner peripheral surface of the foam, and the cylindrical foam was cut along the extrusion direction at a position downstream of the cooling mandrel. Then, the cylindrical foam was shaped into a flat strip and wound into a roll by a take-up machine. Table 3 shows the properties and evaluation results of the obtained foam sheet.

TABLE 2

| | | | | Example 1 | Example 2 | Example 3 |
|---|---|---|---|---|---|---|
| Formulation | PET | (A) | Part by mass | — | 68.2 | — |
| | | (B) | Part by mass | — | — | — |
| | | (C) | Part by mass | 68.2 | — | 68.2 |
| | PEI | (A) | Part by mass | 30.0 | 30.0 | 30.0 |
| | | (B) | Part by mass | — | — | — |
| | | (C) | Part by mass | — | — | — |
| | PCT | (G) | Part by mass | — | — | — |
| | Talc MB | PET | Part by mass | 1.8 | 1.8 | 1.8 |
| | | Talc | Part by mass | 0.7 | 0.7 | 0.7 |
| | Cross-linking agent | | Part by mass | 0.22 | 0.25 | 0.28 |
| | Blowing agent | | Part by mass | 0.6 | 0.6 | 0.6 |
| Properties of rod-shaped foam | Diameter | | mm | 5.70 | 5.40 | 5.54 |
| | Density | | g/cm$^3$ | 0.19 | 0.23 | 0.21 |
| | Expansion ratio | | Times | 7.0 | 5.8 | 6.3 |
| | Melting point | | ° C. | 249.8 | 248.8 | 245.0 |
| | Crystallization temperature | | ° C. | 163.4 | 162.9 | 163.1 |
| | Glass transition temperature | | ° C. | 95.2 | 94.6 | 94.8 |
| | Heat absorption(a) | | J/g | 23.5 | 25.5 | 24.1 |
| | Heat generation(b) | | J/g | 15.9 | 19.9 | 17.9 |
| | (a) − (b) | | J/g | 7.6 | 5.6 | 6.2 |
| | Crystallinity | | % | 5.4 | 4.0 | 4.4 |

Examples 5A to 9A, 11A to 20A, Comparative Examples 1A to 4A

Foam sheets were produced in the same manner as in Example 4A, except that the resin temperature during extrusion and the take-up speed of the take-up machine were adjusted according to the formulations shown in Tables 3 to 7. Tables 3 to 6 show the properties and evaluation results of the obtained foam sheets.

Example 10A

Resin flakes obtained by pulverizing the foam sheet obtained in Example 9A were remelted with a twin-screw extruder, and the resulting was extruded into a strand from a nozzle die, which was then cooled and pelletized to prepare recovered pellets. A foam sheet was produced in the same manner as in Example 4A, except that the formulation in Table 4 was followed. Table 4 shows the properties and evaluation results of the obtained foam sheet.

TABLE 3

| | | | | | Example 4 | Example 5 | Example 6 | Example 7 |
|---|---|---|---|---|---|---|---|---|
| Composition | PET | | (A) | Part by mass | 93.2 | 88.2 | 68.2 | — |
| | | | (B) | Part by mass | — | — | — | 68.2 |
| | | | (C) | Part by mass | — | — | — | — |
| | | | (D) | Part by mas | — | — | — | — |
| | PEI | | (A) | Part by mass | 5.0 | 10.0 | 30.0 | 30.0 |
| | | | (B) | Part by mass | — | — | — | — |
| | | | (C) | Part by mass | — | — | — | — |
| | PCT | | (G) | Part by mass | — | — | — | — |
| | Recovered pellets | | | Part by mass | — | — | — | — |
| | Talc MB | | PET | Part by mass | 1.8 | 1.8 | 1.8 | 1.8 |
| | | | Talc | Part by mass | 0.7 | 0.7 | 0.7 | 0.7 |
| | Cross-linking agent | | | Part by mass | 0.25 | 0.28 | 0.30 | 0.35 |
| | Blowing agent | | | Part by mass | 0.7 | 0.7 | 0.7 | 0.7 |
| Properties of foam sheet | Thickness | | | mm | 1.2 | 1.2 | 1.2 | 1.2 |
| | Basis weight | | | $g/m^2$ | 330 | 330 | 330 | 330 |
| | Density | | | $g/cm^3$ | 0.28 | 0.28 | 0.28 | 0.28 |
| | Expansion ratio | | | Times | 4.9 | 4.9 | 4.8 | 4.8 |
| | Open cell ratio | | | % | 10 | 11 | 1 | 11 |
| | Melting point | | | ° C. | 250.5 | 251.3 | 250.1 | 242.7 |
| | Crystallization temperature | | | ° C. | 152.7 | 154.1 | 164.8 | 168.5 |
| | Glass transition temperature | | | ° C. | 83.3 | 87.4 | 95.3 | 96.2 |
| | Heat absorption (a) | | | J/g | 31.7 | 30.0 | 24.3 | 18.7 |
| | Heat generation (b) | | | J/g | 22.9 | 22.4 | 14.8 | 10.1 |
| | (a) − (b) | | | J/g | 8.7 | 7.7 | 9.2 | 8.6 |
| | Crystallinity | | | % | 6.2 | 5.5 | 6.6 | 6.1 |
| | Slope r | | | Pa/° C. | −0.098 | −0.091 | −0.066 | −0.069 |
| Evaluation | Heat deformation test | 100° C. | MD ratio | — | 0.98 | 0.99 | 1.00 | 1.00 |
| | | | TD ratio | — | 0.97 | 0.98 | 1.00 | 1.00 |
| | | 120° C. | MD ratio | — | 0.98 | 0.97 | 0.99 | 1.00 |
| | | | TD ratio | — | 0.95 | 0.97 | 0.98 | 0.99 |
| | | 140° C. | MD ratio | — | 0.98 | 0.97 | 0.99 | 0.99 |
| | | | TD ratio | — | 0.95 | 0.95 | 0.97 | 0.99 |
| | | Evaluation | | — | Δ | ○ | ◎ | ◎ |
| | Hot tensile test | 23° C. | | MPa | 499 | 512 | 580 | 567 |
| | | 80° C. | | MPa | 141 | 165 | 345 | 313 |
| | | Retention rate | | % | 28 | 32 | 59 | 55 |
| | | Evaluation | | — | Δ | Δ | ◎ | ◎ |
| | Falling weight impact test | 23° C. | | J | 0.78 | 0.69 | 0.45 | 0.25 |
| | | Evaluation(23° C.) | | — | ◎ | ◎ | ○ | ○ |
| | | −30° C. | | J | 0.16 | 0.16 | 0.15 | 0.14 |
| | | Evaluation(−30° C.) | | — | ○ | ○ | ○ | ○ |
| | Comprehensive evaluation | | | — | Δ | ○ | ◎ | ◎ |

TABLE 4

| | | | | Ex. 8 | Ex. 9 | Ex. 10 | Ex. 11 |
|---|---|---|---|---|---|---|---|
| Composition | PET | (A) | Part by mass | — | — | — | — |
| | | (B) | Part by mass | 58.2 | — | — | — |
| | | (C) | Part by mass | — | 78.2 | 68.2 | — |
| | | (D) | Part by mass | — | — | — | 68.2 |
| | PEI | (A) | Part by mass | 40.0 | 20.0 | 20.0 | 30.0 |
| | | (B) | Part by mass | — | — | — | — |
| | | (C) | Part by mass | — | — | — | — |
| | PCT | (G) | Part by mass | — | — | — | — |
| | Recovered pellets | | Part by mass | — | — | 10.0 | — |

TABLE 4-continued

| | | | | | Ex. 8 | Ex. 9 | Ex. 10 | Ex. 11 |
|---|---|---|---|---|---|---|---|---|
| | Talc MB | PET | | Part by mass | 1.8 | 1.8 | 1.8 | 1.8 |
| | | Talc | | Part by mass | 0.7 | 0.7 | 0.7 | 0.7 |
| | Cross-linking agent | | | Part by mass | 0.35 | 0.28 | 0.38 | 0.35 |
| | Blowing agent | | | Part by mass | 0.7 | 0.7 | 0.7 | 0.7 |
| Properties of foam sheet | Thickness | | | mm | 1.2 | 1.2 | 1.2 | 1.2 |
| | Basis weight | | | $g/m^2$ | 330 | 330 | 330 | 330 |
| | Density | | | $g/cm^3$ | 0.28 | 0.28 | 0.28 | 0.28 |
| | Expansion ratio | | | Times | 4.7 | 4.9 | 4.8 | 4.8 |
| | Open cell ratio | | | % | 19 | 9 | 17 | 13 |
| | Melting point | | | ° C. | 242.0 | 250.0 | 247.1 | 247.9 |
| | Crystallization temperature | | | ° C. | 173.1 | 158.9 | 159.6 | 150.1 |
| | Glass transition temperature | | | ° C. | 98.3 | 91.5 | 92.5 | 94.9 |
| | Heat absorption(a) | | | J/g | 15.4 | 23.8 | 21.90 | 26.3 |
| | Heat generation(b) | | | J/g | 8.1 | 16.4 | 15.10 | 17.9 |
| | (a) − (b) | | | J/g | 7.3 | 7.4 | 6.8 | 8.4 |
| | Crystallinity | | | % | 5.2 | 5.3 | 4.9 | 6.0 |
| | Slope r | | | Pa/° C. | −0.075 | −0.072 | −0.077 | −0.066 |
| Evaluation | Heat deformation test | 100° C. | MD ratio | — | 1.00 | 0.99 | 0.99 | 0.99 |
| | | | TD ratio | — | 1.00 | 0.99 | 0.99 | 0.99 |
| | | 120° C. | MD ratio | — | 1.00 | 0.99 | 0.98 | 0.99 |
| | | | TD ratio | — | 1.00 | 0.97 | 0.97 | 0.98 |
| | | 140° C. | MD ratio | — | 0.99 | 0.98 | 0.98 | 0.98 |
| | | | TD ratio | — | 0.99 | 0.96 | 0.96 | 0.97 |
| | | Evaluation | | — | ◎ | ○ | ○ | ◎ |
| | Hot tensile test | 23° C. | | MPa | 479 | 489 | 467 | 512 |
| | | 80° C. | | MPa | 290 | 208 | 235 | 280 |
| | | Retention rate | | % | 61 | 43 | 50 | 55 |
| | | Evaluation | | — | ◎ | ○ | ◎ | ◎ |
| | Falling weight impact test | 23° C. | | J | 0.20 | 0.61 | 0.40 | 0.43 |
| | | Evaluation(23° C.) | | — | ○ | ◎ | ○ | ○ |
| | | −30° C. | | J | 0.14 | 0.15 | 0.14 | 0.14 |
| | | Evaluation(−30° C.) | | — | ○ | ○ | ○ | ○ |
| | Comprehensive evaluation | | | — | ◎ | ◎ | ◎ | ◎ |

TABLE 5

| | | | | | Ex. 12 | Ex. 13 | Ex. 14 | Ex. 15 |
|---|---|---|---|---|---|---|---|---|
| Composition | PET | (A) | | Part by mass | — | — | — | — |
| | | (B) | | Part by mass | — | — | — | — |
| | | (C) | | Part by mass | 68.2 | 68.2 | 70.0 | 68.2 |
| | | (D) | | Part by mass | — | — | — | — |
| | PEI | (A) | | Part by mass | 30.0 | 30.0 | 30.0 | — |
| | | (B) | | Part by mass | — | — | — | 30.0 |
| | | (C) | | Part by mass | — | — | — | — |
| | PCT | (G) | | Part by mass | — | — | — | — |
| | Recovered pellets | | | Part by mass | — | — | — | — |
| | Talc MB | PET | | Part by mass | 1.8 | 1.8 | — | 1.8 |
| | | Talc | | Part by mass | 0.7 | 0.7 | — | 0.7 |
| | Cross-linking agent | | | Part by mass | 0.30 | 0.30 | 0.35 | 0.30 |
| | Blowing agent | | | Part by mass | 0.7 | 0.8 | 0.9 | 0.7 |
| Properties of foam sheet | Thickness | | | mm | 1.2 | 1.3 | 1.3 | 1.3 |
| | Basis weight | | | $g/m^2$ | 330 | 270 | 240 | 340 |
| | Density | | | $g/cm^3$ | 0.28 | 0.21 | 0.18 | 0.26 |
| | Expansion ratio | | | Times | 4.8 | 6.4 | 7.2 | 5.1 |
| | Open cell ratio | | | % | 11 | 11 | 8 | 11 |
| | Melting point | | | ° C. | 248.8 | 248.2 | 248.5 | 248.0 |
| | Crystallization temperature | | | ° C. | 162.8 | 161.7 | 178.9 | 168.9 |
| | Glass transition temperature | | | ° C. | 95.0 | 93.6 | 93.9 | 98.3 |
| | Heat absorption(a) | | | J/g | 23.3 | 23.8 | 22.0 | 24.4 |
| | Heat generation(b) | | | J/g | 14.1 | 16.6 | 16.7 | 15.8 |
| | (a) − (b) | | | J/g | 9.2 | 7.1 | 5.4 | 8.6 |
| | Crystallinity | | | % | 6.6 | 5.1 | 3.8 | 6.1 |
| | Slope r | | | Pa/° C. | −0.066 | −0.069 | −0.133 | −0.082 |
| Evaluation | Heat defor-mation test | 100° C. | MD ratio | — | 1.00 | 1.00 | 0.99 | 1.00 |
| | | | TD ratio | — | 0.99 | 0.99 | 0.98 | 1.00 |
| | | 120° C. | MD ratio | — | 0.99 | 0.99 | 0.97 | 0.99 |
| | | | TD ratio | — | 0.98 | 0.98 | 0.95 | 0.97 |
| | | 140° C. | MD ratio | — | 0.99 | 0.98 | 0.96 | 0.98 |
| | | | TD ratio | — | 0.97 | 0.97 | 0.95 | 0.97 |
| | | Evaluation | | — | ◎ | ◎ | Δ | ◎ |
| | Hot tensile test | 23° C. | | MPa | 596 | 379 | 234 | 634 |
| | | 80° C. | | MPa | 350 | 218 | 149 | 380 |
| | | Retention rate | | % | 59 | 58 | 64 | 60 |
| | | Evaluation | | — | ◎ | ◎ | ◎ | ◎ |

TABLE 5-continued

| | | | Ex. 12 | Ex. 13 | Ex. 14 | Ex. 15 |
|---|---|---|---|---|---|---|
| Falling weight impact test | 23° C. | J | 0.45 | 0.33 | 0.29 | 0.48 |
| | Evaluation(23° C.) | — | ○ | ○ | ○ | ○ |
| | −30° C. | J | 0.15 | 0.10 | 0.08 | 0.17 |
| | Evaluation(−30° C.) | — | ○ | ○ | Δ | ○ |
| Comprehensive evaluation | | — | ◎ | ◎ | Δ | ◎ |

TABLE 6

| | | | | | Example 16 | Example 17 | Example 18 | Example 19 | Example 20 |
|---|---|---|---|---|---|---|---|---|---|
| Composition | PET | (A) | | Part by mass | — | — | — | — | — |
| | | (B) | | Part by mass | — | — | 48.2 | 38.2 | — |
| | | (C) | | Part by mass | 68.2 | 68.2 | — | — | 68.2 |
| | | (D) | | Part by mass | — | — | — | — | — |
| | PEI | (A) | | Part by mass | — | — | 50.0 | 60.0 | 30.0 |
| | | (B) | | Part by mass | 30.0 | — | — | — | — |
| | | (C) | | Part by mass | — | 30.0 | — | — | — |
| | PCT | (G) | | Part by mass | — | — | — | — | — |
| | Recovered pellets | | | Part by mass | — | — | — | — | — |
| | Talc MB | PET | | Part by mass | 1.8 | 1.8 | 1.8 | 1.8 | 1.8 |
| | | Talc | | Part by mass | 0.7 | 0.7 | 0.7 | 0.7 | 0.7 |
| | Cross-linking agent | | | Part by mass | 0.40 | 0.30 | 0.38 | 0.40 | 0.30 |
| | Blowing agent | | | Part by mass | 0.8 | 0.7 | 0.7 | 0.7 | 0.8 |
| Properties of foam sheet | Thickness | | | mm | 1.2 | 1.2 | 1.0 | 0.8 | 1.3 |
| | Basis weight | | | $g/m^2$ | 280 | 330 | 330 | 330 | 270 |
| | Density | | | $g/cm^3$ | 0.23 | 0.28 | 0.33 | 0.41 | 0.21 |
| | Expansion ratio | | | Times | 5.7 | 4.8 | 4.0 | 3.5 | 6.4 |
| | Open cell ratio | | | % | 12 | 10 | 23 | 29 | 12 |
| | Melting point | | | ° C. | 247.6 | 249.3 | 241.9 | 241.7 | 250.0 |
| | Crystallization temperature | | | ° C. | 167.9 | 163.0 | 195.3 | 210.9 | 163.8 |
| | Glass transition temperature | | | ° C. | 97.3 | 95.2 | 120.5 | 132.9 | 95.9 |
| | Heat absorption(a) | | | J/g | 23.8 | 22.9 | 12.5 | 10.0 | 24.1 |
| | Heat generation(b) | | | J/g | 14.4 | 13.9 | 7.8 | 6.9 | 20.5 |
| | (a) − (b) | | | J/g | 9.4 | 9.0 | 4.7 | 3.1 | 3.6 |
| | Crystallinity | | | % | 6.7 | 6.4 | 3.4 | 2.2 | 2.6 |
| | Slope r | | | Pa/° C. | −0.065 | −0.063 | −0.038 | −0.029 | −0.158 |
| Evaluation | Heat deformation test | 100° C. | MD ratio | — | 1.00 | 1.00 | 1.00 | 1.00 | 0.99 |
| | | | TD ratio | — | 0.99 | 0.99 | 1.00 | 1.00 | 0.98 |
| | | 120° C. | MD ratio | — | 0.99 | 0.99 | 1.00 | 1.00 | 0.98 |
| | | | TD ratio | — | 0.97 | 0.99 | 1.00 | 1.00 | 0.95 |
| | | 140° C. | MD ratio | — | 0.98 | 0.99 | 1.00 | 1.00 | 0.98 |
| | | | TD ratio | — | 0.97 | 0.98 | 0.99 | 1.00 | 0.95 |
| | | Evaluation | | — | ◎ | ◎ | ◎ | ◎ | Δ |
| | Hot tensile test | 23° C. | | MPa | 398 | 589 | 567 | 449 | 331 |
| | | 80° C. | | MPa | 235 | 342 | 382 | 312 | 120 |
| | | Retention rate | | % | 59 | 58 | 67 | 69 | 36 |
| | | Evaluation | | — | ◎ | ◎ | ◎ | ◎ | Δ |
| | Falling weight impact test | 23° C. | | J | 0.35 | 0.45 | 0.18 | 0.12 | 0.35 |
| | | Evaluation(23° C.) | | — | ○ | ○ | Δ | Δ | ○ |
| | | −30° C. | | J | 0.12 | 0.15 | 0.12 | 0.09 | 0.11 |
| | | Evaluation(−30° C.) | | — | ○ | ○ | ○ | Δ | ○ |
| | Comprehensive evaluation | | | — | ◎ | ◎ | ○ | Δ | Δ |

TABLE 7

| | | | | Comp. Ex. 1 | Comp. Ex. 2 | Comp. Ex. 3 | Comp. Ex. 4 |
|---|---|---|---|---|---|---|---|
| Composition | PET | (A) | Part by mass | 98.2 | — | 88.2 | 68.2 |
| | | (B) | Part by mass | — | — | — | — |
| | | (C) | Part by mass | — | 98.2 | — | — |
| | | (D) | Part by mass | — | — | — | — |
| | PEI | (A) | Part by mass | — | — | — | — |
| | | (B) | Part by mass | — | — | — | — |
| | | (C) | Part by mass | — | — | — | — |
| | PCT | (G) | Part by mass | — | — | 10.0 | 30.0 |
| | Recovered pellets | | Part by mass | — | — | — | — |
| | Talc MB | PET | Part by mass | 1.8 | 1.8 | 1.8 | 1.8 |
| | | Talc | Part by mass | 0.7 | 0.7 | 0.7 | 0.7 |
| | Cross-linking agent | | Part by mass | 0.25 | 0.25 | 0.25 | 0.25 |
| | Blowing agent | | Part by mass | 0.7 | 0.7 | 0.6 | 0.6 |

TABLE 7-continued

| | | | | | Comp. Ex. 1 | Comp. Ex. 2 | Comp. Ex. 3 | Comp. Ex. 4 |
|---|---|---|---|---|---|---|---|---|
| Properties of foam sheet | Thickness | | | mm | 1.1 | 1.2 | 1.0 | 0.7 |
| | Basis weight | | | g/m$^2$ | 330 | 330 | 330 | 330 |
| | Density | | | g/cm$^3$ | 0.30 | 0.28 | 0.33 | 0.47 |
| | Expansion ratio | | | Times | 4.5 | 4.8 | 4.0 | 3.9 |
| | Open cell ratio | | | % | 10 | 11 | 7 | 60 |
| | Melting point | | | ° C. | 250.0 | 249.9 | 249.3 | 249.2 |
| | Crystallization temperature | | | ° C. | 133.3 | 134.2 | 132.8 | 133.9 |
| | Glass transition temperature | | | ° C. | 78.9 | 78.6 | 79.2/105.2 | 78.9/104.0 |
| | Heat absorption(a) | | | J/g | 33.9 | 33.4 | 24.8 | 29.3 |
| | Heat generation(b) | | | J/g | 25.4 | 24.6 | 16.5 | 22.7 |
| | (a) − (b) | | | J/g | 8.6 | 8.8 | 8.3 | 6.6 |
| | Crystallinity | | | % | 6.1 | 6.3 | 5.9 | 4.7 |
| | Slope r | | | Pa/° C. | −0.101 | −0.099 | −0.102 | −0.014 |
| Evaluation | Heat deformation test | 100° C. | MD ratio | — | 0.98 | 0.99 | 0.98 | 0.99 |
| | | | TD ratio | — | 0.97 | 0.97 | 0.97 | 0.98 |
| | | 120° C. | MD ratio | — | 0.98 | 0.98 | 0.98 | 0.98 |
| | | | TD ratio | — | 0.94 | 0.94 | 0.94 | 0.96 |
| | | 140° C. | MD ratio | — | 0.98 | 0.98 | 0.98 | 0.98 |
| | | | TD ratio | — | 0.94 | 0.94 | 0.94 | 0.95 |
| | | Evaluation | | — | X | X | X | Δ |
| | Hot tensile test | 23° C. | | MPa | 474 | 489 | 595 | 493 |
| | | 80° C. | | MPa | 29 | 33 | 79 | 108 |
| | | Retention rate | | % | 6 | 7 | 13 | 22 |
| | | Evaluation | | — | X | X | X | X |
| | Falling weight impact test | 23° C. | | J | 0.80 | 0.82 | 0.53 | 1.05 |
| | | Evaluation(23° C.) | | — | ◎ | ◎ | ◎ | ◎ |
| | | −30° C. | | J | 0.15 | 0.15 | 0.15 | 0.40 |
| | | Evaluation(−30° C.) | | — | ○ | ○ | ○ | ◎ |
| | Comprehensive evaluation | | | — | X | X | X | X |

In Examples 4A to 20A to which the present invention was applied, the comprehensive evaluation results ranged from "Δ" to "◎".

The comprehensive evaluation results for Comparative Examples 1A and 2A containing no PEI and Comparative Examples 3A and 4A showing multiple glass transition temperatures were "x".

Example 21A

The foam sheet obtained in Example 12A was cut into a planar square shape of 250 mm×250 mm. The cut foam sheet was sandwiched between a pair of hot plates heated to 160° C., and the surface temperature of the foam sheet was maintained at 160° C. for 10 minutes to obtain a heat-set foam sheet. Table 8 shows the properties and evaluation results of the obtained foam sheet.

Example 22A, Comparative Examples 5A to 8A

Heat-set foam sheets were obtained in the same manner as in Example 21A except that the foam sheets shown in Tables 8 and 9 were used and the heat set conditions as shown in Tables 8 and 9 were adopted. Tables 8 and 9 show the properties and evaluation results of the obtained foam sheet.

TABLE 8

| | | | | Ex. 21 | Ex. 22 |
|---|---|---|---|---|---|
| Foam sheet used | | | | Ex. 12 | Ex. 14 |
| Composition | PET | (A) | Part by mass | — | |
| | | (B) | Part by mass | — | — |
| | | (C) | Part by mass | 68.2 | 70.0 |
| | | (D) | Part by mass | — | — |
| | PEI | (A) | Part by mass | 30.0 | 30.0 |
| | | (B) | Part by mass | — | — |
| | | (C) | Part by mass | — | — |
| | PCT | (G) | Part by mass | — | — |
| | Recovered pellets | | Part by mass | — | — |
| | Talc MB | PET | Part by mass | 1.8 | — |
| | | Talc | Part by mass | 0.7 | — |
| | Cross-linking agent | | Part by mass | 0.30 | 0.35 |
| | Blowing agent | | Part by mass | 0.7 | 0.9 |
| Heat set | Temperature | | ° C. | 160 | 160 |
| | Time | | min | 10 | 10 |
| Properties of foam sheet | Thickness | | mm | 1.2 | 1.2 |
| | Basis weight | | g/m$^2$ | 330 | 240 |
| | Density | | g/cm$^3$ | 0.28 | 0.20 |
| | Expansion ratio | | Times | 4.8 | 6.6 |
| | Open cell ratio | | % | 11 | 8 |
| | Melting point | | ° C. | 248.6 | 248.6 |
| | Crystallization temperature | | ° C. | 162.9 | 178.6 |
| | Glass transition temperature | | ° C. | 94.0 | 93.1 |
| | Heat absorption(a) | | J/g | 22.2 | 24.4 |

TABLE 8-continued

| | | | | | Ex. 21 | Ex. 22 |
|---|---|---|---|---|---|---|
| | Heat generation(b) | | | J/g | 0 | 0.0 |
| | (a) − (b) | | | J/g | 22.2 | 24.4 |
| | Crystallinity | | | % | 15.8 | 17.4 |
| | Slope r | | | Pa/° C. | −0.04 | −0.029 |
| Evaluation | Heat deformation test | 100° C. | MD ratio | — | 1.00 | 1.00 |
| | | | TD ratio | — | 1.00 | 1.00 |
| | | 120° C. | MD ratio | — | 1.00 | 1.00 |
| | | | TD ratio | — | 1.00 | 1.00 |
| | | 140° C. | MD ratio | — | 1.00 | 1.00 |
| | | | TD ratio | — | 0.99 | 0.99 |
| | | Evaluation | | — | ◎ | ◎ |
| | Hot tensile test | 23° C. | | MPa | 631 | 290 |
| | | 80° C. | | MPa | 398 | 203 |
| | | Retention rate | | % | 63 | 70 |
| | | Evaluation | | — | ◎ | ◎ |
| | Falling weight impact test | 23° C. | | J | 0.20 | 0.16 |
| | | Evaluation(23° C.) | | — | ○ | Δ |
| | | −30° C. | | J | 0.15 | 0.06 |
| | | Evaluation(−30° C.) | | — | ○ | Δ |
| | Comprehensive evaluation | | | — | ◎ | Δ |

TABLE 9

| | | | | | Comp. Ex. 5 | Comp. Ex. 6 | Comp. Ex. 7 | Comp. Ex. 8 |
|---|---|---|---|---|---|---|---|---|
| | Foam sheet used | | | | Comp. Ex. 1 | Comp. Ex. 2 | Comp. Ex. 3 | Comp. Ex. 4 |
| Composition | PET | (A) | | Part by mass | 98.2 | — | 88.2 | 68.2 |
| | | (B) | | Part by mass | — | — | — | — |
| | | (C) | | Part by mass | — | 98.2 | | |
| | | (D) | | Part by mass | — | — | — | — |
| | PEI | (A) | | Part by mass | — | — | — | — |
| | | (B) | | Part by mass | — | — | — | — |
| | | (C) | | Part by mass | — | — | — | — |
| | PCT | (G) | | Part by mass | — | — | 10.0 | 30.0 |
| | Recovered pellets | | | Part by mass | — | — | — | — |
| | Talc MB | PET | | Part by mass | 1.8 | 1.8 | 1.8 | 1.8 |
| | | Talc | | Part by mass | 0.7 | 0.7 | 0.7 | 0.7 |
| | Cross-linking agent | | | Part by mass | 0.25 | 0.25 | 0.25 | 0.25 |
| | Blowing agent | | | Part by mass | 0.7 | 0.7 | 0.6 | 0.6 |
| Heat set | Temperature | | | ° C. | 130 | 130 | 160 | 160 |
| | Time | | | min | 10 | 10 | 10 | 10 |
| Properties of foam sheet | Thickness | | | mm | 1.2 | 1.2 | 1.0 | 0.7 |
| | Basis weight | | | $g/m^2$ | 330 | 330 | 330 | 330 |
| | Density | | | $g/cm^3$ | 0.28 | 0.28 | 0.33 | 0.47 |
| | Expansion ratio | | | Times | 4.8 | 4.8 | 4.0 | 3.9 |
| | Open cell ratio | | | % | 10 | 11 | 7 | 60 |
| | Melting point | | | ° C. | 250.1 | 249.9 | 249.3 | 249.1 |
| | Crystallization temperature | | | ° C. | 133.8 | 134.1 | 133.1 | 133.5 |
| | Glass transition temperature | | | ° C. | 79.0 | 78.5 | 79.0/104.2 | 78.5/103.8 |
| | Heat absorption(a) | | | J/g | 32.3 | 33.1 | 29.9 | 24.2 |
| | Heat generation(b) | | | J/g | 0.0 | 0.0 | 0.0 | 0.0 |
| | (a) − (b) | | | J/g | 32.3 | 33.1 | 29.9 | 24.2 |
| | Crystallinity | | | % | 23.1 | 23.6 | 21.3 | 17.3 |
| | Slope r | | | Pa/° C. | −0.085 | −0.083 | −0.093 | −0.089 |
| Evaluation | Heat deformation test | 100° C. | MD ratio | — | 1.00 | 1.00 | 1.00 | 1.00 |
| | | | TD ratio | — | 1.00 | 1.00 | 1.00 | 1.00 |
| | | 120° C. | MD ratio | — | 1.00 | 1.00 | 1.00 | 1.00 |
| | | | TD ratio | — | 1.00 | 1.00 | 0.99 | 1.00 |
| | | 140° C. | MD ratio | — | 1.00 | 1.00 | 1.00 | 1.00 |
| | | | TD ratio | — | 0.99 | 0.99 | 0.98 | 0.99 |
| | | Evaluation | | — | ◎ | ◎ | ◎ | ◎ |
| | Hot tensile test | 23° C. | | MPa | 502 | 510 | 655 | 609 |
| | | 80° C. | | MPa | 52 | 59 | 120 | 140 |
| | | Retention rate | | % | 10 | 12 | 18 | 23 |
| | | Evaluation | | — | X | X | X | X |
| | Falling weight impact test | 23° C. | | J | 0.15 | 0.15 | 0.18 | 0.65 |
| | | Evaluation(23° C.) | | — | Δ | Δ | Δ | ◎ |
| | | −30° C. | | J | 0.15 | 0.15 | 0.15 | 0.20 |
| | | Evaluation(−30° C.) | | — | ○ | ○ | ○ | ○ |
| | Comprehensive evaluation | | | — | X | X | X | X |

In Examples 21A to 22A to which the present invention was applied, the comprehensive evaluation results ranged from "Δ" to "⊚", and particularly excellent results were obtained in the heat deformation test.

Example 23A

The foam sheet obtained in Example 12A prior to the heat set was prepared, and this foam sheet was cut into a planar square shape of 250 mm×250 mm. The foam sheet was set in a fixing frame so that the extrusion (MD) direction was aligned with the longitudinal direction of the container, and the foam sheet was preheated in a heater bath at 320° C. for 20 seconds to raise the surface temperature of the foam sheet to 170° C. Thereafter, a tray-shaped molded product (length 210 mm×width 180 mm×height 30 mm) having an opening at the top was obtained by a match mold molding method. The time required to obtain the molded product (molding cycle time) was 33 seconds. Table shows the properties and evaluation results of the obtained molded product.

The melting point, crystallization temperature and glass transition temperature of the obtained molded product were the same as those of the foam sheet used, which are shown in Table 10.

Examples 24A to 29A, Comparative Examples 9A to 11A

Molded products were obtained in the same manner as in Example 23A except that the foam sheets shown in Tables 10 to 12 were used and the molding conditions were as shown in Tables 10 to 12. Tables 10 to 12 show the properties and evaluation results of the obtained molded products.

The melting point, crystallization temperature and glass transition temperature of the obtained molded products were the same as those of the foam sheets used, which are shown in Tables 10 to 12.

Example 30A

The foam sheet obtained in Example 5A prior to the heat set was prepared, and this foam sheet was cut into a planar square shape of 34 cm×34 cm. The test piece was set in a fixing frame so that the extrusion (MD) direction of the foam sheet was aligned with the longitudinal direction of the container, and the test piece was preheated in a heater bath at 320° C. for 20 seconds to raise the surface temperature of the foam sheet to 170° C. Then, the foam sheet was subjected to vacuum pressure molding in a mold heated to 180° C., and the resulting molded product was held in the mold for 10 seconds. Thereafter, the mold was opened to obtain a heat-set tray-shaped molded product (length 210 mm×width 180 mm×height 30 mm) having an opening at the top. Table 12 shows the properties and evaluation results of the obtained molded product.

The melting point, crystallization temperature and glass transition temperature of the obtained molded product were the same as those of the foam sheet used, which are shown in Table 12.

Examples 31A and 32A, Comparative Examples 12A to 16A

Molded products were obtained in the same manner as in Example 30A except that the foam sheets shown in Tables 12 and 13 were used and the molding conditions were as shown in Tables 12 and 13. Tables 12 and 13 show the properties and evaluation results of the obtained molded products.

The melting point, crystallization temperature and glass transition temperature of the obtained molded products were the same as those of the foam sheets used, which are shown in Tables 12 and 13.

TABLE 10

| | | | | | Ex. 23 | Ex. 24 | Ex. 25 | Ex. 26 |
|---|---|---|---|---|---|---|---|---|
| | Foam sheet used | | | | Ex. 12 | Ex. 12 | Ex. 5 | Ex. 9 |
| Formulation | PET | | (A) | Part by mass | — | — | 88.2 | — |
| | | | (B) | Part by mass | — | — | — | — |
| | | | (C) | Part by mass | 68.2 | 68.2 | — | 78.2 |
| | | | (D) | Part by mass | — | — | — | — |
| | PEI | | (A) | Part by mass | 30.0 | 30.0 | 10.0 | 20.0 |
| | | | (B) | Part by mass | — | — | — | — |
| | | | (C) | Part by mass | — | — | — | — |
| | PCT | | (G) | Part by mass | — | — | — | — |
| | Recovered pellets | | | Part by mass | — | — | — | — |
| | Talc MB | | PET | Part by mass | 1.8 | 1.8 | 1.8 | 1.8 |
| | | | Talc | Part by mass | 0.7 | 0.7 | 0.7 | 0.7 |
| | Cross-linking agent | | | Part by mass | 0.30 | 0.30 | 0.28 | 0.28 |
| | Blowing agent | | | Part by mass | 0.7 | 0.7 | 0.7 | 0.7 |
| Molding conditions | Heater set temperature | | | ° C. | 320 | 320 | 320 | 320 |
| | Preheating time | | | sec | 20 | 30 | 10 | 15 |
| | Surface temperature of preheated sheet | | | ° C. | 170 | 190 | 130 | 160 |
| | Heat set | | Mold temperature | ° C. | — | — | — | — |
| | | | Retention time | sec | — | — | — | — |
| | Molding cycle time | | | sec | 33 | 43 | 23 | 28 |
| Properties of molded product | Heat absorption(a) | | | J/g | 23.3 | 25.0 | 29.3 | 27.7 |
| | Heat generation(b) | | | J/g | 7.9 | 7.3 | 15.0 | 14.4 |
| | (a) − (b) | | | J/g | 15.4 | 17.7 | 14.3 | 13.3 |
| | Crystallinity | | | % | 11.0 | 12.6 | 10.2 | 9.5 |
| | Slope | | | Pa/° C. | −0.063 | −0.05 | −0.074 | −0.064 |
| Evaluation of molded product | Heat deformation ratio | 140° C. | Longitudinal direction(SL) | % | 2.3 | 1.5 | 3.4 | 3.0 |
| | | | Transverse direction (SS) | % | 3.9 | 3.2 | 4.4 | 4.2 |
| | | | Height direction (ST) | % | 2.4 | 2.0 | 30.1 | 10.5 |

TABLE 10-continued

| | | | Ex. 23 | Ex. 24 | Ex. 25 | Ex. 26 |
|---|---|---|---|---|---|---|
| Total deformation ratio | | % | 8.6 | 6.7 | 37.9 | 17.7 |
| Evaluation | | — | ◎ | ◎ | Δ | ◎ |
| Heat resistance | | — | ◎ | ◎ | Δ | ○ |
| Moldability | | — | ◎ | ◎ | ◎ | ◎ |
| Comprehensive evaluation | | — | ◎ | ◎ | Δ | ○ |

TABLE 11

| | | | | | Ex. 27 | Ex. 28 | Ex. 29 | Comp. Ex. 9 |
|---|---|---|---|---|---|---|---|---|
| | Foam sheet used | | | | Ex. 18 | Ex. 20 | Ex. 21 | Comp. Ex. 1 |
| Formulation | PET | | (A) | Part by mass | — | — | — | 98.2 |
| | | | (B) | Part by mass | 48.2 | — | — | — |
| | | | (C) | Part by mass | — | 68.2 | 68.2 | — |
| | | | (D) | Part by mass | — | — | — | — |
| | PEI | | (A) | Part by mass | 50.0 | 30.0 | 30.0 | — |
| | | | (B) | Part by mass | — | — | — | — |
| | | | (C) | Part by mass | — | — | — | — |
| | PCT | | (G) | Part by mass | — | — | — | — |
| | Recovered pellets | | | Part by mass | — | — | — | — |
| | Talc MB | | PET | Part by mass | 1.8 | 1.8 | 1.8 | 1.8 |
| | | | Talc | Part by mass | 0.7 | 0.7 | 0.7 | 0.7 |
| | Cross-linking agent | | | Part by mass | 0.38 | 0.30 | 0.30 | 0.25 |
| | Blowing agent | | | Part by mass | 0.7 | 0.8 | 0.7 | 0.7 |
| Molding conditions | Heater set temperature | | | ° C. | 350 | 320 | 320 | 320 |
| | Preheating time | | | sec | 40 | 10 | 20 | 10 |
| | Surface temperature of preheated sheet | | | ° C. | 210 | 130 | 170 | 130 |
| | Heat set | | Mold temperature | ° C. | — | — | — | — |
| | | | Retention time | sec | — | — | — | — |
| | Molding cycle time | | | sec | 53 | 23 | 33 | 23 |
| Properties of molded product | Heat absorption(a) | | | J/g | 14.0 | 20.3 | 23.0 | 31.1 |
| | Heat generation(b) | | | J/g | 5.1 | 14.0 | 0.0 | 19.6 |
| | (a) − (b) | | | J/g | 8.9 | 6.3 | 23.0 | 11.6 |
| | Crystallinity | | | % | 6.4 | 4.5 | 16.4 | 8.3 |
| | Slope | | | Pa/° C. | −0.021 | −0.115 | −0.028 | −0.095 |
| Evaluation of molded product | Heat deformation ratio | 140° C. | Longitudinal direction(SL) | % | 1.0 | 3.1 | 0.6 | 3.6 |
| | | | Transverse direction (SS) | % | 1.5 | 4.8 | 0.4 | 4.6 |
| | | | Height direction (ST) | % | 1.5 | 28.5 | 0.9 | 44.5 |
| | Total deformation ratio | | | % | 4.0 | 36.4 | 1.9 | 52.7 |
| | Evaluation | | | — | ◎ | Δ | ◎ | X |
| | Heat resistance | | | — | ◎ | Δ | ◎ | X |
| | Moldability | | | — | ○ | ◎ | Δ | ◎ |
| | Comprehensive evaluation | | | — | ○ | Δ | Δ | X |

TABLE 12

| | | | | Comp. Ex. 10 | Comp. Ex. 11 | Ex. 30 | Ex. 31 | Ex. 32 |
|---|---|---|---|---|---|---|---|---|
| | Foam sheet used | | | Comp. Ex. 2 | Comp. Ex. 4 | Ex. 5 | Ex. 12 | Ex. 12 |
| Formulation | PET | (A) | Part by mass | — | 68.2 | 88.2 | — | — |
| | | (B) | Part by mass | — | — | — | — | — |
| | | (C) | Part by mass | 98.2 | — | — | 68.2 | 68.2 |
| | | (D) | Part by mass | — | — | — | — | — |
| | PEI | (A) | Part by mass | — | — | 10.0 | 30.0 | 30.0 |
| | | (B) | Part by mass | — | — | — | — | — |
| | | (C) | Part by mass | — | — | — | — | — |
| | PCT | (G) | Part by mass | — | 30.0 | — | — | — |
| | Recovered pellets | | Part by mass | — | — | — | — | — |
| | Talc MB | PET | Part by mass | 1.8 | 1.8 | 1.8 | 1.8 | 1.8 |
| | | Talc | Part by mass | 0.7 | 0.7 | 0.7 | 0.7 | 0.7 |
| | Cross-linking agent | | Part by mass | 0.25 | 0.25 | 0.28 | 0.30 | 0.30 |
| | Blowing agent | | Part by mass | 0.7 | 0.6 | 0.7 | 0.7 | 0.7 |
| Molding conditions | Heater set temperature | | ° C. | 320 | 320 | 320 | 320 | 320 |
| | Preheating time | | sec | 10 | 20 | 10 | 20 | 20 |
| | Surface temperature of preheated sheet | | ° C. | 130 | 170 | 130 | 170 | 170 |
| | Heat set | Mold temperature | ° C. | — | — | 180 | 180 | 180 |
| | | Retention time | sec | — | — | 10 | 10 | 45 |
| | Molding cycle time | | sec | 23 | 33 | 33 | 43 | 78 |

TABLE 12-continued

| | | | | | Comp. Ex. 10 | Comp. Ex. 11 | Ex. 30 | Ex. 31 | Ex. 32 |
|---|---|---|---|---|---|---|---|---|---|
| Properties of molded product | Heat absorption (a) | | | J/g | 32.9 | 29.4 | 30.9 | 23.9 | 24.5 |
| | Heat generation (b) | | | J/g | 22.1 | 20.5 | 14.1 | 10.8 | 2.6 |
| | (a) − (b) | | | J/g | 10.8 | 8.9 | 16.8 | 13.1 | 21.9 |
| | Crystallinity | | | % | 7.7 | 6.4 | 12.0 | 9.4 | 15.6 |
| | Slope | | | Pa/° C. | −0.093 | −0.125 | −0.061 | −0.055 | −0.042 |
| Evaluation of molded product | Heat deformation ratio | 140° C. | Longitudinal direction (SL) | % | 4.0 | 3.5 | 0.9 | 1.6 | 0.7 |
| | | | Transverse direction (SS) | % | 4.5 | 4.6 | 0.5 | 2.0 | 0.5 |
| | | | Height direction (ST) | % | 46.9 | 13.1 | 1.0 | 1.9 | 1.0 |
| | Total deformation ratio | | | % | 55.4 | 21.2 | 2.4 | 5.5 | 2.2 |
| | Evaluation | | | — | X | ○ | ◎ | ◎ | ◎ |
| | Heat resistance | | | — | X | Δ | ○ | ◎ | ◎ |
| | Moldability | | | — | ◎ | X | ◎ | ◎ | ◎ |
| | Comprehensive evaluation | | | — | X | X | ○ | ◎ | ◎ |

TABLE 13

| | | | | | Comp. Ex. 12 | Comp. Ex. 13 | Comp. Ex. 14 | Comp. Ex. 15 | Comp. Ex. 16 |
|---|---|---|---|---|---|---|---|---|---|
| | Foam sheet used | | | | Comp. Ex. 1 | Comp. Ex. 2 | Comp. Ex. 2 | Comp. Ex. 4 | Comp. Ex. 4 |
| Formulation | PET | (A) | | Part by mass | 98.2 | — | — | 68.2 | 68.2 |
| | | (B) | | Part by mass | — | — | — | — | — |
| | | (C) | | Part by mass | — | 98.2 | 98.2 | — | — |
| | | (D) | | Part by mass | — | — | — | — | — |
| | PEI | (A) | | Part by mass | — | — | — | — | — |
| | | (B) | | Part by mass | — | — | — | — | — |
| | | (C) | | Part by mass | — | — | — | — | — |
| | PCT | (G) | | Part by mass | — | — | — | 30.0 | 30.0 |
| | Recovered pellets | | | Part by mass | — | — | — | — | — |
| | Talc MB | PET | | Part by mass | 1.8 | 1.8 | 1.8 | 1.8 | 1.8 |
| | | Talc | | Part by mass | 0.7 | 0.7 | 0.7 | 0.7 | 0.7 |
| | Cross-linking agent | | | Part by mass | 0.25 | 0.25 | 0.25 | 0.25 | 0.25 |
| | Blowing agent | | | Part by mass | 0.7 | 0.7 | 0.7 | 0.6 | 0.6 |
| Molding conditions | Heater set temperature | | | ° C. | 320 | 320 | 320 | 320 | 320 |
| | Preheating time | | | sec | 10 | 10 | 10 | 10 | 10 |
| | Surface temperature of preheated sheet | | | ° C. | 130 | 130 | 130 | 130 | 130 |
| | Heat set | Mold temperature | | ° C. | 180 | 180 | 180 | 180 | 180 |
| | | Retention time | | sec | 10 | 10 | 45 | 10 | 45 |
| | Molding cycle time | | | sec | 33 | 33 | 78 | 33 | 78 |
| Properties of molded product | Heat absorption (a) | | | J/g | 33.6 | 33.8 | 34.0 | 29.2 | 29.5 |
| | Heat generation (b) | | | J/g | 0.6 | 1.3 | 0.0 | 16.2 | 6.4 |
| | (a) − (b) | | | J/g | 33.0 | 32.5 | 34.0 | 13.0 | 23.1 |
| | Crystallinity | | | % | 23.5 | 23.2 | 24.3 | 9.3 | 16.5 |
| | Slope | | | Pa/° C. | −0.081 | −0.082 | −0.081 | −1.04 | −0.093 |
| Evaluation of molded product | Heat deformation ratio | 140° C. | Longitudinal direction (SL) | % | 0.8 | 0.8 | 0.7 | 1.8 | 0.9 |
| | | | Transverse direction (SS) | % | 0.5 | 0.6 | 0.6 | 2.7 | 0.8 |
| | | | Height direction (ST) | % | 0.9 | 0.8 | 0.7 | 2.5 | 0.7 |
| | Total deformation ratio | | | % | 2.2 | 2.2 | 2.0 | 7.0 | 2.4 |
| | Evaluation | | | — | ◎ | ◎ | ◎ | ◎ | ◎ |
| | Heat resistance | | | — | X | X | X | Δ | Δ |
| | Moldability | | | — | ◎ | ◎ | ◎ | X | X |
| | Comprehensive evaluation | | | — | X | X | X | X | X |

In Examples 23A to 32A to which the present invention was applied, the comprehensive evaluation results ranged from "Δ" to "◎".

The above results confirm that the heat resistance of the thermoplastic resin foam can be increased by applying the present invention.

In Comparative Examples 11A, 15A, and 16A, the evaluation of heat resistance was "Δ", but the moldability, which is the basic function of the foam, was "x", so that it was judged that the problem of the present invention was not solved.

Example 1B

Using a production apparatus similar to the foam granule production apparatus 310 shown in FIGS. 12 to 14, foam granules were produced following the procedure described below.

First, according to the formulations in the tables, a polyester resin, a polyimide resin, a talc masterbatch, and a cross-linking agent were fed to a single-screw extruder with a cylinder opening diameter D of 65 mm and an L/D ratio (cylinder length L/cylinder opening diameter D) of 34, and the resulting was melt-kneaded at 290° C. Subsequently, from the middle of the extruder, butane (isobutane:normal butane=35:65 (mass ratio)) as a blowing agent was pressurized into the melt-kneaded material in a molten state such that the respective amounts shown in the tables were met and the blowing agent was dispersed uniformly in the melt-kneaded material, to thereby obtain a resin composition. Then, the molten resin composition was heated to 300° C. at the front end of the extruder, and then extrusion-foamed through the nozzles of a multi-nozzle type nozzle die 301 attached to the front end of the extruder. The extrusion rate of the resin composition was kg/h.

The nozzle die 301 had 20 nozzles with an outlet 311 having a diameter of 1 mm, and all the outlets 311 were positioned at equal intervals on a virtual circle A having a diameter of 139.5 mm. Further, two rotary blades 305 were integrally provided on the outer peripheral surface of the rear end portion of the rotary shaft 302 with a phase difference of 180° in the circumferential direction of the rotary shaft 302, and each rotary blade 305 was configured to move on the virtual circle A while always in contact with the front end surface 301*a* of the nozzle die 301.

The cooler 304 had a cooling drum 341 having a front portion 341*a* with a circular front, and a cylindrical peripheral wall portion 341*b* extending backward from the outer peripheral edge of the front portion 341*a* and having an inner diameter of 320 mm. Then, the cooling liquid 342 at 20° C. was fed into the cooling drum 341 through the feed pipe 341*d* and the feed inlet 341*c* of the cooling drum 341. The volume inside the cooling drum 341 was 17684 $cm^3$.

The cooling liquid 342 proceeded forward in a spiral along the inner peripheral surface of the peripheral wall portion 341*b* of the cooling drum 341 due to the centrifugal force associated with the flow velocity caused by feeding of the cooling liquid 342 from the feed pipe 341*d* to the inner peripheral surface of the peripheral wall portion 341*b* of the cooling drum 341. The cooling liquid 342 gradually spread in a direction perpendicular to the traveling direction while traveling along the inner peripheral surface of the peripheral wall portion 341*b*, and entirely covered the inner peripheral surface of the peripheral wall portion 341*b* at its section positioned ahead of the feed inlet 341*c*.

A rotary blade 305 provided on the front end surface 301*a* was rotated at a rotational speed of 3400 rpm, and the extruded foam extrusion-foamed through the outlet 311 of each nozzle of the nozzle die 301 was cut by the rotary blade 305 to form substantially spherical cut granules. The extruded foam consisted of an unfoamed portion immediately after being extruded from the nozzle of the nozzle die 301, and a foamed portion that was continuous with the unfoamed portion and in the process of foaming. The extruded foam was being cut at the open end of the nozzle outlet 311, and the cutting of the extruded foam was performed at the unfoamed portion.

Before initiating the production of the foam granules as described above, the rotary shaft 302 was not attached to the nozzle die 301 and the cooler 304 was held away from the nozzle die 301. In this state, the resin composition was extrusion-foamed through the extruder to form an extruded foam to confirm that the extruded foam consisted of an unfoamed portion immediately after being extruded from the nozzle of the nozzle die 301, and a foamed portion that was continuous with the unfoamed portion and in the process of foaming. Then, after attaching the rotary shaft 302 to the nozzle die 301 and arranging the cooler 304 at a predetermined position, the rotary shaft 302 was rotated, and the extruded foam was cut by the rotary blade 305 at the opening end of the nozzle outlet 311 to produce cut granules.

The cut granules were thrown outward or forward by the cutting stress caused by the rotary blade 305, and allowed to collide with the cooling liquid 342 flowing along the inner surface of the cooling drum 341 of the cooler 304 from a direction oblique to the surface of the cooling liquid 342, following the flow of the cooling liquid 342 from its upstream side to downstream side, and the cut granules were immediately cooled upon entry into the cooling liquid 342, thereby producing foam granules.

The obtained foam granules were discharged together with the cooling liquid 342 through the discharge outlet 341*e* of the cooling drum 341, and then separated from the cooling liquid 342 by a dehydrator.

An in-mold foam molding machine having molds (male and female molds) were prepared. With the male mold and female mold clamped together, a rectangular parallelepiped cavity having internal dimensions of 300 mm in length×400 mm in width×30 mm in height was formed between the male and female molds.

Then, after filling the foam granules into the mold while leaving 3 mm of mold cracking, steam was introduced from the female mold for 30 seconds so that the inside of the cavity became 0.08 MPa (gauge pressure) (one-direction heating), further steam was introduced from the male mold for 30 seconds so that the inside of the cavity became 0.08 MPa (gauge pressure) (reverse one-direction heating), and further steam was introduced from both the male and female molds for 30 seconds so that the inside of the cavity became 0.12 MPa (gauge pressure) (both-side heating), thereby heating the foam granules to cause secondary foaming and fusion-integrate the secondary foam granules. Then, the introduction of steam into the cavity was discontinued and the molds were held in that state for 300 seconds (heat retention step). Finally, a cooling liquid was supplied into the cavity to cool the foam granule-molded product in the molds, and the cavity was opened to take out the foam granule-molded product.

In this process, the time (molding cycle time) required from the step of filling the foam granules into the mold to obtain the foam granule-molded product was 600 seconds.

Examples 2B to 3B, 6B, 8B to 9B, 11B to 13B, Comparative Examples 1B, 3B to 4B Foam granules and a foam granule-molded product were produced in the same manner as in Example 1B, except that the polyester resin, polyimide resin, talc masterbatch, cross-linking agent, and blowing agent were blended as shown in the table, and the molding conditions were set as shown in the table.

Figure 17:
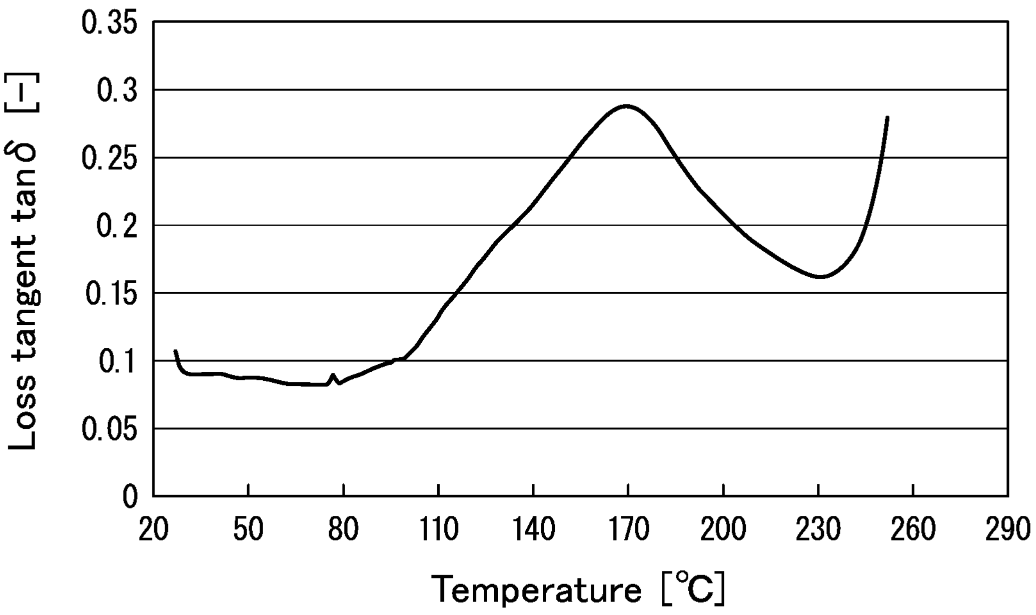
FIG. 17 is a graph showing measurement results for loss tangent tan δ in Example 3B.
Figure 18:
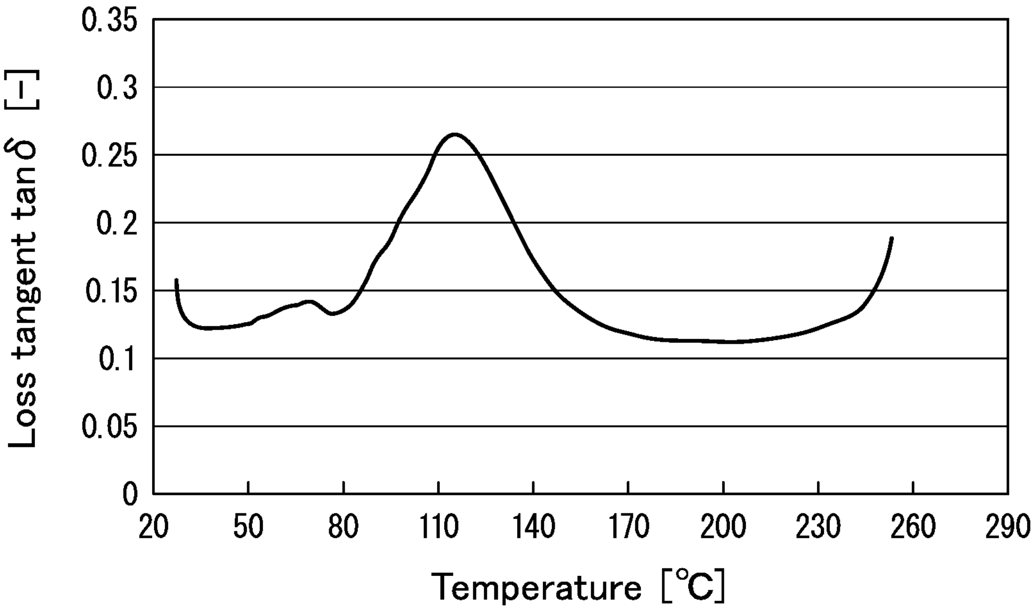
FIG. 18 is a graph showing measurement results for loss tangent tan δ in Comparative Example 1B.

FIG. 17 shows the measurement results of the loss tangent tan δ in Example 3B, and FIG. 18 shows the measurement results of the loss tangent tan δ in Comparative Example 1B.

Example 4B

A foam granule-molded product was produced in the same manner as in Example 1B, except that the same foam granules as in Example 3B were used, and the molding conditions were set as shown in the table.

Example 5B

Foam granules were produced in the same manner as in Example 1B, except that the polyester resin, polyimide resin, talc masterbatch, cross-linking agent, and blowing agent were blended as shown in the table. The foam granules thus produced were allowed to stand in a constant temperature bath at 150° C. for 1 hour to foam the foam granules and obtain pre-foamed granules. The physical properties of the obtained pre-foamed granules are shown in the table.

After having left at room temperature (23° C.) for one day, the pre-foamed granules were sealed in a pressure vessel. Then, after substituting the inside of the pressure vessel with nitrogen gas, further nitrogen gas was injected to an impregnation pressure (gauge pressure) of 0.5 MPa, and the pressure vessel was allowed to stand in an environment of 20° C. to perform pressure curing for 8 hours (internal pressure imparting step). Then, the pre-foamed granules were taken out from the pressure vessel.

When the pre-foamed granules subjected to the internal pressure imparting step were heated with steam of 0.30 MPa (gauge pressure) for 30 seconds for secondary foaming, the substantially the same secondary foamability as that of the foam granules obtained in Example 3b was confirmed.

A foam granule-molded product was produced in the same manner as in Example 1B, except that the pre-foamed granules subjected to the internal pressure imparting step were used, and the molding conditions were set as shown in the table.

Example 7B

A foam granule-molded product was produced in the same manner as in Example 1B, except that the same foam granules as in Example 6B were used, and the molding conditions were set as shown in the table.

Example 10B

The same foam granules as in Example 3B were remelted with a twin-screw extruder, and the resulting was extruded into a strand from a nozzle die, which was then cooled and pelletized to prepare recovered pellets. Foam granules and a foam granule-molded product were produced in the same manner as in Example 1B except that the formulation and molding conditions as shown in the table were followed.

Comparative Example 2B

A foam granule-molded product was produced in the same manner as in Example 1B, except that the same foam granules as in Comparative Example 1B were used, and the molding conditions were set as shown in the table.

Comparative Example 5B

A foam granule-molded product was produced in the same manner as in Example 1B, except that the same foam granules as in Comparative Example 4B were used, and the molding conditions were set as shown in the table.

TABLE 14

| | | | | Ex. 1 | Ex. 2 | Ex. 3 | Ex. 4 | Ex. 5 | Ex. 6 | Ex. 7 |
|---|---|---|---|---|---|---|---|---|---|---|
| Formulation | PET | (A) | Part by mass | — | — | — | — | — | — | — |
| | | (B) | Part by mass | 93.2 | 88.2 | 68.2 | 68.2 | 68.2 | 48.2 | 48.2 |
| | | (C) | Part by mass | — | — | — | — | — | — | — |
| | | (D) | Part by mass | — | — | — | — | — | — | — |
| | PEI | (A) | Part by mass | 5.0 | 10.0 | 30.0 | 30.0 | 30.0 | 50.0 | 50.0 |
| | | (B) | Part by mass | — | — | — | — | — | — | — |
| | PCT | (G) | Part by mass | — | — | — | — | — | — | — |
| | Recovered pellets | | Part by mass | — | — | — | — | — | — | — |
| | Talc MB | PET | Part by mass | 1.8 | 1.8 | 1.8 | 1.8 | 1.8 | 1.8 | 1.8 |
| | | Talc | Part by mass | 0.7 | 0.7 | 0.7 | 0.7 | 0.7 | 0.7 | 0.7 |
| | Cross-linking agent | PMDA | Part by mass | 0.24 | 0.30 | 0.40 | 0.40 | 0.40 | 0.40 | 0.40 |
| | Blowing agent | Butane | Part by mass | 1.1 | 1.1 | 1.1 | 1.1 | 0.3 | 1.6 | 1.6 |
| Properties of foam granules | Bulk density | | $kg/m^3$ | 0.14 | 0.14 | 0.14 | 0.14 | 0.14 | 0.18 | 0.18 |
| | Bulk expansion ratio | | Times | 9.6 | 9.6 | 9.5 | 9.5 | 9.5 | 7.3 | 7.3 |
| | Open cell ratio | | % | 4 | 4 | 5 | 5 | 5 | 11 | 11 |
| | Melting point | | ° C. | 243.6 | 243.4 | 242.7 | 242.7 | 243.1 | 241.0 | 241.0 |
| | Crystallization temperature | | ° C. | 152.6 | 154.1 | 168.4 | 168.4 | 164.5 | 169.9 | 169.9 |
| | Glass transition temperature | | ° C. | 83.5 | 87.3 | 93.9 | 93.9 | 94.0 | 118.9 | 118.9 |
| | Heat absorption (a) | | J/g | 32.8 | 29.0 | 22.8 | 22.8 | 23.0 | 11.6 | 11.6 |
| | Heat generation (b) | | J/g | 24.8 | 21.4 | 14.7 | 14.7 | 0.0 | 4.5 | 4.5 |
| | (a) − (b) | | J/g | 8.0 | 7.6 | 8.1 | 8.1 | 23.0 | 7.1 | 7.1 |
| | Crystallinity | | % | 5.7 | 5.4 | 5.8 | 5.8 | 16.4 | 5.0 | 5.0 |
| | Temperature at which loss tangent tan δ is maximized | | ° C. | 123.8 | 133.5 | 171.0 | 169.2 | 167.5 | 211.3 | 208.7 |

TABLE 15

| | | | | Ex. 8 | Ex. 9 | Ex. 10 | Ex. 11 | Ex. 12 | Ex. 13 |
|---|---|---|---|---|---|---|---|---|---|
| Formulation | PET | (A) | Part by mass | — | 68.2 | 68.2 | — | — | — |
| | | (B) | Part by mass | 38.2 | — | — | — | — | — |
| | | (C) | Part by mass | — | — | — | 68.2 | — | 68.2 |
| | | (D) | Part by mass | — | — | — | — | 68.2 | — |
| | PEI | (A) | Part by mass | 60.0 | 30.0 | 20.0 | 30.0 | 30.0 | — |
| | | (B) | Part by mass | — | — | — | — | — | 30.0 |
| | PCT | (G) | Part by mass | — | — | — | — | — | — |

TABLE 15-continued

| | | | | Ex. 8 | Ex. 9 | Ex. 10 | Ex. 11 | Ex. 12 | Ex. 13 |
|---|---|---|---|---|---|---|---|---|---|
| | Recovered pellets | | Part by mass | — | — | 10.0 | — | — | — |
| | Talc MB | PET | Part by mass | 1.8 | 1.8 | 1.8 | 1.8 | 1.8 | 1.8 |
| | | Talc | Part by mass | 0.7 | 0.7 | 0.7 | 0.7 | 0.7 | 0.7 |
| | Cross-linking agent | PMDA | Part by mass | 0.42 | 0.40 | 0.44 | 0.40 | 0.40 | 0.40 |
| | Blowing agent | Butane | Part by mass | 1.8 | 1.1 | 1.1 | 1.1 | 1.1 | 1.1 1 |
| Properties of foam granules | Bulk density | | $kg/m^3$ | 0.18 | 0.14 | 0.14 | 0.14 | 0.14 | 0.14 |
| | Bulk expansion ratio | | Times | 7.3 | 9.5 | 9.5 | 9.5 | 9.5 | 9.5 |
| | Open cell ratio | | % | 18 | 5 | 15 | 5 | 8 | 8 |
| | Melting point | | ° C. | 240.8 | 250.1 | 249.8 | 250.7 | 248.0 | 248.6 |
| | Crystallization temperature | | ° C. | 175.8 | 166.6 | 169.0 | 166.9 | 158.5 | 167.8 |
| | Glass transition temperature | | ° C. | 129.0 | 94.5 | 93.5 | 95.0 | 94.9 | 96.3 |
| | Heat absorption (a) | | J/g | 9.8 | 23.4 | 24.5 | 23.2 | 23.9 | 23.8 |
| | Heat generation (b) | | J/g | 4.4 | 15.3 | 16.9 | 15.2 | 16.0 | 16.7 |
| | (a) − (b) | | J/g | 5.4 | 8.1 | 7.6 | 8.0 | 7.9 | 7.1 |
| | Crystallinity | | % | 3.9 | 5.8 | 5.4 | 5.7 | 5.6 | 5.1 |
| | Temperature at which loss tangent tan δ is maximized | | ° C. | 230.8 | 211.0 | 209.5 | 210.2 | 210.9 | 211.6 |

TABLE 16

| | | | | Comp. Ex. 1 | Comp. Ex. 2 | Comp. Ex. 3 | Comp. Ex. 4 | Comp. Ex. 5 |
|---|---|---|---|---|---|---|---|---|
| Formulation | PET | (A) | Part by mass | — | — | — | — | — |
| | | (B) | Part by mass | 98.2 | 98.2 | 88.2 | 68.2 | 68.2 |
| | | (C) | Part by mass | — | — | — | — | — |
| | | (D) | Part by mass | — | — | — | — | — |
| | PEI | (A) | Part by mass | — | — | — | — | — |
| | | (B) | Part by mass | — | — | — | — | — |
| | PCT | (G) | Part by mass | — | — | 10.0 | 30.0 | 30.0 |
| | Recovered pellets | | Part by mass | — | — | — | — | — |
| | Talc MB | PET | Part by mass | 1.8 | 1.8 | 1.8 | 1.8 | 1.8 |
| | | Talc | Part by mass | 0.7 | 0.7 | 0.7 | 0.7 | 0.7 |
| | Cross-linking agent | PMDA | Part by mass | 0.22 | 0.22 | 0.24 | 0.24 | 0.24 |
| | Blowing agent | Butane | Part by mass | 1.1 | 1.1 | 1.1 | 1.1 | 1.1 |
| Properties of foam granules | Bulk density | | $kg/m^3$ | 0.14 | 0.14 | 0.14 | 0.14 | 0.14 |
| | Bulk expansion ratio | | Times | 9.5 | 9.5 | 9.5 | 9.3 | 9.3 |
| | Open cell ratio | | % | 4 | 4 | 8 | 25 | 25 |
| | Melting point | | ° C. | 244.5 | 244.5 | 244.2 | 244.0 | 244.0 |
| | Crystallization temperature | | ° C. | 135.1 | 135.1 | 133.1 | 134.5 | 134.5 |
| | Glass transition temperature | | ° C. | 78.5 | 78.5 | 79.2/105.7 | 78.9/106.5 | 78.9/106.5 |
| | Heat absorption (a) | | J/g | 29.8 | 29.8 | 27.6 | 24.8 | 24.8 |
| | Heat generation (b) | | J/g | 25.0 | 25.0 | 20.9 | 16.5 | 16.5 |
| | (a) − (b) | | J/g | 4.8 | 4.8 | 6.7 | 8.3 | 8.3 |
| | Crystallinity | | % | 3.4 | 3.4 | 4.8 | 5.9 | 5.9 |
| | Temperature at which loss tangent tan δ is maximized | | ° C. | 113.9 | 110.4 | 118.5 | 138.5 | 132.8 |

TABLE 17

| | | | | Ex. 1 | Ex. 2 | Ex. 3 | Ex. 4 | Ex. 5 | Ex. 6 | Ex. 7 |
|---|---|---|---|---|---|---|---|---|---|---|
| Molding conditions | One-heating direction | Steam pressure | MPa | 0.08 | 0.10 | 0.17 | 0.17 | 0.17 | 0.30 | 0.30 |
| | | Heating time | Sec | 30 | 30 | 30 | 30 | 30 | 10 | 10 |
| | Reverse one-direction heating | Steam pressure | MPa | 0.08 | 0.10 | 0.17 | 0.17 | 0.17 | 0.30 | 0.30 |
| | | Heating time | Sec | 30 | 30 | 30 | 30 | 30 | 10 | 10 |
| | Both-side heating | Steam pressure | MPa | 0.12 | 0.15 | 0.30 | 0.30 | 0.30 | 0.60 | 0.60 |
| | | Heating time | Sec | 30 | 30 | 30 | 30 | 30 | 60 | 60 |
| | Heat retention step | Done or not done | — | Done | Done | Done | Not done | Not done | Done | Not done |
| | | Heating time | Sec | 300 | 300 | 300 | 0 | 0 | 300 | 0 |
| | Molding cycle time | | Sec | 600 | 600 | 600 | 300 | 300 | 590 | 290 |

TABLE 17-continued

| | | | | Ex. 1 | Ex. 2 | Ex. 3 | Ex. 4 | Ex. 5 | Ex. 6 | Ex. 7 |
|---|---|---|---|---|---|---|---|---|---|---|
| Properties of foam granule-molded product | Density | | kg/m$^3$ | 0.14 | 0.14 | 0.14 | 0.14 | 0.14 | 0.18 | 0.18 |
| | Expansion ratio | | Times | 9.6 | 9.6 | 9.5 | 9.5 | 9.5 | 7.3 | 7.3 |
| | Melting point | | ° C. | 243.7 | 243.5 | 243.0 | 243.5 | 243.4 | 241.9 | 241.3 |
| | Crystallization temperature | | ° C. | 153.1 | 154.5 | 169.2 | 168.7 | 165.5 | 171.1 | 170.4 |
| | Glass transition temperature | | ° C. | 82.8 | 87.2 | 94.6 | 94.3 | 94.5 | 118.2 | 117.9 |
| | Heat absorption (a) | | J/g | 32.3 | 29.5 | 24.7 | 24.5 | 23.2 | 14.1 | 14.5 |
| | Heat generation (b) | | J/g | 0.0 | 0.0 | 0.0 | 9.0 | 0.0 | 0.0 | 4.0 |
| | (a) − (b) | | J/g | 32.3 | 29.5 | 24.7 | 15.5 | 23.2 | 14.1 | 10.5 |
| | Crystallinity | | % | 23.1 | 21.1 | 17.6 | 11.1 | 16.6 | 10.1 | 7.5 |
| | Temperature at which loss tangent tan δ is maximized | | ° C. | 123.8 | 133.5 | 171.0 | 169.2 | 167.5 | 211.3 | 208.7 |
| Evaluation of foam granule-molded product | Heat-dimensional change ratio | 120° C. | % | 0.4 | 0.5 | 0.6 | 1.1 | 0.5 | 0.3 | 0.5 |
| | | Evaluation | — | ⊚ | ⊚ | ⊚ | ○ | ⊚ | ⊚ | ⊚ |
| | Flexural modulus | 23° C. | MPa | 35.3 | 35.5 | 35.2 | 36.4 | 17.7 | 57.8 | 51.2 |
| | | 80° C. | MPa | 25.2 | 27.7 | 31.2 | 29.3 | 14.2 | 50.9 | 42.2 |
| | | Retention rate | % | 71.4 | 78.0 | 88.6 | 80.5 | 80.2 | 88.1 | 82.4 |
| | | Evaluation | — | Δ | ○ | ⊚ | ⊚ | ⊚ | ⊚ | ⊚ |
| | Appearance | Evaluation | — | ⊚ | ⊚ | ⊚ | ⊚ | Δ | ⊚ | ⊚ |
| | Comprehensive evaluation | | — | Δ | ○ | ⊚ | ○ | Δ | ⊚ | ⊚ |

TABLE 18

| | | | | Ex. 8 | Ex. 9 | Ex. 10 | Ex. 11 | Ex. 12 | Ex. 13 |
|---|---|---|---|---|---|---|---|---|---|
| Molding conditions | One-direction heating | Steam pressure | MPa | 0.33 | 0.17 | 0.17 | 0.17 | 0.17 | 0.17 |
| | | Heating time | Sec | 10 | 30 | 30 | 30 | 30 | 30 |
| | Reverse one-direction heating | Steam pressure | MPa | 0.33 | 0.17 | 0.17 | 0.17 | 0.17 | 0.17 |
| | | Heating time | Sec | 10 | 30 | 30 | 3 | 30 | 30 |
| | Both-side heating | Steam pressure | MPa | 0.65 | 0.30 | 0.30 | 0.30 | 0.30 | 0.30 |
| | | Heating time | Sec | 60 | 30 | 30 | 30 | 30 | 30 |
| | Heat retention step | Done or not done | — | Done | Done | Done | Done | Done | Done |
| | | Heating time | Sec | 300 | 300 | 300 | 300 | 300 | 300 |
| | Molding cycle time | | Sec | 590 | 600 | 600 | 600 | 600 | 600 |
| Properties of foam granule-molded product | Density | | kg/m$^3$ | 0.18 | 0.14 | 0.14 | 0.14 | 0.14 | 0.14 |
| | Expansion ratio | | Times | 7.3 | 9.5 | 9.5 | 9.5 | 9.5 | 9.5 |
| | Melting point | | C | 240.8 | 250.4 | 249.9 | 250.5 | 249.9 | 249.3 |
| | Crystallization temperature | | ° C. | 176.8 | 168.8 | 168.1 | 166.9 | 160.0 | 168.4 |
| | Glass transition temperature | | | 128.3 | 95.5 | 94.2 | 94.9 | 94.8 | 96.0 |
| | Heat absorption (a) | | J/g | 12.3 | 24.0 | 25.2 | 23.8 | 24.7 | 24.6 |
| | Heat generation (b) | | J/g | 0.0 | 0.0 | 0.0 | 0.0 | 0.0 | 0.0 |
| | (a) − (b) | | J/g | 12.3 | 24.0 | 25.2 | 23.8 | 24.7 | 24.6 |
| | Crystallinity | | % | 8.8 | 17.1 | 18.0 | 17.0 | 17.6 | 17.6 |
| | Temperature at which loss tangent tan δ is maximized | | ° C. | 230.8 | 211.0 | 209.5 | 210.2 | 210.9 | 211.6 |
| Evaluation of foam granule-molded product | Heat-dimensional change ratio | 120° C. | % | 0.3 | 0.7 | 0.6 | 0.6 | 0.6 | 0.7 |
| | | Evaluation | — | ⊚ | ⊚ | ⊚ | ⊚ | ⊚ | ⊚ |
| | Flexural modulus | 23° C. | MPa | 45.6 | 38.5 | 35.5 | 36.2 | 34.0 | 37.6 |
| | | 80° C. | MPa | 40.8 | 32.5 | 29.1 | 30.3 | 27.9 | 32.2 |
| | | Retention rate | % | 89.5 | 84.4 | 82.0 | 83.7 | 82.1 | 85.6 |
| | | Evaluation | — | ⊚ | ⊚ | ⊚ | ⊚ | ⊚ | ⊚ |
| | Appearance | Evaluation | — | ○ | ⊚ | ⊚ | ⊚ | ⊚ | ⊚ |
| | Comprehensive evaluation | | — | ○ | ⊚ | ⊚ | ⊚ | ⊚ | ⊚ |

TABLE 19

| | | | | Comp. Ex. 1 | Comp. Ex. 2 | Comp. Ex. 3 | Comp. Ex. 4 | Comp. Ex. 5 |
|---|---|---|---|---|---|---|---|---|
| Molding conditions | One-direction heating | Steam pressure | MPa | 0.05 | 0.05 | 0.05 | 0.10 | 0.10 |
| | | Heating time | Sec | 30 | 30 | 30 | 30 | 30 |
| | Reverse one-direction heating | Steam pressure | MPa | 0.05 | 0.05 | 0.05 | 0.10 | 0.10 |
| | | Heating time | Sec | 30 | 30 | 30 | 30 | 30 |
| | Both-side heating | Steam pressure | MPa | 0.10 | 0.10 | 0.10 | 0.20 | 0.20 |
| | | Heating time | Sec | 30 | 30 | 30 | 30 | 30 |
| | Heat retention step | Done or not done | — | Done | Not done | Done | Done | Not done |
| | | Heating time | Sec | 300 | 0 | 300 | 300 | 0 |
| | Molding cycle time | | Sec | 600 | 300 | 300 | 600 | 300 |
| Properties of foam granule-molded product | Density | | kg/m3 | 0.14 | 0.14 | 0.14 | 0.14 | 0.14 |
| | Expansion ratio | | Times | 9.5 | 9.5 | 9.5 | 9.3 | 9.3 |
| | Melting point | | ° C. | 244.0 | 244.8 | 244.8 | 244.5 | 244.4 |
| | Crystallization temperature | | ° C. | 136.1 | 135.3 | 136.4 | 134.1 | 133.3 |
| | Glass transition temperature | | ° C. | 78.3 | 78.4 | 78.8/107.1 | 78.4/106.9 | 78.5/107.0 |
| | Heat absorption (a) | | J/g | 35.0 | 34.8 | 29.2 | 25.5 | 25.0 |
| | Heat generation (b) | | J/g | 0.0 | 11.9 | 0.0 | 0.0 | 10.5 |
| | (a) − (b) | | J/g | 35.0 | 22.9 | 29.2 | 25.5 | 14.5 |
| | Crystallinity | | % | 25.0 | 16.3 | 20.8 | 18.2 | 10.3 |
| | Temperature at which loss tangent tan δ is maximized | | ° C. | 113.9 | 110.4 | 118.5 | 138.5 | 132.8 |
| Evaluation of foam granule-molded product | Heat-dimensional change ratio | 120° C. | % | 0.3 | 2.1 | 0.7 | 0.8 | 1.5 |
| | | Evaluation | — | ◎ | X | ◎ | ◎ | Δ |
| | Flexural modulus | 23° C. | MPa | 36.2 | 35.1 | 33.3 | 29.8 | 28.4 |
| | | 80° C. | MPa | 21.9 | 16.6 | 22.6 | 20.5 | 18.4 |
| | | Retention rate | % | 60.5 | 47.3 | 67.9 | 68.8 | 64.8 |
| | | Evaluation | — | X | X | X | X | X |
| | Appearance | Evaluation | — | ◎ | ◎ | ◎ | ◎ | ◎ |
| | Comprehensive evaluation | | — | X | X | X | X | X |

In Examples 1B to 13B to which the present invention was applied, the evaluation of heat resistance (flexural modulus) ranged from "Δ" to "◎", and the comprehensive evaluation ranged from "Δ" to "◎".

In Comparative Examples 1B to 2B containing no PEI and Comparative Examples 3B to 5B showing multiple glass transition temperatures, the evaluation of heat resistance (flexural modulus) was "x", and the comprehensive evaluation was "x".

The above results confirm that the heat resistance of the thermoplastic resin foam granule-molded product can be increased by applying the present invention.

Example 14B

<Production of Foamed Resin Composite>

A fiber-reinforced resin layer-forming material having a thickness of 0.22 mm (CFRP, "Pyrofil Prepreg TR3523 381GMX" manufactured by Mitsubishi Rayon Co., Ltd., basis weight: 200 g/$m^2$) was prepared, which is a product formed by incorporating 40% by mass of an uncured epoxy resin as a thermosetting resin into a fiber-reinforcing substrate formed from a twill fabric composed of carbon fibers. Two layers of the fiber-reinforced resin layer-forming material were placed on both sides of the foam granule-molded product obtained in Example 3 to form a laminate, and the fiber-reinforced resin layer-forming material was joined to the surfaces of the foam granule-molded product by an autoclave method. Specifically, a gauge pressure of 0.3 MPa was applied to apply a pressing force to the laminate, while heating the laminate at 130° C. over 60 minutes, to thereby cure the thermosetting resin in the fiber-reinforced resin layer-forming material, and bond the fiber-reinforced resin layer-forming material to both surfaces of the foam granule-molded product with the cured thermosetting resin.

The appearance of the obtained foamed resin composite was visually observed, and it was confirmed that the foamed resin composite had an excellent appearance without irregularities on the surface of the skin material.

<<Production of Foam Sheet>>

Example 1C

According to the formulation shown in Table 20, PET, PEI, talc MB and a cross-linking agent were mixed in a mixer to obtain a composition.

A circular die having an annular slit with a diameter of 93 mm and a slit width of 0.6 mm was set at the tip of a single screw extruder (opening diameter 65 mm, L/D=34), and a cooling mandrel (diameter 206 mm, length 310 mm) was placed in front of the circular die as viewed in the extrusion direction. A cooling water was circulated through the cooling mandrel. The extruder was set to a predetermined temperature and the composition was kneaded in the extruder into a molten mixture. A blowing agent (isobutane: n-butane=35:65 (mass ratio)) was injected from the middle of the extruder barrel and added to the resin molten mixture, and the resulting was further kneaded to obtain a thermoplastic resin composition.

The resin temperature during extrusion was set to 300° C., and the molten thermoplastic resin composition was extrusion-foamed through the die slit of a circular die at a discharge rate of 30 kg/h to form a cylindrical foam. The diameter of this cylindrical foam was expanded by the cooling mandrel, and was taken up by a take-up machine disposed further downstream of the cooling mandrel. The foam was cooled by placing the outer peripheral surface of the cooling mandrel along the inner peripheral surface of the foam, and the cylindrical foam was cut along the extrusion direction at a position downstream of the cooling mandrel. Then, the cylindrical foam was shaped into a flat strip and wound into a roll by a take-up machine. Table 20 shows the properties and evaluation results of the obtained foam sheet.

Examples 2C to 7C, 9C to 18C, Comparative Examples 1C to 4C

Foam sheets were produced in the same manner as in Example 1C, except that the resin temperature during extrusion and the take-up speed of the take-up machine were adjusted according to the formulations shown in Tables 20 to 26. Tables 20 to 26 show the properties and evaluation results of the obtained foam sheets.

Example 8C

Resin flakes obtained by pulverizing the foam sheet obtained in Example 7C were remelted with a twin-screw extruder, and the resulting was extruded into a strand from a nozzle die, which was then cooled and pelletized to prepare recovered pellets.

A foam sheet was produced in the same manner as in Example 1C, except that the formulation in Table 22 was followed. Table 22 shows the properties and evaluation results of the obtained foam sheet.

<<Production of Fiber-Reinforced Resin Composite>>

Using the foam sheet obtained in each example, a fiber-reinforced resin layers were laminated by the following method to produce a fiber-reinforced resin composite.

A stainless steel plate was prepared as the mold 508 shown in FIG. 20, and a release agent (trade name "Chemlease 2166" manufactured by Chemlease Japan K.K.) was applied to the upper surface of the stainless steel plate, which was then left for one day, to thereby implement a release treatment 581 on the upper surface of the stainless steel plate.

Two sheets of the fiber-reinforced resin layers (A) or the fiber-reinforced resin layers (B) described in Tables 20 to 26 were prepared, and placed on the release-treated surface of the stainless steel plate, with the two sheets placed one upon another so as to have the fibers in the two sheets oriented in the same direction. Then, the foam sheet obtained in each example was placed on the fiber-reinforced resin layer. Further, two sheets of the fiber-reinforced resin layers (A) or the fiber-reinforced resin layers (B) described in Tables 20 to 26 were prepared, and placed on the foam sheet, with the two sheets placed one upon another so as to have the fibers in the two sheets oriented in the same direction, thereby producing a laminate.

Thereafter, a release film having through holes (trade name "WL5200B-P" manufactured by AIRTECH) and a breather cloth (trade name "AIRWEAVEN 4" manufactured by AIRTECH) were sequentially laminated on the fiber-reinforced resin layer on the upper side of the laminate so as to cover the entire fiber-reinforced resin layer. The breather cloth also covered both side surfaces of the laminate (left and right side surfaces in FIG. 20). The release film was formed from a tetrafluoroethylene-ethylene copolymer film, and had a large number of through-holes penetrating the film from one surface to the other, through which the thermosetting resin in the fiber-reinforced resin layer could pass. The breather cloth was formed from a nonwoven fabric composed of polyester resin fibers and was configured to be capable of being impregnated with a thermosetting resin.

A bagging film (product name "WL7400" manufactured by AIRTECH) was placed on the laminate, and a sealant tape (product name "GS43MR" manufactured by AIRTECH) was used as a sealing material to airtightly join the outer peripheral edge of the bagging film to the opposite part of stainless steel plate, thereby sealing the laminate with the bagging film. The bagging film was composed of a nylon film. A vacuum valve (trade name "VACVALVE402A" manufactured by AIRTECH) was installed on part of the bagging film, thereby producing a laminated structure.

Next, the laminated structure was put into an autoclave for heat curing test (trade name "DL-2010" manufactured by Hanyuda Iron Works Co., Ltd.), the vacuum valve of the laminated structure was connected to a vacuum line, and the space sealed with the bagging film was evacuated from the laminate toward the breather cloth covering the side surfaces of the laminate to reduce the pressure to a vacuum degree of 0.10 MPa. The pressure reduction of the space was continued after that point.

Then, the inside of the autoclave was pressurized to a gauge pressure of 0.1 MPa, and heated at a heating rate of 4° C./min to 90° C. to heat the laminate. The heating of the inside of the autoclave at 90° C. was carried out over 20 minutes. By the pressurization and heating as described above, the thermosetting resin in the fiber-reinforced resin layer was softened to allow the fiber-reinforced resin layer to deform to match the surface of the thermoplastic polyester resin foam layer, and the air trapped in the fiber-reinforced resin layer was sucked away.

Then, the inside of the autoclave was pressurized to a gauge pressure of 0.3 MPa to apply a pressing force to the laminate, and the inside of the autoclave was heated to 130° C. at a heating rate of 4° C./min to heat the laminate. The interior of the autoclave was heated at 130° C. over 60 minutes to cure the thermosetting resin in the fiber-reinforced resin layers, and the fiber-reinforced resin layers were allowed to be integrally laminated on both sides of the foam sheet to form a fiber-reinforced resin composite. By pressurization of the laminate, excess thermosetting resin in the fiber-reinforced resin layers was absorbed by the breather cloth through the through-holes and outside of the release film.

When the inside of the autoclave was cooled down to 60° C., the pressurization inside the autoclave was discontinued and the pressure therein was returned to the atmospheric pressure. Then, the fiber-reinforced resin composite was taken out. For this fiber-reinforced resin composite, the appearance evaluation described above was performed, and the physical properties of the foam sheet after composite formation were also evaluated. The results are shown in Tables 20 to 26.

TABLE 20

| | | | | Example 1 | Example 2 | Example 3 |
|---|---|---|---|---|---|---|
| Composition of foam sheet | PET | (A) | Part by mass | 93.2 | 88.2 | 68.2 |
| | | (B) | Part by mass | — | — | — |
| | | (C) | Part by mass | — | — | — |
| | | (D) | Part by mass | — | — | — |
| | PEI | (A) | Part by mass | 5.0 | 10.0 | 30.0 |
| | | (B) | Part by mass | — | — | — |
| | | (C) | Part by mass | — | — | — |
| | PCT | (G) | Part by mass | — | — | — |
| | Recovered pellets | | Part by mass | — | — | — |
| | Talc MB | PET | Part by mass | 1.8 | 1.8 | 1.8 |
| | | Talc | Part by mass | 0.7 | 0.7 | 0.7 |
| | Cross-linking agent | | Part by mass | 0.25 | 0.28 | 0.30 |
| | Blowing agent | | Part by mass | 0.7 | 0.7 | 0.7 |
| Properties of foam sheet before composite formation | Thickness | | mm | 1.2 | 1.2 | 1.2 |
| | Basis weight | | $g/m^2$ | 330 | 330 | 330 |
| | Apparent density | | $g/cm^3$ | 0.28 | 0.28 | 0.28 |
| | Expansion ratio | | Times | 4.9 | 4.9 | 4.8 |
| | Open cell ratio | | % | 1 | 11 | 11 |
| | Melting point | | ° C. | 250.5 | 251.3 | 250.1 |
| | Crystallization temperature | | ° C. | 152.7 | 154.1 | 164.8 |
| | Glass transition temperature | | ° C. | 83.3 | 87.4 | 95.3 |
| | Heat absorption (a) | | J/g | 31.7 | 30.0 | 24.3 |
| | Heat generation (b) | | J/g | 22.9 | 22.4 | 14.8 |
| | (a) - (b) | | J/g | 8.7 | 7.7 | 9.5 |
| | Crystallinity | | % | 6.2 | 5.5 | 6.8 |
| | Slope r | | Pa/° C. | −0.085 | −0.080 | −0.066 |
| Configuration of fiber-reinforced resin | Laminate configuration/ Thickness [mm] | | 1 | (A)/0.25 | (A)/0.25 | (A)/0.25 |
| | | | 2 | (A)/0.25 | (A)/0.25 | (A)/0.25 |
| | | | 3 | The above foam sheet/1.2 | The above foam sheet/1.2 | The above foam sheet/1.2 |
| | | | 4 | (A)/0.25 | (A)/0.25 | (A)/0.25 |
| | | | 5 | (A)/0.25 | (A)/0.25 | (A)/0.25 |
| Properties of foam sheet after composite formation | Melting point | | ° C. | 250.0 | 250.2 | 249.8 |
| | Crystallization temperature | | ° C. | 152.5 | 153.7 | 164.4 |
| | Glass transition temperature | | ° C. | 83.5 | 88.1 | 95.5 |
| | Heat absorption (a) | | J/g | 31.5 | 29.8 | 24.2 |
| | Heat generation (b) | | J/g | 8.2 | 10.1 | 12.8 |
| | (a) − (b) | | J/g | 23.3 | 19.7 | 11.4 |
| | Crystallinity | | % | 16.6 | 14.1 | 8.1 |
| | Slope r | | Pa/° C. | −0.042 | −0.051 | −0.059 |
| Evaluation of fiber-reinforced resin composite | High temperature flexural test | Elastic modulus change ratio 23° C. | % | 100 | 100 | 100 |
| | | 80° C. | % | 78 | 82 | 91 |
| | | 100° C. | % | 40 | 45 | 65 |
| | | 120° C. | % | 23 | 25 | 25 |
| | | Evaluation | | Δ | Δ | ○ |
| | Appearance | Evaluation | | ○ | ○ | ○ |
| | Comprehensive evaluation | | | Δ | Δ | ○ |

TABLE 21

| | | | | Example 4 | Example 5 | Example 6 |
|---|---|---|---|---|---|---|
| Composition of foam sheet | PET | (A) | Part by mass | 68.2 | — | — |
| | | (B) | Part by mass | — | 68.2 | 58.2 |
| | | (C) | Part by mass | — | — | — |
| | | (D) | Part by mass | — | — | — |
| | PEI | (A) | Part by mass | 30.0 | 30.0 | 40.0 |
| | | (B) | Part by mass | — | — | — |
| | | (C) | Part by mass | — | — | — |
| | PCT | (G) | Part by mass | — | — | — |
| | Recovered pellets | | Part by mass | — | — | — |
| | Talc MB | PET | Part by mass | 1.8 | 1.8 | 1.8 |
| | | Talc | Part by mass | 0.7 | 0.7 | 0.7 |
| | Cross-linking agent | | Part by mass | 0.30 | 0.35 | 0.35 |
| | Blowing agent | | Part by mass | 0.7 | 0.7 | 0.7 |
| Properties of foam sheet before composite formation | Thickness | | mm | 1.2 | 1.2 | 1.2 |
| | Basis weight | | $g/m^2$ | 330 | 330 | 330 |
| | Apparent density | | $g/cm^3$ | 0.28 | 0.28 | 0.28 |
| | Expansion ratio | | Times | 4.8 | 4.8 | 4.7 |
| | Open cell ratio | | % | 11 | | 19 |
| | Melting point | | ° C. | 250.1 | 242.7 | 242.0 |
| | Crystallization temperature | | ° C. | 164.8 | 168.5 | 173.1 |
| | Glass transition temperature | | ° C. | 95.3 | 96.2 | 98.3 |

TABLE 21-continued

| | | | | | Example 4 | Example 5 | Example 6 |
|---|---|---|---|---|---|---|---|
| | Heat absorption (a) | | | J/g | 24.3 | 18.7 | 15.4 |
| | Heat generation (b) | | | J/g | 14.8 | 10.1 | 8.1 |
| | (a) − (b) | | | J/g | 9.5 | 8.6 | 7.3 |
| | Crystallinity | | | % | 6.8 | 6.1 | 5.2 |
| | Slope r | | | Pa/° C. | −0.066 | −0.069 | −0.075 |
| Configuration of fiber-reinforced resin | Laminate configuration/ Thickness [mm] | | | 1 | (B)/0.19 | (A)/0.25 | (A)/0.25 |
| | | | | 2 | (B)/0.19 | (A)/0.25 | (A)/0.25 |
| | | | | 3 | The above foam sheet/1.2 | foam sheet/1.2 The above | The above foam sheet/1.2 |
| | | | | 4 | (B)/0.19 | (A)/0.25 | (A)/0.25 |
| | | | | 5 | (B)/0.19 | (A)/0.25 | (A)/0.25 |
| Properties of foam sheet before composite formation | Melting point | | | ° C. | 249.4 | 245.3 | 242.1 |
| | Crystallization temperature | | | | 163.6 | 168.3 | 173.8 |
| | Glass transition temperature | | | ° C. | 95.1 | 95.9 | 98.0 |
| | Heat absorption (a) | | | J/g | 24.0 | 19.0 | 16.2 |
| | Heat generation (b) | | | J/g | 13.1 | 8.0 | 7.6 |
| | (a) − (b) | | | J/g | 10.9 | 11.0 | 8.6 |
| | Crystallinity | | | % | 7.8 | 7.9 | 6.1 |
| | Slope r | | | Pa/° C. | −0.058 | −0.061 | −0.071 |
| Evaluation of fiber-reinforced resin composite | High temperature flexural test | Elastic modulus change ratio | 23° C. | % | 100 | 100 | 100 |
| | | | 80° C. | % | 90 | 91 | 9 |
| | | | 100° C. | % | 62 | 67 | 67 |
| | | | 120° C. | % | 22 | 30 | 30 |
| | | | Evaluation | | ○ | ○ | ○ |
| | Appearance | | Evaluation | | ○ | ○ | ○ |
| | Comprehensive evaluation | | | | ○ | ○ | ○ |

TABLE 22

| | | | | Example 7 | Example 8 | Example 9 |
|---|---|---|---|---|---|---|
| Composition of foam sheet | PET | (A) | Part by mass | — | — | — |
| | | (B) | Part by mass | — | — | — |
| | | (C) | Part by mass | 78.2 | 68.2 | — |
| | | (D) | Part by mass | — | — | 68.2 |
| | PEI | (A) | Part by mass | 20.0 | 20.0 | 30.0 |
| | | (B) | Part by mass | — | — | — |
| | | (C) | Part by mass | — | — | — |
| | PCT | (G) | Part by mass | — | — | — |
| | Recovered pellets | | Part by mass | — | 10.0 | — |
| | Talc MB | PET | Part by mass | 1.8 | 1.8 | 1.8 |
| | | Talc | Part by mass | 0.7 | 0.7 | 0.7 |
| | Cross-linking agent | | Part by mass | 0.28 | 0.38 | 0.35 |
| | Blowing agent | | Part by mass | 0.7 | 0.7 | 0.7 |
| Properties of foam sheet before composite formation | Thickness | | mm | 1.2 | 1.2 | 1.2 |
| | Basis weight | | $g/m^2$ | 330 | 330 | 330 |
| | Apparent density | | $g/cm^3$ | 0.28 | 0.28 | 0.28 |
| | Expansion ratio | | Times | 4.9 | 4.8 | 4.8 |
| | Open cell ratio | | % | 9 | 17 | 13 |
| | Melting point | | ° C. | 250.0 | 247.1 | 247.9 |
| | Crystallization temperature | | ° C. | 158.9 | 159.6 | 150.1 |
| | Glass transition temperature | | ° C. | 91.5 | 92.5 | 94.9 |
| | Heat absorption (a) | | J/g | 23.8 | 21.9 | 26.3 |
| | Heat generation (b) | | J/g | 16.4 | 15.1 | 17.9 |
| | (a) − (b) | | J/g | 7.4 | 6.8 | 8.4 |
| | Crystallinity | | % | 5.3 | 4.9 | 6.0 |
| | Slope r | | Pa/° C. | −0.072 | −0.077 | −0.066 |
| Configuration of fiber-reinforced resin composite | Laminate configuration/ Thickness [mm] | | 1 | (A)/0.25 | (A)/0.25 | (A)/0.25 |
| | | | 2 | (A)/0.25 | (A)/0.25 | (A)/0.25 |
| | | | 3 | The above foam sheet/1.2 | The above foam sheet/1.2 | The above foam sheet/1.2 |
| | | | 4 | (A)/0.25 | (A)/0.25 | (A)/0.25 |
| | | | 5 | (A)/0.25 | (A)/0.25 | (A)/0.25 |
| Properties of foam sheet after composite formation | Melting point | | ° C. | 250.3 | 248.1 | 248.2 |
| | Crystallization temperature | | ° C. | 157.8 | 159.3 | 150.0 |
| | Glass transition temperature | | ° C. | 91.7 | 92.3 | 94.7 |
| | Heat absorption (a) | | J/g | 24.5 | 21.6 | 25.9 |
| | Heat generation (b) | | J/g | 8.0 | 9.1 | 15.9 |
| | (a) − (b) | | J/g | 16.5 | 12.5 | 10.0 |
| | Crystallinity | | % | 11.8 | 8.9 | 7.1 |
| | Slope r | | Pa/° C. | −0.065 | −0.072 | −0.060 |

TABLE 22-continued

| | | | | | Example 7 | Example 8 | Example 9 |
|---|---|---|---|---|---|---|---|
| Evaluation of fiber-reinforced resin composite | High temperature flexural test | Elastic modulus change ratio | 23° C. | % | 100 | 100 | 100 |
| | | | 80° C. | % | 93 | 90 | 91 |
| | | | 100° C. | % | 72 | 62 | 64 |
| | | | 120° C. | % | 35 | 20 | 23 |
| | | | Evaluation | | ○ | ○ | ○ |
| | Appearance | | Evaluation | | ○ | ○ | ○ |
| | Comprehensive evaluation | | | | ○ | ○ | ○ |

TABLE 23

| | | | | Example 10 | Example 11 | Example 12 |
|---|---|---|---|---|---|---|
| Composition of foam sheet | PET | (A) | Part by mass | — | — | — |
| | | (B) | Part by mass | — | — | — |
| | | (C) | Part by mass | 68.2 | 68.2 | 70.0 |
| | | (D) | Part by mass | — | — | — |
| | PEI | (A) | Part by mass | 30.0 | 30.0 | 30.0 |
| | | (B) | Part by mass | — | — | — |
| | | (C) | Part by mass | — | — | — |
| | PCT | (G) | Part by mass | — | — | — |
| | Recovered pellets | | Part by mass | — | — | — |
| | Talc MB | PET | Part by mass | 1.8 | 1.8 | — |
| | | Talc | Part by mass | 0.7 | 0.7 | — |
| | Cross-linking agent | | Part by mass | 0.30 | 0.30 | 0.35 |
| | Blowing agent | | Part by mass | 0.7 | 0.8 | 0.9 |
| Properties of foam sheet before composite formation | Thickness | | mm | 1.2 | 1.3 | 1.3 |
| | Basis weight | | $g/m^2$ | 330 | 270 | 240 |
| | Apparent density | | $g/cm^3$ | 0.28 | 0.21 | 0.18 |
| | Expansion ratio | | Times | 4.8 | 6.4 | 7.2 |
| | Open cell ratio | | % | 11 | 11 | 8 |
| | Melting point | | ° C. | 247.9 | 248.2 | 248.5 |
| | Crystallization temperature | | ° C. | 161.7 | 161.7 | 178.9 |
| | Glass transition temperature | | ° C. | 94.3 | 93.6 | 93.9 |
| | Heat absorption (a) | | J/g | 23.6 | 23.8 | 22.0 |
| | Heat generation (b) | | J/g | 14.8 | 16.6 | 16.7 |
| | (a) − (b) | | J/g | 8.8 | 7.1 | 5.4 |
| | Crystallinity | | % | 6.3 | 5.1 | 3.8 |
| | Slope r | | Pa/° C. | −0.076 | −0.069 | −0.065 |
| Configuration of fiber-reinforced resin composite | Laminate configuration/ Thickness [mm] | | 1 | (A)/0.25 | (A)/0.25 | (A)/0.25 |
| | | | 2 | (A)/0.25 | (A)/0.25 | (A)/0.25 |
| | | | 3 | The above foam sheet/1.2 | The above foam sheet/1.3 | The above foam sheet/1.3 |
| | | | 4 | (A)/0.25 | (A)/0.25 | (A)/0.25 |
| | | | 5 | (A)/0.25 | (A)/0.25 | (A)/0.25 |
| Properties of foam sheet after composite formation | Melting point | | ° C. | 250.1 | 249.5 | 248.8 |
| | Crystallization temperature | | ° C. | 163.4 | 162.5 | 179.4 |
| | Glass transition temperature | | ° C. | 95.2 | 94.0 | 93.8 |
| | Heat absorption (a) | | J/g | 22.3 | 23.4 | 22.5 |
| | Heat generation (b) | | J/g | 12.1 | 13.2 | 13.1 |
| | (a) − (b) | | J/g | 10.2 | 10.2 | 9.4 |
| | Crystallinity | | % | 7.3 | 7.3 | 6.7 |
| | Slope r | | Pa/° C. | −0.058 | −0.053 | −0.058 |
| Evaluation of fiber-reinforced resin composite | High temperature flexural test | Elastic modulus change ratio 23° C. | % | 100 | 100 | 100 |
| | | 80° C. | % | 91 | 90 | 90 |
| | | 100° C. | % | 62 | 63 | 63 |
| | | 120° C. | % | 23 | 22 | 21 |
| | | Evaluation | | ○ | ○ | ○ |
| | Appearance | Evaluation | | ○ | ○ | ○ |
| | Comprehensive evaluation | | | ○ | ○ | ○ |

TABLE 24

| | | | | Example 13 | Example 14 | Example 15 |
|---|---|---|---|---|---|---|
| Composition of foam sheet | PET | (A) | Part by mass | — | — | — |
| | | (B) | Part by mass | — | — | — |
| | | (C) | Part by mass | 68.2 | 68.2 | 68.2 |
| | | (D) | Part by mass | — | — | — |
| | PEI | (A) | Part by mass | — | — | — |
| | | (B) | Part by mass | 30.0 | 30.0 | — |
| | | (C) | Part by mass | — | — | 30.0 |

TABLE 24-continued

| | | | | Example 13 | Example 14 | Example 15 |
|---|---|---|---|---|---|---|
| | PCT | (G) | Part by mass | — | — | — |
| | Recovered pellets | | Part by mass | — | — | — |
| | Talc MB | PET | Part by mass | 1.8 | 1.8 | 1.8 |
| | | Talc | Part by mass | 0.7 | 0.7 | 0.7 |
| | Cross-linking agent | | Part by mass | 0.30 | 0.40 | 0.30 |
| | Blowing agent | | Part by mass | 0.7 | 0.8 | 0.7 |
| Properties of foam sheet before composite formation | Thickness | | mm | 1.3 | 1.2 | 1.2 |
| | Basis weight | | g/m$^2$ | 340 | 280 | 330 |
| | Apparent density | | g/cm$^3$ | 0.26 | 0.23 | 0.28 |
| | Expansion ratio | | Times | 5.1 | 5.7 | 4.8 |
| | Open cell ratio | | % | 11 | 12 | 10 |
| | Melting point | | ° C. | 248.0 | 247.6 | 249.3 |
| | Crystallization temperature | | ° C. | 168.9 | 167.9 | 163.0 |
| | Glass transition temperature | | ° C. | 98.3 | 97.3 | 95.2 |
| | Heat absorption (a) | | J/g | 22.4 | 23.8 | 22.9 |
| | Heat generation (b) | | J/g | 15.8 | 14.4 | 13.9 |
| | (a) − (b) | | J/g | 6.6 | 9.4 | 9.0 |
| | Crystallinity | | % | 4.7 | 6.7 | 6.4 |
| | Slope r | | Pa/° C. | −0.066 | −0.065 | −0.063 |
| Configuration of fiber-reinforced resin | Laminate configuration/ Thickness[mm] | | 1 | (A)/0.25 | (A)/0.25 | (A)/0.25 |
| | | | 2 | (A)/0.25 | (A)/0.25 | (A)/0.25 |
| | | | 3 | The above foam sheet/1.3 | The above foam sheet/1.2 | The above foam sheet/1.2 |
| | | | 4 | (A)/0.25 | (A)/0.25 | (A)/0.25 |
| | | | 5 | (A)/0.25 | (A)/0.25 | (A)/0.25 |
| Properties of foam sheet after composite formation | Melting point | | ° C. | 248.2 | 247.8 | 249.0 |
| | Crystallization temperature | | ° C. | 169.1 | 167.9 | 163.3 |
| | Glass transition temperature | | ° C. | 98.4 | 96.8 | 95.4 |
| | Heat absorption (a) | | J/g | 22.8 | 24.0 | 23.1 |
| | Heat generation (b) | | J/g | 12.7 | 13.3 | 10.5 |
| | (a) − (b) | | J/g | 10.1 | 10.7 | 12.6 |
| | Crystallinity | | % | 7.2 | 7.6 | 9.0 |
| | Slope r | | Pa/° C. | −0.054 | −0.055 | −0.052 |
| Evaluation of fiber-reinforced resin composite | High temperature flexural test | Elastic modulus change ratio 23° C. | % | 100 | 100 | 100 |
| | | 80° C. | % | 92 | 92 | 91 |
| | | 100° C. | % | 70 | 68 | 63 |
| | | 120° C. | % | 32 | 30 | 23 |
| | | Evaluation | | ○ | ○ | ○ |
| | Appearance | Evaluation | | ○ | ○ | ○ |
| | Comprehensive evaluation | | | ○ | ○ | ○ |

TABLE 25

| | | | | Ex. 16 | Ex. 17 | Ex. 18 |
|---|---|---|---|---|---|---|
| Composition of foam sheet | PET | (A) | Part by mass | — | — | — |
| | | (B) | Part by mass | 48.2 | 38.2 | — |
| | | (C) | Part by mass | — | — | 68.2 |
| | | (D) | Part by mass | — | — | — |
| | PEI | (A) | Part by mass | 50.0 | 60.0 | 30.0 |
| | | (B) | Part by mass | — | — | — |
| | | (C) | Part by mass | — | — | — |
| | PCT | (G) | Part by mass | — | — | — |
| | Recovered pellets | | Part by mass | — | — | — |
| | Talc MB | PET | Part by mass | 1.8 | 1.8 | 1.8 |
| | | Talc | Part by mass | 0.7 | 0.7 | 0.7 |
| | Cross-linking agent | | Part by mass | 0.38 | 0.40 | 0.30 |
| | Blowing agent | | Part by mass | 0.7 | 0.7 | 0.8 |
| Properties of foam sheet before composite formation | Thickness | | mm | 1.0 | 0.8 | 1.3 |
| | Basis weight | | g/m$^2$ | 330 | 330 | 270 |
| | Apparent density | | g/cm$^3$ | 0.33 | 0.41 | 0.21 |
| | Expansion ratio | | Times | 4.0 | 3.5 | 6.4 |
| | Open cell ratio | | % | 23 | 29 | 12 |
| | Melting point | | ° C. | 241.9 | 241.7 | 250.0 |
| | Crystallization temperature | | ° C. | 195.3 | 210.9 | 163.8 |
| | Glass transition temperature | | ° C. | 120.5 | 132.9 | 95.9 |
| | Heat absorption (a) | | J/g | 12.5 | 10.0 | 24.1 |
| | Heat generation (b) | | J/g | 7.8 | 6.9 | 20.5 |
| | (a) − (b) | | J/g | 4.7 | 3.1 | 3.6 |
| | Crystallinity | | % | 3.4 | 2.2 | 2.5 |
| | Slope r | | Pa/° C. | −0.038 | −0.029 | −0.158 |

TABLE 25-continued

| | | | Ex. 16 | Ex. 17 | Ex. 18 |
|---|---|---|---|---|---|
| Configuration of fiber-reinforced resin composite | Laminate configuration/Thickness [mm] | 1 | (A)/0.25 | (A)/0.25 | (A)/0.25 |
| | | 2 | (A)/0.25 | (A)/0.25 | (A)/0.25 |
| | | 3 | The above foam sheet/1.0 | The above foam sheet/0.8 | The above foam sheet/1.3 |
| | | 4 | (A)/0.25 | (A)/0.25 | (A)/0.25 |
| | | 5 | (A)/0.25 | (A)/0.25 | (A)/0.25 |
| Properties of foam sheet after composite formation | Melting point | ° C. | 241.2 | 241.3 | 249.9 |
| | Crystallization temperature | ° C. | 195.1 | 209.6 | 163.5 |
| | Glass transition temperature | ° C. | 120.1 | 132.4 | 95.2 |
| | Heat absorption (a) | J/g | 12.0 | 9.8 | 23.7 |
| | Heat generation (b) | J/g | 5.8 | 6.2 | 12.1 |
| | (a) − (b) | J/g | 6.2 | 3.6 | 11.6 |
| | Crystallinity | % | 4.4 | 2.6 | 8.3 |
| | Slope r | Pa/° C. | −0.035 | −0.027 | −0.090 |
| Evaluation of fiber-reinforced resin composite | High temperature flexural test Elastic modulus change ratio 23° C. | % | 100 | 100 | 100 |
| | 80° C. | % | 96 | 97 | 91 |
| | 100° C. | % | 78 | 82 | 65 |
| | 120° C. | % | 41 | 50 | 26 |
| | Evaluation | | ○ | ○ | ○ |
| | Appearance Evaluation | | Δ | Δ | ○ |
| | Comprehensive evaluation | | Δ | Δ | ○ |

TABLE 26

| | | | | Comp.Ex. 1 | Comp.Ex. 2 | Comp.Ex. 3 | Comp.Ex. 4 |
|---|---|---|---|---|---|---|---|
| Composition of foam sheet | PET | (A) | Part by mass | 98.2 | — | 88.2 | 68.2 |
| | | B | Part by mass | — | — | — | — |
| | | (C) | Part by mass | — | 98.2 | — | — |
| | | (D) | Part by mass | — | — | — | — |
| | PEI | (A) | Part by mass | — | — | — | — |
| | | (B) | Part by mass | — | — | — | — |
| | | (C) | Part by mass | — | — | — | — |
| | PCT | (G) | Part by mass | — | — | 10.0 | 30.0 |
| | Recovered pellets | | Part by mass | — | — | — | — |
| | Talc MB | PET | Part by mass | 1.8 | 1.8 | 1.8 | 1.8 |
| | | Talc | Part by mass | 0.7 | 0.7 | 0.7 | 0.7 |
| | Cross-linking agent | | Part by mass | 0.25 | 0.25 | 0.25 | 0.25 |
| | Blowing agent | | Part by mass | 0.7 | 0.7 | 0.6 | 0.6 |
| Properties of foam sheet before composite formation | Thickness | | mm | 1.1 | 1.2 | 1.0 | 0.7 |
| | Basis weight | | $g/m^2$ | 330 | 330 | 330 | 330 |
| | Apparent density | | $g/cm^3$ | 0.30 | 0.28 | 0.33 | 0.47 |
| | Expansion ratio | | Times | 4.5 | 4.8 | 4.0 | 3.9 |
| | Open cell ratio | | % | 10 | 11 | 7 | 60 |
| | Melting point | | ° C. | 250.0 | 249.9 | 249.3 | 249.2 |
| | Crystallization temperature | | ° C. | 133.3 | 134.2 | 132.8 | 133.9 |
| | Glass transition temperature | | ° C. | 78.9 | 78.6 | 79.2/105.2 | 78.9/104.0 |
| | Heat absorption (a) | | J/g | 33.9 | 33.4 | 24.8 | 29.3 |
| | Heat generation (b) | | J/g | 25.4 | 24.6 | 16.5 | 22.7 |
| | (a) − (b) | | J/g | 8.6 | 8.8 | 8.3 | 6.6 |
| | Crystallinity | | % | 6.1 | 6.3 | 5.9 | 4.7 |
| | Slope r | | Pa/° C. | −0.106 | −0.099 | −0.102 | −0.140 |
| Configuration of fiber-reinforced resin composite | Laminate configuration/Thickness [mm] | | 1 | (A)/0.25 | (A)/0.25 | (A)/0.25 | (A)/0.25 |
| | | | 2 | (A)/0.25 | (A)/0.25 | (A)/0.25 | (A)/0.25 |
| | | | 3 | The above foam sheet/1.1 | The above foam sheet/1.2 | The above foam sheet/1.0 | The above foam sheet/0.7 |
| | | | 4 | (A)/0.25 | (A)/0.25 | (A)/0.25 | (A)/0.25 |
| | | | 5 | (A)/0.25 | (A)/0.25 | (A)/0.25 | (A)/0.25 |
| Properties of foam sheet after composite formation | Melting point | | ° C. | 250.4 | 250.5 | 249.1 | 249.7 |
| | Crystallization temperature | | ° C. | 133.1 | 133.7 | 133.2 | 133.7 |
| | Glass transition temperature | | ° C. | 79.2 | 78.4 | 79.0/104.8 | 78.5/104.2 |
| | Heat absorption (a) | | J/g | 33.2 | 33.1 | 23.8 | 28.5 |
| | Heat generation (b) | | J/g | 0.0 | 0.0 | 4.6 | 11.5 |
| | (a) − (b) | | J/g | 33.2 | 33.1 | 19.2 | 17.0 |
| | Crystallinity | | % | 23.7 | 23.6 | 13.7 | 12.1 |
| | Slope r | | Pa/° C. | −0.092 | −0.087 | −0.093 | −0.110 |
| | High Elastic | 23° C. | % | 100 | 100 | 100 | 100 |

TABLE 26-continued

| | | | | Comp.Ex. 1 | Comp.Ex. 2 | Comp.Ex. 3 | Comp.Ex. 4 |
|---|---|---|---|---|---|---|---|
| Evaluation of fiber-reinforced resin composite | temperature flexural test | modulus change ratio | 80° C. % | 75 | 74 | 80 | 80 |
| | | | 100° C. % | 35 | 33 | 39 | 39 |
| | | | 120° C. % | 26 | 25 | 26 | 25 |
| | | | Evaluation | X | X | X | X |
| | Appearance | | Evaluation | ○ | ○ | ○ | ○ |
| | Comprehensive evaluation | | | X | X | X | X |

As shown in Tables 20 to 26, the comprehensive evaluation results in Examples 1C to 18C to which the present invention was applied ranged from "○" to "Δ".

On the other hand, in Comparative Examples 1C and 2C with the foam sheets containing no polyimide resin, and Comparative Examples 3C and 4C showing multiple glass transition temperatures, the comprehensive evaluation results were "x".

The above results confirm that the heat resistance of the fiber-reinforced resin composite can be increased by applying the present invention.

DESCRIPTION OF THE REFERENCE SIGNS

- 2 Foam (foam sheet)
- 22 Foam layer
- 100 Container
- 400 Foamed resin composite
- 402 Foam granule-molded product
- 404 Fiber-reinforced resin layer
- 502 Fiber-reinforced resin composite
- 505 Foam layer (foam sheet)
- 507 Fiber-reinforced resin layer

The invention claimed is:

1. A thermoplastic resin foam comprising a thermoplastic resin, wherein:

the thermoplastic resin comprises a polyester resin and a polyimide resin, the thermoplastic resin foam shows a single glass transition temperature Tg, and the glass transition temperature Tg is 80 to 130° C.

2. The thermoplastic resin foam according to claim 1, wherein an absolute value of difference between heat absorption and heat generation, each determined by heat flux differential scanning calorimetry at a heating rate of 10° C./min, is 3 to 35 J/g.

3. The thermoplastic resin foam according to claim 1, wherein:

the polyester resin is present in an amount of 40 to 95% by mass, based on a total mass of the thermoplastic resin; and the polyimide resin is present in an amount of 5 to 60% by mass, based on a total mass of the thermoplastic resin.

4. The thermoplastic resin foam according to claim 1, wherein a slope of an exponential approximation formula for storage elastic modulus E' between the glass transition temperature Tg and the glass transition temperature Tg+20° C. in a solid viscoelasticity measurement at a heating rate of 5° C./min and a frequency of 1 Hz is −0.18 to −0.025.

5. The thermoplastic resin foam according to claim 1, wherein the polyimide resin is a polyetherimide resin.

6. The thermoplastic resin foam according to claim 1, wherein the polyester resin comprises a plant-derived polyester resin.

7. The thermoplastic resin foam according to claim 1, wherein the thermoplastic resin comprises a recycled raw material.

8. The thermoplastic resin foam according to claim 1, which is granular.

9. The thermoplastic resin foam according to claim 8, wherein a temperature at which a loss tangent tan δ in solid viscoelasticity measurement at a heating rate of 5° C./min and a frequency of 1 Hz is maximized is 120 to 230° C.

10. The thermoplastic resin foam according to claim 1, which is in the form of a sheet.

11. A thermoplastic resin foam sheet having a layer of the thermoplastic resin foam of claim 10.

12. A fiber-reinforced resin composite comprising:

a thermoplastic resin foam layer which is the thermoplastic resin foam of claim 10 in the form of a sheet; and a fiber-reinforced resin layer provided on one side or both sides of the thermoplastic resin foam layer.

13. A thermoplastic resin foam sheet for a fiber-reinforced resin composite used for forming a thermoplastic resin foam layer in a fiber-reinforced resin composite comprising the thermoplastic resin foam layer of claim 10 in the form of a sheet, and a fiber-reinforced resin layer provided on one side or both sides of the thermoplastic resin foam layer.

14. A method for producing the thermoplastic resin foam of claim 1, which comprises extruding and foaming a thermoplastic resin composition comprising the thermoplastic resin and a blowing agent to obtain a thermoplastic resin foam.

15. The method according to claim 14, wherein the thermoplastic resin composition further comprises a crosslinking agent.

16. The method according to claim 14, wherein the foam is in the form of granules.

17. A thermoplastic resin foam-molded product comprising a thermoplastic resin, wherein:

the thermoplastic resin comprises a polyester resin and a polyimide resin, and the thermoplastic resin foam-molded product shows a single glass transition temperature Tg, wherein the glass transition temperature Tg is 80 to 130° C.

18. The thermoplastic resin foam-molded product according to claim 17, wherein an absolute value of difference between heat absorption and heat generation, each determined by heat flux differential scanning calorimetry at a heating rate of 10° C./min, is 3 to 35 J/g.

19. The thermoplastic resin foam-molded article according to claim 17, wherein an amount of the polyester resin is 40 to 95% by mass, and an amount of the polyimide resin is 5 to 60% by mass, each based on a total mass of the thermoplastic resin.

20. The thermoplastic resin foam-molded product according to claim 17, wherein a slope of an exponential approximation formula for storage elastic modulus E' between the glass transition temperature Tg and the glass transition temperature Tg+20° C. in a solid viscoelasticity measurement at a heating rate of 5° C./min and a frequency of 1 Hz is −0.18 to −0.025.

21. The thermoplastic resin foam-molded product according to claim 17, wherein the polyimide resin is a polyetherimide resin.

22. The thermoplastic resin foam-molded product according to claim 17, wherein the polyester resin comprises a plant-derived polyester resin.

23. The thermoplastic resin foam-molded product according to claim 17, wherein the thermoplastic resin comprises a recycled raw material.

24. The thermoplastic resin foam-molded product according to claim 17, wherein a temperature at which a loss tangent tan δ in solid viscoelasticity measurement at a heating rate of 5° C./min and a frequency of 1 Hz is maximized is 120 to 230° C.

25. The thermoplastic resin foam-molded product according to claim 17, which is a food packaging container.

26. The thermoplastic resin foam-molded product according to claim 17, which is a microwave oven safe container.

27. A method for producing a resin foam-molded product, comprising obtaining the thermoplastic resin foam of claim 1, and molding the thermoplastic resin foam to obtain a thermoplastic resin foam-molded product.

28. A method for producing a thermoplastic resin foam-molded product, comprising: obtaining the thermoplastic resin foam granules by the method of claim 16; filling the obtained thermoplastic resin foam granules into a cavity of a mold; heating the thermoplastic resin foam granules in the cavity to form secondary foam granules; and heat-fusing the secondary foam granules each other to obtain a thermoplastic resin foam-molded product.

29. A foamed resin composite, comprising the thermoplastic resin foam-molded product of claim 17, and a fiber-reinforced resin layer provided on at least part of a surface of the thermoplastic resin foam-molded product.

* * * * *